(12) United States Patent
Noh

(10) Patent No.: US 9,756,616 B2
(45) Date of Patent: Sep. 5, 2017

(54) METHOD FOR TRANSMITTING AND RECEIVING UPLINK SOUNDING REFERENCE SIGNAL, AND TERMINAL FOR SAME

(71) Applicant: KT CORPORATION, Gyeonggi-do (KR)

(72) Inventor: Min Seok Noh, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/406,779

(22) PCT Filed: May 8, 2013

(86) PCT No.: PCT/KR2013/004013
§ 371 (c)(1),
(2) Date: Apr. 20, 2015

(87) PCT Pub. No.: WO2013/187603
PCT Pub. Date: Dec. 19, 2013

(65) Prior Publication Data
US 2015/0229450 A1   Aug. 13, 2015

(30) Foreign Application Priority Data

Jun. 11, 2012 (KR) .................. 10-2012-0062302
Aug. 31, 2012 (KR) .................. 10-2012-0096425
Dec. 6, 2012 (KR) .................. 10-2012-0141245

(51) Int. Cl.
*H04W 4/00* (2009.01)
*H04W 72/04* (2009.01)
*H04L 5/00* (2006.01)

(52) U.S. Cl.
CPC ....... *H04W 72/0406* (2013.01); *H04L 5/0035* (2013.01); *H04L 5/0051* (2013.01); *H04L 5/0053* (2013.01)

(58) Field of Classification Search
None
See application file for complete search history.

(56) References Cited

U.S. PATENT DOCUMENTS 9,426,818 B2* 8/2016 Lee ................... H04W 72/1231
2011/0090862 A1  4/2011 Liang et al.
2011/0098054 A1* 4/2011 Gorokhov ............. H04B 7/024
                                                                      455/452.1
(Continued)

FOREIGN PATENT DOCUMENTS

JP    2013-236289 A   11/2013
KR    10-2011-0048421 A   5/2011
(Continued)

OTHER PUBLICATIONS

Korean Intellectual Property Office, International Search Report for International Application No. PCT/KR2013/005028, Sep. 24, 2013.
(Continued)

*Primary Examiner* — Phuc Tran
*Assistant Examiner* — Fahmida Chowdhury
(74) *Attorney, Agent, or Firm* — IP Legal Services, LLC

(57) ABSTRACT

The present disclosure relates to a method for transmitting and receiving an uplink sounding reference signal, and a terminal for same.

10 Claims, 37 Drawing Sheets

(56) References Cited

U.S. PATENT DOCUMENTS

| | | |
|---|---|---|
| 2011/0249581 A1 | 10/2011 | Jen |
| 2011/0249639 A1 | 10/2011 | Jen |
| 2011/0249648 A1 | 10/2011 | Jen |
| 2011/0294529 A1 | 12/2011 | Luo et al. |
| 2011/0312316 A1 | 12/2011 | Baldemair et al. |
| 2012/0051265 A1* | 3/2012 | Shen ............... H04L 5/0035 370/254 |
| 2012/0051319 A1 | 3/2012 | Kwon et al. |
| 2012/0093119 A1 | 4/2012 | Kim et al. |
| 2012/0113950 A1 | 5/2012 | Skov et al. |
| 2012/0129561 A1 | 5/2012 | Peng et al. |
| 2012/0140660 A1* | 6/2012 | Kang ............... H04L 1/0077 370/252 |
| 2012/0213190 A1 | 8/2012 | Yoon et al. |
| 2012/0236741 A1 | 9/2012 | Xu et al. |
| 2012/0287799 A1* | 11/2012 | Chen ............... H04B 7/024 370/252 |
| 2012/0300743 A1 | 11/2012 | Kim et al. |
| 2013/0021986 A1* | 1/2013 | Bhattad ............ H04W 28/18 370/329 |
| 2013/0078913 A1 | 3/2013 | Lee et al. |
| 2013/0114523 A1* | 5/2013 | Chatterjee ......... H04J 11/0053 370/329 |
| 2013/0242895 A1* | 9/2013 | Chen ............... H04L 5/0051 370/329 |
| 2014/0376356 A1 | 12/2014 | Park et al. |
| 2014/0376484 A1 | 12/2014 | Park et al. |
| 2015/0023270 A1 | 1/2015 | Park et al. |
| 2015/0029968 A1 | 1/2015 | Park et al. |
| 2015/0029969 A1 | 1/2015 | Park et al. |
| 2015/0036607 A1 | 2/2015 | Park et al. |
| 2015/0085787 A1 | 3/2015 | Ouchi |
| 2016/0286538 A1 | 9/2016 | Park et al. |

FOREIGN PATENT DOCUMENTS

| | | |
|---|---|---|
| KR | 10-2012-0023794 A | 3/2012 |
| WO | 2010/147411 A2 | 12/2010 |
| WO | 2011/009486 A1 | 1/2011 |
| WO | 2011/099695 A2 | 8/2011 |
| WO | 2011/152685 A2 | 12/2011 |
| WO | 2012/036704 A1 | 3/2012 |
| WO | 2013/125840 A1 | 8/2013 |
| WO | 2013/125845 A1 | 8/2013 |

OTHER PUBLICATIONS

Korean Intellectual Property Office, Written Opinion of the International Searching Authority for International Application No. PCT/KR2013/005028, Sep. 24, 2013.

3GPP, "3rd Generation Partnership Project; Technical Specification Group Radio Access Network; Evolved Universal Terrestrial Radio Access (E-UTRA); Physical layer procedures (Release 10)", 3GPP TS 36.213 V10.5.0, Mar. 2012, pp. 1-125.

3GPP, "3rd Generation Partnership Project; Technical Specification Group Radio Access Network; Evolved Universal Terrestrial Radio Access (E-UTRA); Physical Channels and Modulation (Release 10)", 3GPP TS 36.211 V10.4.0, Dec. 2011, pp. 1-101.

KDDI, "SRS Enhancements for UL CoMP", R1-122533, 3GPP TSG RAN WG1 Meeting #69, Prague, Czech Republic, May 21-26, 2012, pp. 1-5.

3GPP TR 36.819 V11.0.0, "3rd Generation Partnership Project; Technical Specification Group Radio Access Network; Coordinated multi-point operation for LTE physical layer aspects (Release 11)", Sep. 27, 2011, pp. 1-68, 3GPP, France.

Ericsson et al., "Potential Enhancements for SRS", R1-114255, 3GPP TSG RAN WG1 Meeting #66bis, San Francisco, USA, Nov. 14-18, 2011, pp. 1-7.

Intel Corporation, "CSI-RS configuration/reconfiguration in distributed RRH systems", R1-111593, 3GPP TSG RAN WG1 Meeting #65, Barcelona, Spain, May 9-13, 2011, pp. 1-3.

Qualcomm Incorporated, "On the standardization impact of UL CoMP operation", R1-113389, 3GPP TSG RAN WG1 Meeting #66bis, Zhuhai, China, Oct. 10-14, 2011, pp. 1-2.

European Patent Office, European Search Report of European Patent Application No. 13804562.0, Jan. 5, 2016.

* cited by examiner

METHOD FOR TRANSMITTING AND RECEIVING UPLINK SOUNDING REFERENCE SIGNAL, AND TERMINAL FOR SAME

CROSS REFERENCE TO RELATED APPLICATIONS

This application is a National Stage Patent Application of PCT International Patent Application No. PCT/KR2013/004013 (filed on May 8, 2013) under 35 U.S.C. §371, which claims priority to Korean Patent Application Nos. 10-2012-0062302 (filed on Jun. 11, 2012), 10-2012-0096425 (filed on Aug. 31, 2012), and 10-2012-0141245 (filed on Dec. 6, 2012), the teachings of which are incorporated herein in their entireties by reference.

TECHNICAL FIELD

The present disclosure relates to a method of transceiving an uplink Sounding Reference Signal (SRS) and a terminal thereof, and more particularly, to a method of transceiving an uplink channel and an uplink SRS associated with the uplink channel, and a terminal thereof.

BACKGROUND ART

A coordinated multi-point transmission/reception (CoMP) system includes two or more different Transmission/Reception (T/R) points. Such T/R points cooperatively transmit a signal. The CoMP system requires transmission of a Sounding Reference Signal (SRS). Such a SRS is transmitted for measuring an uplink channel state for uplink frequency dependent scheduling. The SRS is also used for measuring a channel state of an uplink/downlink for downlink beamforming using channel reciprocity.

DETAILED DESCRIPTION OF THE INVENTION

Technical Solution

In accordance with an aspect of the present disclosure, there is provided a method for a User Equipment (UE) to transmit an uplink Sounding Reference Signal (SRS), the method including: receiving, from one of two or more different Transmission/Reception (T/R) points, UE-specific configuration information indicating an uplink reference signal identification (ID) that is independent from a physical cell ID of the one T/R point and is coupled with an uplink channel; generating an SRS using the uplink reference signal ID; and transmitting the generated SRS to a T/R point indicated by the uplink reference signal ID.

In accordance with another aspect of the present disclosure, there is provided a UE, including: a receiving unit that receives, from a first transmission/reception (T/R) point among two or more different T/R points, UE-specific configuration information indicating an uplink reference signal ID that is independent from a physical cell ID of the one T/R point and is coupled with an uplink channel; a controller that generates an SRS using the uplink reference signal ID; and a transmitting unit that transmits the generated SRS to a T/R point indicated by the uplink reference signal ID.

In accordance with another aspect of the present disclosure, there is provided an uplink SRS configuration method of a T/R point, the method including: transmitting, from one of two or more different T/R points to a UE, UE-specific configuration information indicating an uplink reference signal ID that is independent from a physical cell ID of the one T/R point and is coupled with an uplink channel; and receiving, from the UE by a T/R point indicated by the uplink reference signal ID, an SRS generated using the uplink reference signal ID.

MODE FOR CARRYING OUT THE INVENTION

Figure 1:
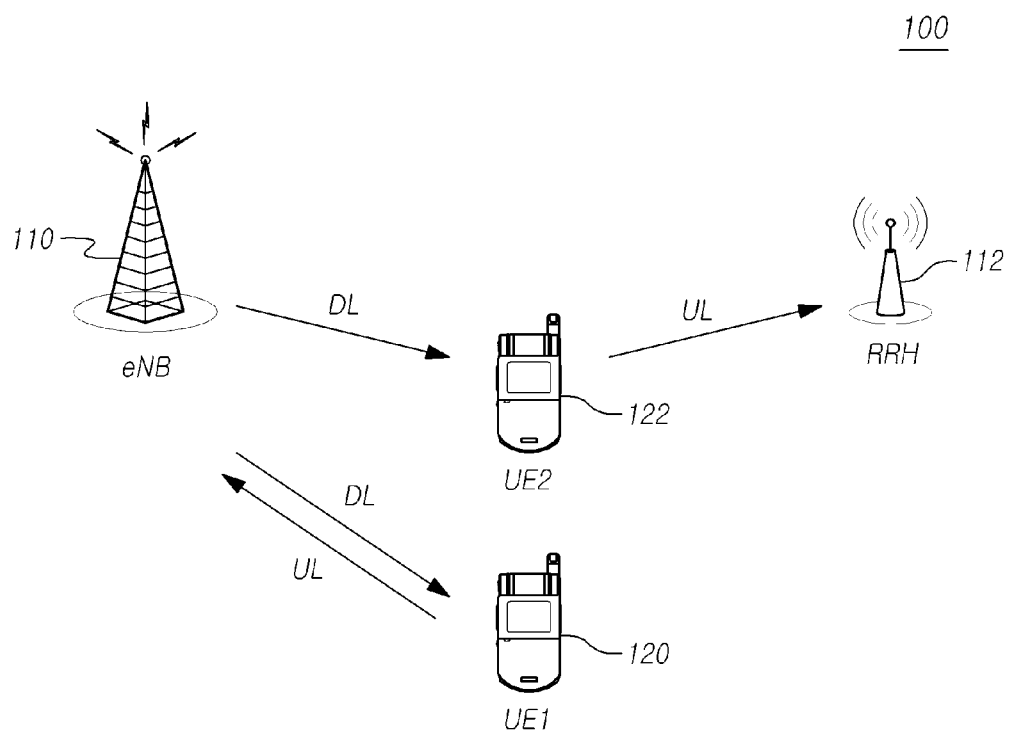
FIG. 1 illustrates a wireless communication system according to embodiments.

Hereinafter, embodiments of the present disclosure will be described with reference to the exemplary drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

The wireless communication system may be widely installed so as to provide various types of communication services, such as a voice service, a packet data service, and the like. The wireless communication system may include a User Equipment (UE) and a Transmission/Reception (T/R) point. Throughout the specifications, the user equipment may be an inclusive concept indicating a terminal utilized in wireless communication, including a User Equipment (UE) in wideband code division multiple access (WCDMA), long term evolution (LTE), high speed packet access (HSPA), and the like, and an Mobile station (MS), a User Terminal (UT), an Subscriber Station (SS), a wireless device, and the like in global systems for mobile communication (GSM).

The T/R point, may generally refer to a station where communication with the user equipment is performed, and may also be referred to as a Base Station (BS), a cell, a Node-B, an evolved Node-B (eNB), a Sector, a Site, a Base Transceiver System (BTS), an Access Point, a Relay Node, an Remote Radio Head (RRH), a Radio Unit (RU), an antenna, and the like.

That is, the T/R point, the base station, or the cell may be construed as an inclusive concept indicating a function or a portion of an area covered by a Base Station Controller (BSC) in code division multiple access (CDMA), a NodeB in wideband CDMA (WCDMA), an eNB or a sector (site) in LTE, and the like, and the concept may include various coverage areas, such as a megacell, a macrocell, a microcell, a picocell, a femtocell, a communication range of a relay node, an Remote Radio Head (RRH), and Radio Unit (RU), and the like.

In the specifications, the user equipment and the T/R point are used as two inclusive transceiving subjects to embody the technology and technical concepts described in the specifications. The user equipment and the T/R point may not be limited to a predetermined term or word. The user equipment and the T/R point are used as two inclusive transceiving subjects (e.g., uplink and downlink) to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Multiple access schemes may be unrestrictedly applied to the wireless communication system. The wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like. An embodiment of the present invention may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The embodiments of the present disclosure may not be limited to a specific wireless communication field, and may include all technical fields to which the technical idea of the present disclosure is applicable.

Uplink transmission and downlink transmission may be performed based on a Time Division Duplex (TDD) scheme that performs transmission based on different times, or based on an Frequency Division Duplex (FDD) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a Physical Downlink Control Channel (PDCCH), Physical Control Format Indicator Channel (PCFICH), Physical Hybrid ARQ Indicator Channel (PHICH), Physical Uplink Control Channel (PUCCH), and the like, and may be configured as a data channel, such as Physical Downlink Shared Channel (PDSCH), Physical Uplink Shared Channel (PUSCH), and the like, so as to transmit data.

In the specifications, a PDCCH is a concept including an EPDCCH.

In the specifications, a cell may refer to the coverage of a signal transmitted from a transmission point or a Transmission/Reception (T/R) point, a component carrier having the coverage of the signal transmitted from the T/R point, or the T/R point itself. In the specifications, the T/R point refers to a transmission point that transmits a signal, a reception point that receives a signal, or a combination thereof (transmission/reception point).

FIG. 1 is an example of a wireless communication system according to embodiments.

Referring to FIG. 1, a wireless communication system 100 according to embodiments refers to a Coordinated Multi-point transmission/reception (CoMP) system, a coordinated multi-antenna transmission system, or a coordinated multi-cell communication system. In the CoMP system, two or more Transmission/Reception (T/R) points cooperatively transmit a signal. The CoMP system 100 may include at least two T/R points 110 and 112, and User Equipments (UEs) 120 and 122.

A T/R point may be a base station or a macrocell (or a macro node, hereinafter referred to as an 'eNB' 110), or may be at least one picocell 112 (hereinafter referred to as an 'RRH') that is connected to the eNB 110 through an optical cable or an optical fiber and is wiredly controlled, and has a high transmission power or a low transmission power within a macro cell area. The eNB 110 and the RRH 112 may have an identical cell ID or may have different cell IDs.

Hereinafter, a downlink indicates communication or a communication path from the T/R point 110 and 112 to the UE 120, and an uplink indicates communication or a communication path from the UE 120 to the T/R point 110 and 112. In the downlink, a transmitter may be a part of the T/R point 110 and 112, and a receiver may be a part of the UE 120 and 122. In the uplink, a transmitter may be a part of the UE 120, and a receiver may be a part of the T/R point 110 and 112.

Hereinafter, signal transmission and signal reception through a PUCCH, a PUSCH, a PDCCH, a PDSCH, and the like may be described as "a PUCCH, a PUSCH, a PDCCH, or a PDSCH is transmitted or received".

The eNB 110 is one of the T/R points 110 and 112. The eNB 110 may execute downlink transmission to the UEs 120 and 122. The eNB 110 may transmit a Physical Downlink Shared Channel (PDSCH) which is a primary physical channel for unicast transmission. The eNB 110 may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, signal transmission and signal reception through a channel will be described as transmission and reception of a corresponding channel.

The first UE (UE1) 120 may transmit an uplink signal to the eNB 110. The second UE (UE2) 122 may transmit an uplink signal to the RRH 112, which is one of the T/R points 110 and 112. In this instance, the first UE 120 may transmit an uplink signal to the RRH 112, and the second UE 122 may transmit an uplink signal to the eNB 110. Also, the number of UEs may be two or more. The following embodiment will be described as two UEs are included, one UE transmits an uplink signal to the eNB 110, and the other UE transmits an uplink signal to the RRH 112. However, the embodiments of the present disclosure are not limited thereto.

In the LTE communication system, which is one of the current wireless communication schemes, a Demodulation Reference Signal (DMRS or DM-RS) and a Sounding Reference Signal (SRS) are defined as an uplink signal. For a downlink signal, three Reference Signals (RSs) are defined, which are a Cell-specific Reference Signal (CRS), a Multicast/Broadcast over Single Frequency Network Reference Signal (MBSFN-RS), and a UE-specific Reference Signal.

In the wireless communication system, when executing uplink transmission, a UE transmits an uplink demodulation reference signal (UL DMRS or UL DM-RS) in each slot, for recognition of channel information used for demodulating a data channel. In a case of an uplink DM-RS associated with a Physical Uplink Shared CHannel (PUSCH), a reference signal is transmitted through a single symbol in each slot. In a case of an uplink DM-RS associated with a Physical Uplink Control CHannel (PUCCH), the number of symbols used may be different based on a type of PUCCH. For PUCCH format 1/1a/1b, a reference signal is transmitted through three symbols in each slot, and for PUCCH format 2/2a/2b/3, a reference signal is transmitted through two symbols in each slot.

Figure 2:
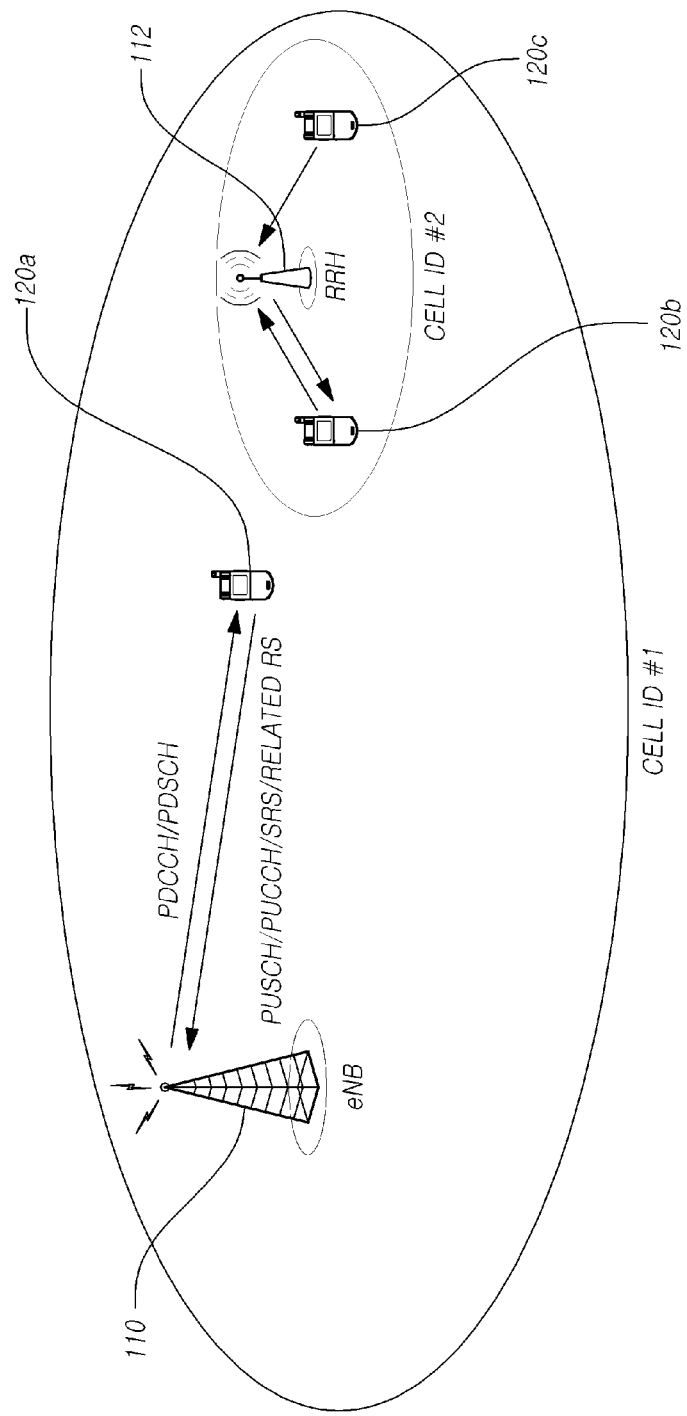
FIG. 2 illustrates an uplink/downlink data transmission method used in a heterogeneous network and a CoMP scenario in which Transmission/Reception (T/R) points use different cell IDs.

FIG. 2 illustrates a typical uplink/downlink data transmission method in a heterogeneous network and a CoMP scenario in which T/R points use different cell IDs.

Referring to FIG. 2, the wireless communication system 100 according to embodiments may be a CoMP system that implements a CoMP scenario in which the eNB 110 and the RRH 112 have different cell IDs and uses a heterogeneous network.

Figure 3:
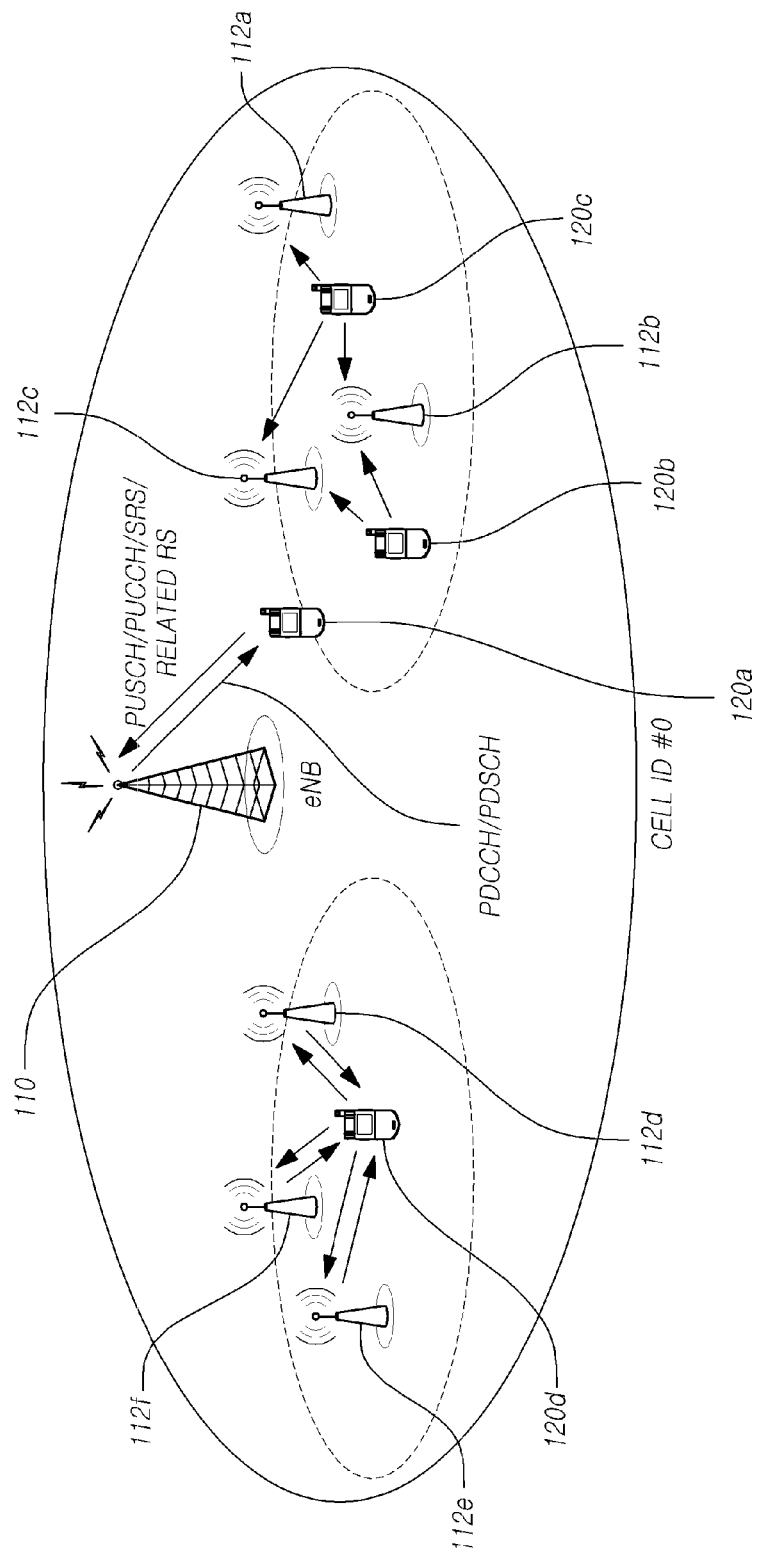
FIG. 3 illustrates an uplink/downlink data transmission method in a CoMP scenario in which T/R points use an identical cell ID.

FIG. 3 illustrates an uplink/downlink data transmission method in a CoMP scenario in which T/R points use an identical cell ID.

Referring to FIG. 3, the wireless communication system 100 according to embodiments may be a CoMP system that implements a CoMP scenario in which the eNB 110 and RRHs 112a, 112b, 112c, 112d, 112e, and 112f have an identical cell ID.

In a case of a DM-RS for demodulation of PUSCH data in the CoMP system of FIG. 2 and FIG. 3, a UE may receive parameters used for generating a reference signal transmitted in the wireless communication system 100. For example, such parameters may include information associated with a sequence group index, a sequence index, a cyclic shift index, an Orthogonal Cover Code (OCC) index. The UE may receive such parameters from a T/R point associated with the corresponding UE, for example, the eNB 110 as a serving T/R point. In this instance, when multiple UEs are illustrated in the drawing, the reference numerals of the UEs are separately assigned as 120a, 120b, 120c, and the like. When a single UE is illustrated in the drawing, the reference numeral of the UE is 120.

The corresponding eNB 110 is configured to 1) inform a UE of a cell ID set for identifying the corresponding eNB 110, sequence group hopping set through RRC, a sequence group index, and a sequence index based on the configuration of the sequence hopping. Also, the corresponding eNB 110 is configured to 2) notifies a UE of a cyclic shift index and an OCC index for generating a reference signal through a PDCCH transmitted through a downlink for uplink grant. For example, the corresponding eNB 110 notifies a UE of DCI format 0 and DCI format 4. Through 1) and 2), the UE generates an uplink DM-RS and transmits the uplink DM-RS together with a PUSCH to an eNB 110.

In a case of an uplink SRS, in the wireless communication system 100, a corresponding T/R point transmits, to the UE 120a, parameters for enabling the UE to generate an SRS. For example, the parameters may include a Cell-specific SRS bandwidth, a transmission comb (frequencies assigned at 2 subcarrier spacing intervals, for example, 0 (even subcarriers) or 1 (odd subcarriers)), a UE-specific SRS bandwidth, hopping related configuration parameters, a frequency domain position, a periodicity, a subframe configuration (determining a subframe for SRS transmission), an antenna configuration (determining the number of antennas that transmit an SRS and the number of antenna ports), a base sequence index (an SRS sequence index for generating a corresponding SRS is determined based on a sequence group number u used in a PUCCH and a sequence number v determined based on a sequence hopping configuration), a cyclic shift index (a cyclic shift index as a reference signal used for generating an SRS) and the like. Such parameters may be transmitted as RRC parameters. The UE 120a receives the corresponding information and transmits an uplink SRS.

In addition, a periodic SRS and an aperiodic SRS are defined. In a similar manner to the periodic SRS, a T/R point transmits, to the UE 120a, various parameters for enabling the UE 120a to generat a corresponding aperiodic SRS. Such parameters are used for generating an aperiodic SRS transmitted by the UE in the wireless communication system 100. For example, such parameter may include a UE-specific SRS bandwidth of an aperiodic SRS, a transmission comb, a frequency domain position, a periodicity, a subframe configuration, an antenna configuration, a base sequence index, a cyclic shift index, and the like. The T/R point transmits such parameters to the UE 120a as RRC parameters.

In addition, for transmitting an aperiodic SRS, a T/R point may trigger the terminal 120a to execute the transmission of an aperiodic SRS dynamically using a PDCCH. The corresponding UE 120a may receive triggering through the PDCCH and RRC parameters and transmits an uplink aperiodic SRS.

According to the above described uplink/downlink data transmission method, when a UE transmits a reference signal to an associated serving T/R point, only the associated serving T/R point may receive the reference signal transmitted by the UE 120a. Other points may be incapable of receiving the reference signal from the corresponding UE 120a since is the other points are unaware of information for generating the reference signal. Here, the reception does not mean that a reference signal is received as interference. The reception means that the reference signal is received as a desired signal, which corresponds to the purpose of a signal transmitted by a UE.

In addition, a UE receives parameters transmitted from a T/R point and generates a reference signal based on the parameters from the T/R point when generating an uplink DM-RS and a periodic/aperiodic SRS. Thus, the UE can perform uplink transmission only through an uplink linked with a downlink from a T/R point where the UE belongs, and the UE cannot perform uplink transmission to an uplink not linked with the downlink from the T/R point where the UE belongs.

As described, when the UE 120a belongs to the corresponding T/R point the UE 120a receives a downlink control channel from the corresponding T/R point, as a serving T/R point. In this case, the UE 120a cannot support transmission to other T/R points although the other T/R points provide better uplink channel quality and geometry instead of performing uplink data transmission to the serving T/R point.

The present disclosure provides a method for setting the UE 120a belonging to a serving T/R point and receiving a downlink control channel from the serving T/R point, to support transmission to other T/R point providing better uplink channel quality and geometry, and a method and apparatus for distinguishing channels transmitted to different T/R points.

In addition, the present disclosure provides a method and apparatus for a UE belonging to a serving T/R point to distinguish an uplink channel (for example, a PUSCH, a PUCCH, an SRS, an uplink related RS) transmitted to the serving T/R point from an uplink channel transmitted to other T/R point that is different from the serving T/R point. Distinguishing the channels may be distinguishing between channels having an identical channel type (that is, between SRSs, between PUSCHs, between PUCCHs, or between related RSs) or distinguishing between channels having different channel types (that is, between an SRS and a PUSCH, between a PUCCH and a PUSCH, and between a PUCCH and an SRS). For example, although a sequence group index and a sequence index used for a periodic and aperiodic SRS are defined respectively by a sequence group index u used in a PUCCH and a sequence index v defined for sequence hopping used in a PUSCH, the present disclosure provides a method and apparatus for setting a sequence group index u and a sequence index v used for a periodic and aperiodic SRS, using a different scheme.

Hereinafter, a method and apparatus for transmitting an uplink reference signal and an SRS according to an embodiment of the present disclosure will be described with reference to drawings.

An uplink reference signal may be a Demodulation Reference Signal (DM-RS) for demodulation of a physical uplink channel, and a physical uplink channel may be at least one of a physical uplink data channel (PUSCH) and a physical uplink control channel.

Figure 4:
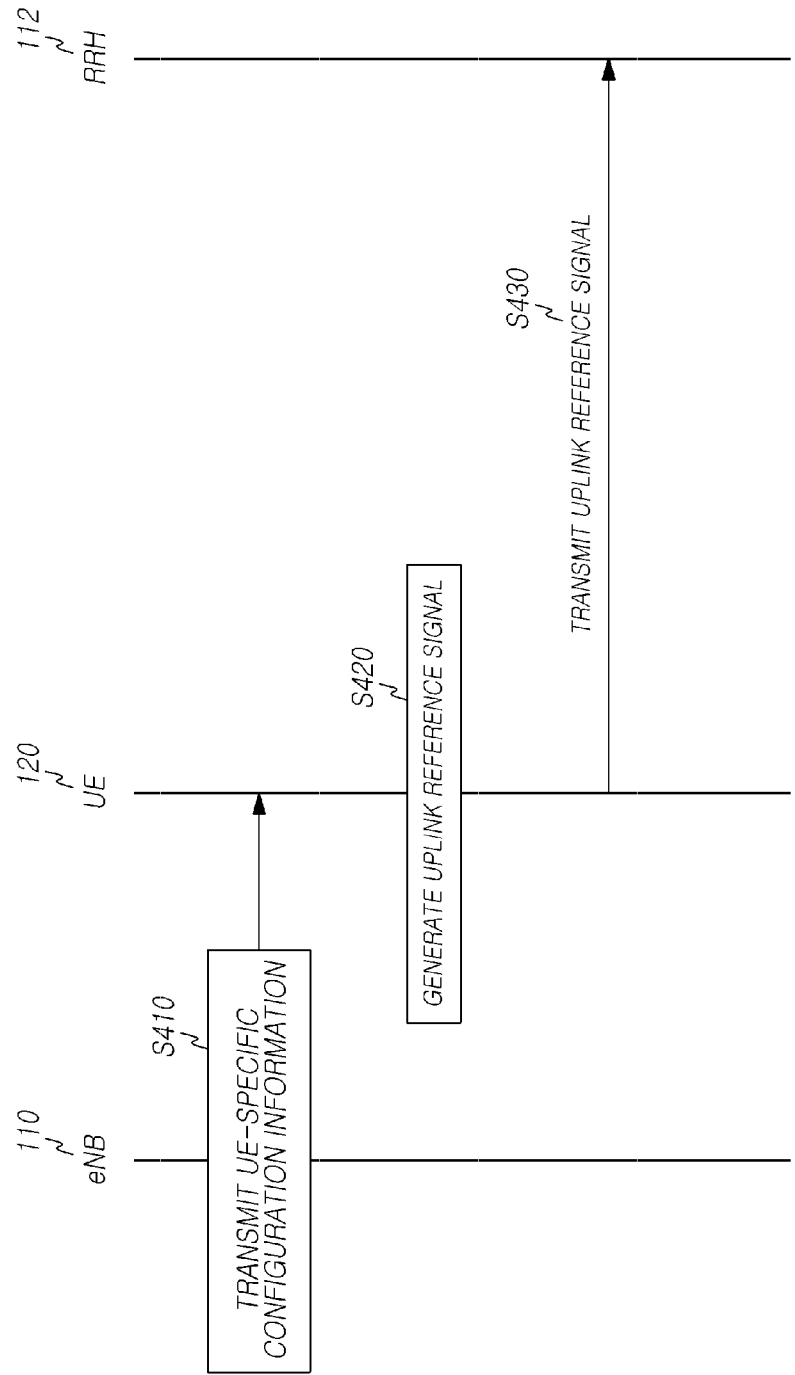
FIG. 4 is a flowchart illustrating an uplink reference signal transmission method of a User Equipment (UE) according to an embodiment.

FIG. 4 is a flowchart illustrating an uplink reference signal transmission method of a UE according to an embodiment.

Referring to FIG. 4, a method for a UE to transmit an uplink reference signal according to an embodiment of the present disclosure includes receiving, from one T/R point 110, UE-specific configuration information indicating an uplink reference signal ID, which is independent from a physical cell ID of the one T/R point 110 and is coupled with a part or the entirety of a physical uplink channel, in operation S410, generating an uplink reference signal using the uplink reference signal ID in operation S420, and transmitting the generated uplink reference signal to a T/R point indicated by the uplink reference signal ID in operation S430.

According to the uplink reference signal transmission method of FIG. 4, the uplink reference signal is generated from the uplink reference signal ID, which is independent from the physical cell ID of a T/R point that transmits a downlink channel to the UE. Thus, the method of FIG. 4 enables to set a transmission target of the uplink reference signal with other T/R point 112 that is different from the T/R point 110 that transmits the downlink channel to the UE. Although it is not illustrated in FIG. 4, the transmission target of the uplink reference signal may be the T/R point 110 that transmits a downlink channel when the transmission target for an uplink reference signal is set independently according to the method of FIG. 4.

As illustrated in FIG. 4, when an uplink reference signal is generated from an independent uplink reference signal ID, an SRS may be generated from the identical uplink reference signal ID.

As described above, when the sequences of the uplink reference signal and the SRS are generated from the identical uplink reference signal ID, the physical uplink channel and the SRS are associated with and set to have an identical transmission target. That is, the uplink channel and the sounding reference signal are linked and transmitted.

In the above described SRS transmission method, an SRS may be at least one of a periodic SRS and an aperiodic SRS.

According to the uplink reference signal transmission method of FIG. 4, a transmission target of a physical uplink channel may be dynamically changed and controlled by independently setting a reference signal ID for generating an uplink reference signal.

In addition, in the method of transmitting an SRS through coupling with a physical uplink channel as described above, a periodic or aperiodic SRS may be coupled and transmitted with the physical uplink (e.g., a PUCCH or a PUSCH). Accordingly, various associated embodiments may be available.

Hereinafter, an SRS transmission method will be described through a first embodiment and a second embodiment.

First Embodiment: Coupling with PUCCH

According to the first embodiment, a physical uplink channel is a PUCCH and an SRS is coupled and transmitted with a PUCCH. According to the second embodiment, a physical uplink channel is a PUSCH and an SRS is coupled and transmitted with a PUSCH.

Figure 5:
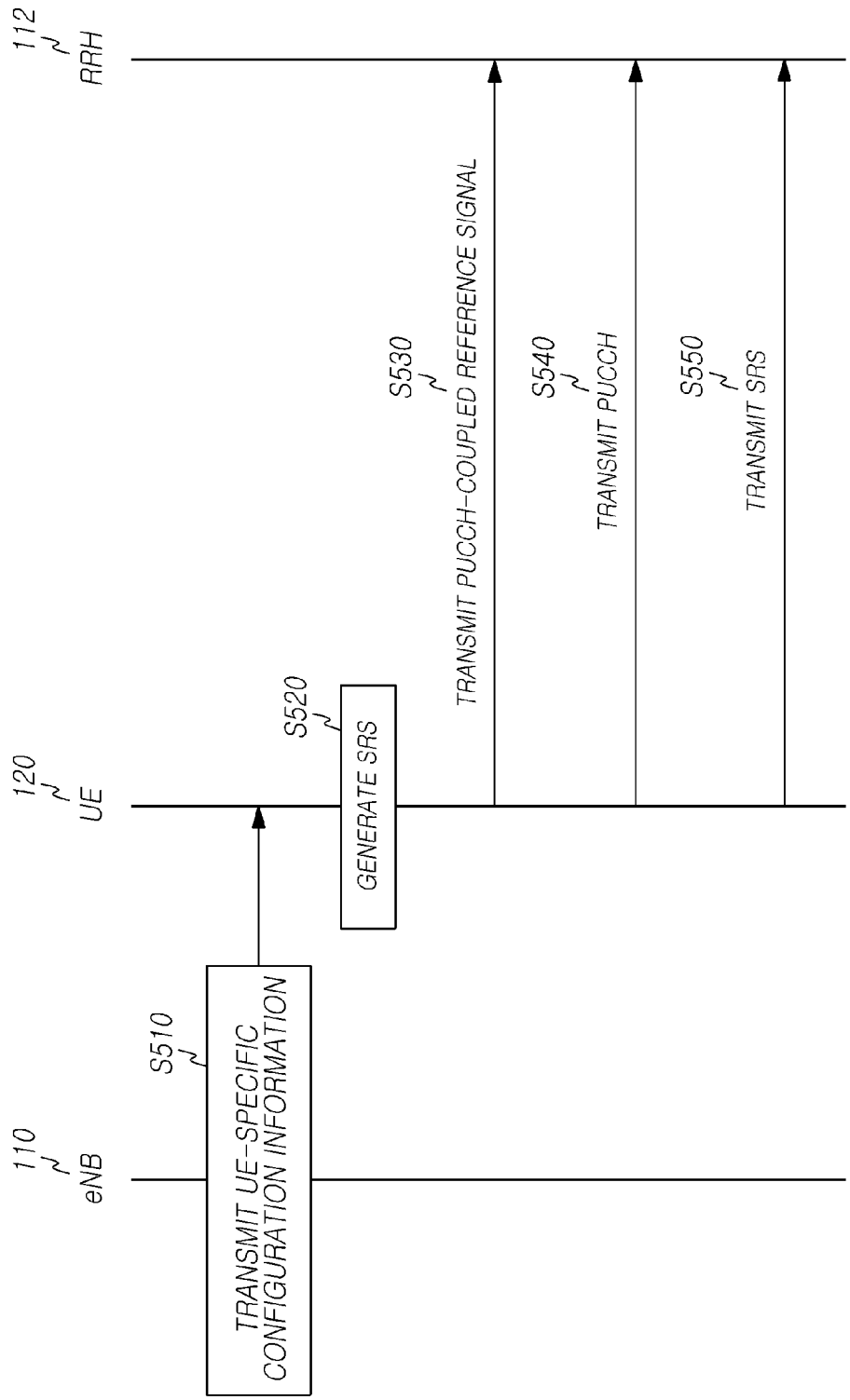
FIG. 5 is a flowchart illustrating a Sounding Reference Signal (SRS) transmission method when a physical uplink channel is a PUCCH in the SRS transmission method of FIG. 4.

FIG. 5 is a flowchart illustrating an SRS transmission method when a physical uplink channel is a PUCCH in the SRS transmission method of FIG. 4. In the SRS transmission method of FIG. 5, an SRS is transmitted by coupling with an uplink reference signal. Accordingly, the flowchart of FIG. 5 includes a process of transmitting an uplink reference signal and a physical uplink channel associated therewith.

Referring to FIG. 5, the SRS transmission method according to the first embodiment includes receiving, from one T/R point among two or more different T/R points, UE-specific configuration information indicating an uplink reference signal ID, which is independent from a cell ID of the one T/R point and is coupled with a PUCCH, in operation S510, generating a part or the entirety of an SRS using the uplink reference signal ID in operation S520, transmitting a reference signal that is coupled with the PUCCH to a T/R point 112 indicated by the uplink reference signal ID in operation S530, transmitting the PUCCH to the T/R point 112 indicated by the uplink reference signal ID in operation S540, and transmitting the generated SRS to the T/R point 112 indicated by the uplink reference signal ID in operation S550.

In this instance, operation S530 and operation S540 may be simultaneously executed. In addition, the SRS and the PUCCH may be transmitted simultaneously in a single subframe.

According to the first embodiment of FIG. 5, when a reception point of a PUCCH is set to a T/R point different from a serving T/R point where a UE belongs, that is, when an uplink is transmitted to a T/R point different from a serving T/R point by setting a UE-specific PUCCH sequence and a PUCCH-coupled reference signal sequence in sequence generation for transmitting a PUCCH and a reference signal coupled with the PUCCH, the PUCCH and the SRS may be transmitted to the same target T/R point through the uplink by setting a corresponding aperiodic or periodic SRS based on the configuration of the sequence used by the PUCCH and the reference signal coupled with the PUCCH.

FIG. 6 through FIG. 11 are diagrams illustrating various embodiments for coupling and transmitting a part or the entirety of an SRS with a PUCCH according to the SRS transmission method of FIG. 5.

Figure 6:
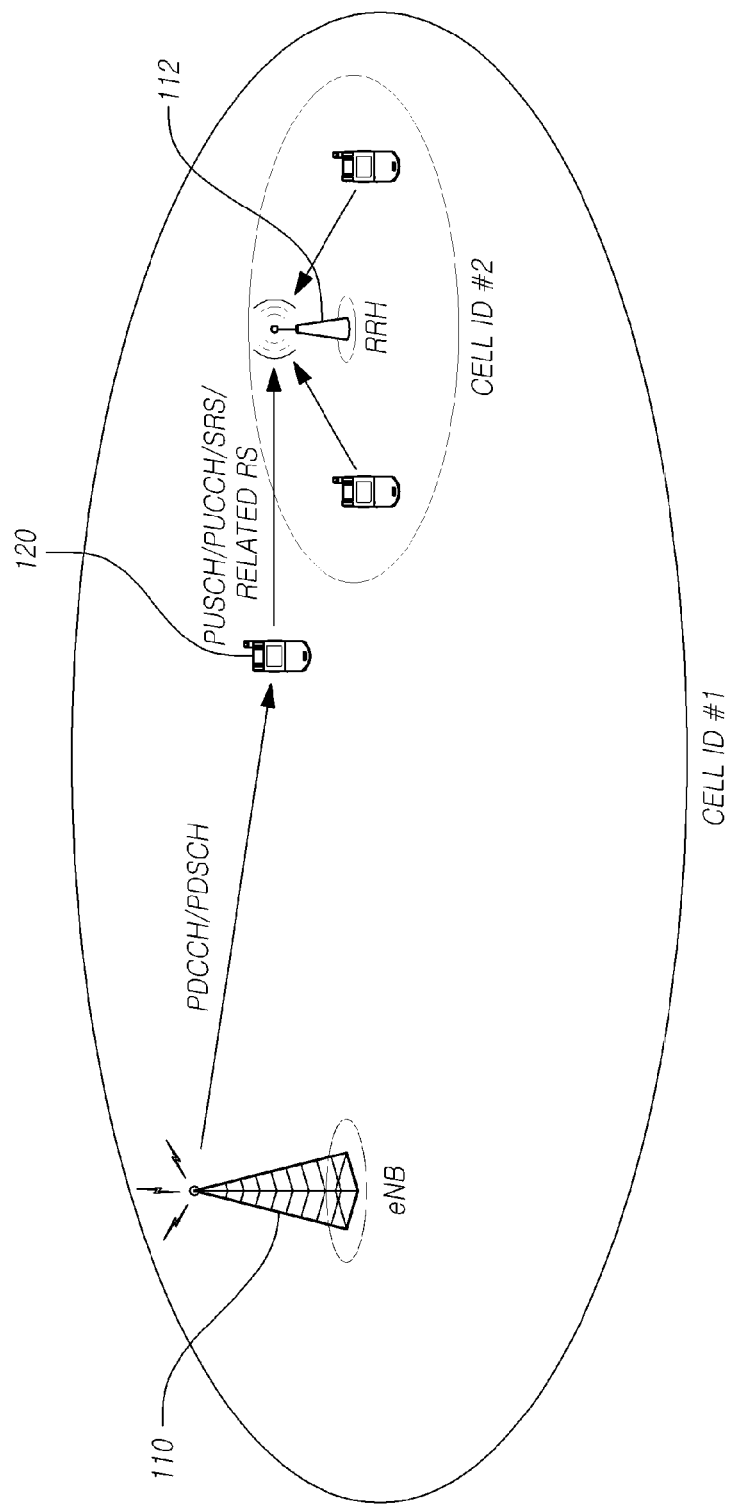
FIG. 6 illustrates transmission of all uplink related channels to a T/R point different from a T/R point where a UE belongs, in a CoMP system where T/R points use different cell IDs (Cell ID#1 and Cell ID #2)

Referring to FIG. 6, all of the uplink related channels are transmitted to a T/R point different from a serving T/R point where a UE belongs, in a CoMP system where T/R points use different cell IDs (e.g., Cell ID#1 and Cell ID #2).

Figure 7:
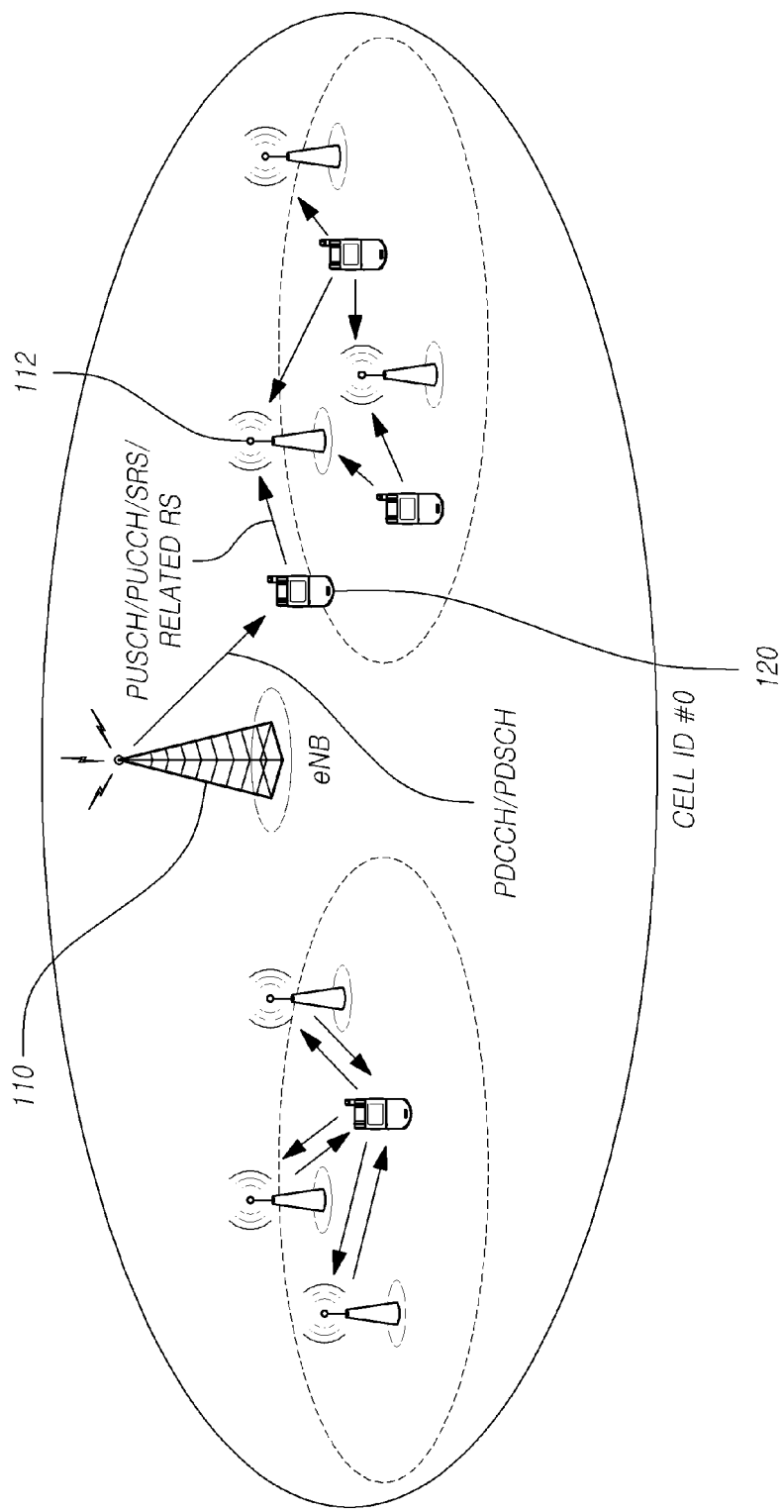
FIG. 7 illustrates transmission of all uplink related channels to a T/R point different from a T/R point where a UE belongs, in a CoMP system where T/R points use an identical cell ID (Cell ID#0)

Referring to FIG. 7, all of the uplink related channels are transmitted to a T/R point different from a serving T/R point where a UE belongs, in a CoMP system where T/R points use an identical cell ID (Cell ID#0).

Referring to FIG. 6 and FIG. 7, an SRS and a PUCCH are coupled and transmitted to an identical T/R point. Accordingly, when both a PUCCH and a PUSCH are transmitted to a T/R point having better geometry and channel quality, for example, the RRH 112, as opposed to a serving T/R point where the UE 120 belongs, for example, the eNB 110, the SRS of the UE 120 is also transmitted, together with the PUCCH and the PUSCH, to another T/R point 112 that is different from the serving T/R point 110 where the UE 120 belongs. Accordingly, all the uplink channels are transmitted to the other T/R point 112.

Figure 8:
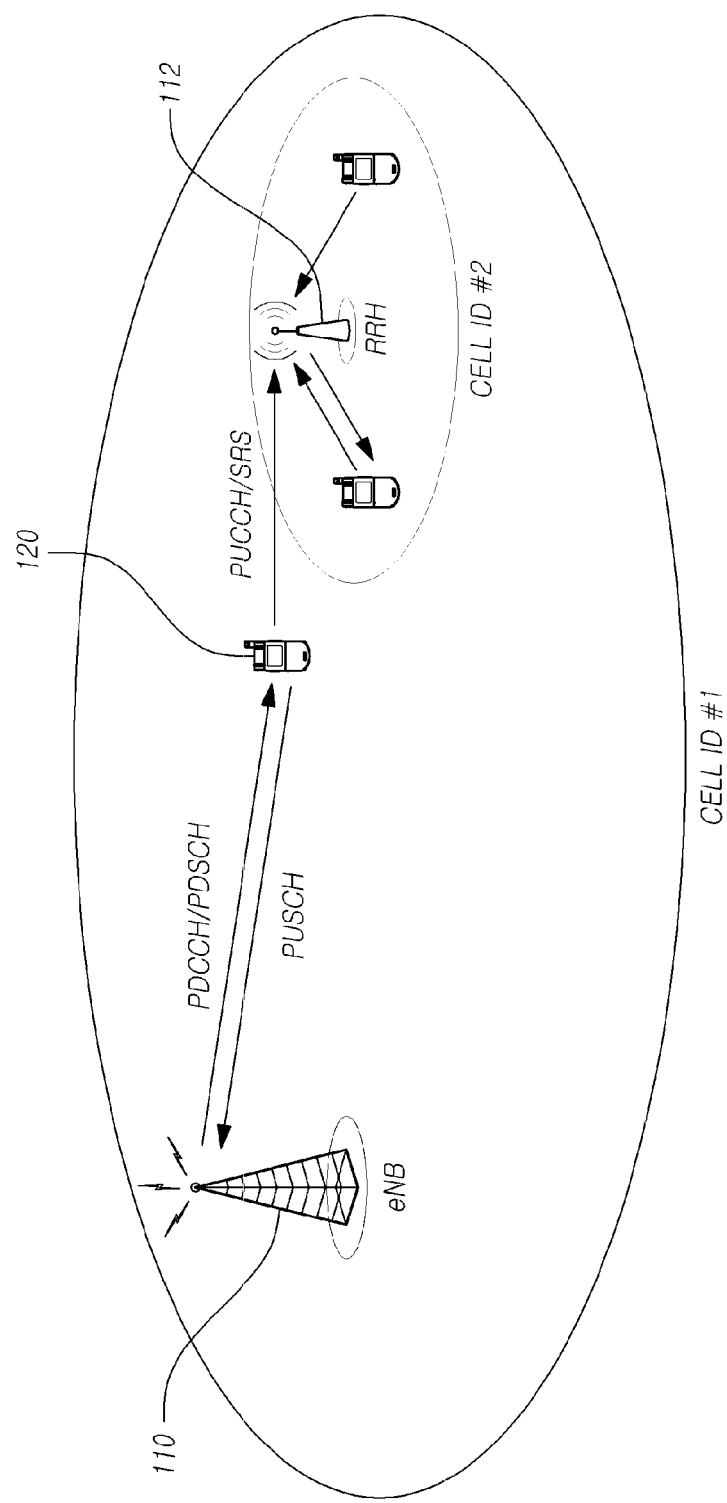
FIG. 8 illustrates transmission of an SRS coupled with a PUCCH in a CoMP system where T/R points use different cell IDs (Cell ID#1 and Cell ID #2)

Referring to FIG. 8, a PUCCH is coupled with an SRS and is transmitted, in a CoMP system where T/R points use different cell IDs (Cell ID#1 and Cell ID #2).

Figure 9:
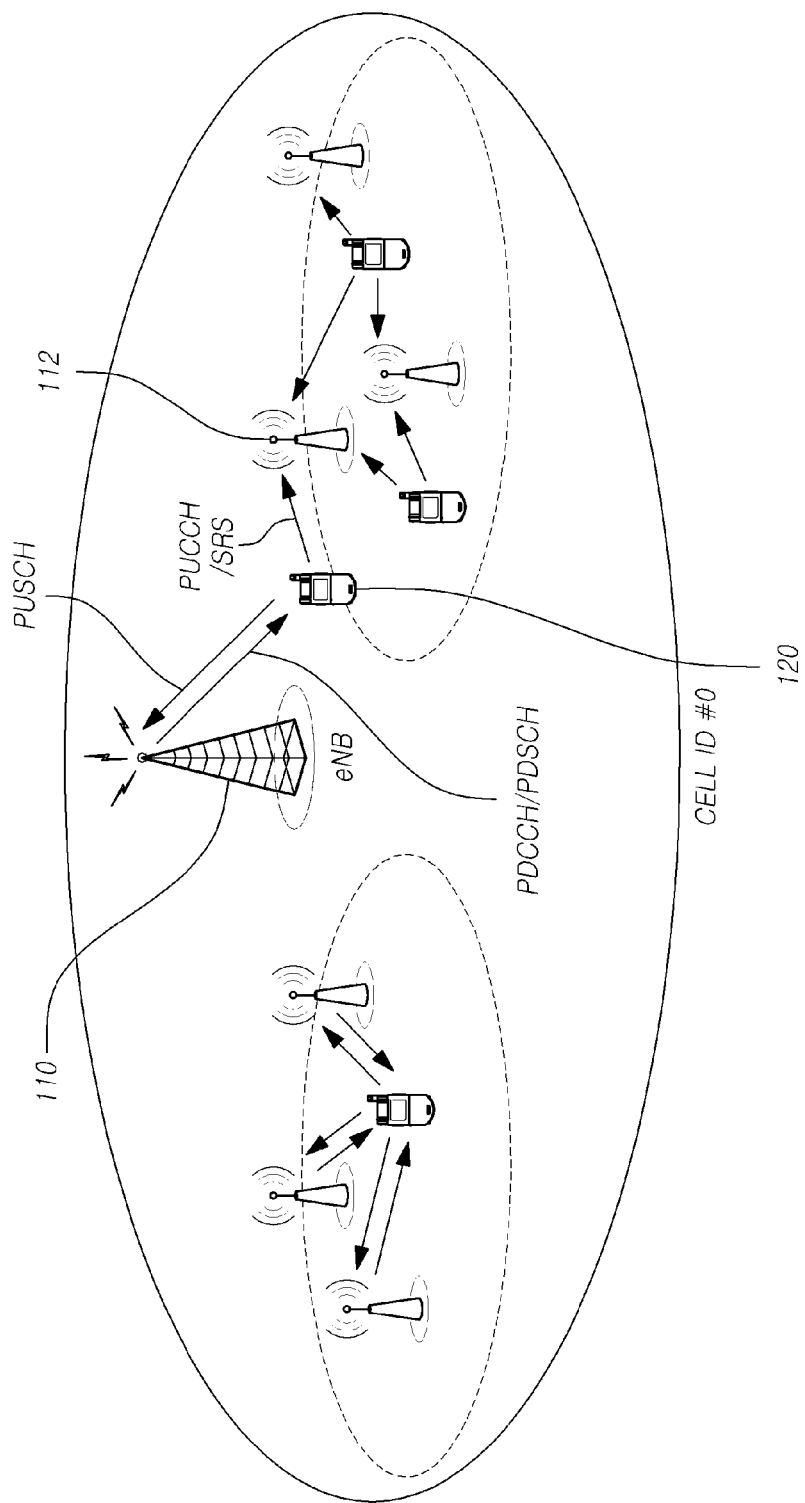
FIG. 9 illustrates transmission of an SRS coupled with a PUCCH in a CoMP system where T/R points use an identical cell ID (Cell ID #0)

Referring to FIG. 9, an SRS is coupled with a PUCCH and is transmitted, in a CoMP system where T/R points use an identical cell ID (Cell ID #0).

Referring to FIG. 8 and FIG. 9, a downlink control channel (e.g., PDCCH) and a data channel (e.g., PDSCH) may be received from the T/R 110 where the UE 120 belongs, and an uplink data channel (PUSCH) may be transmitted to the corresponding T/R point 110 where the UE belongs. An uplink control channel (e.g., PUCCH) for transmitting ACK/NACK for downlink transmission, channel state information, or the like from among uplink channels and an SRS may be transmitted to the T/R point 112 that is different from the T/R point 110 where the UE belongs.

Figure 10:
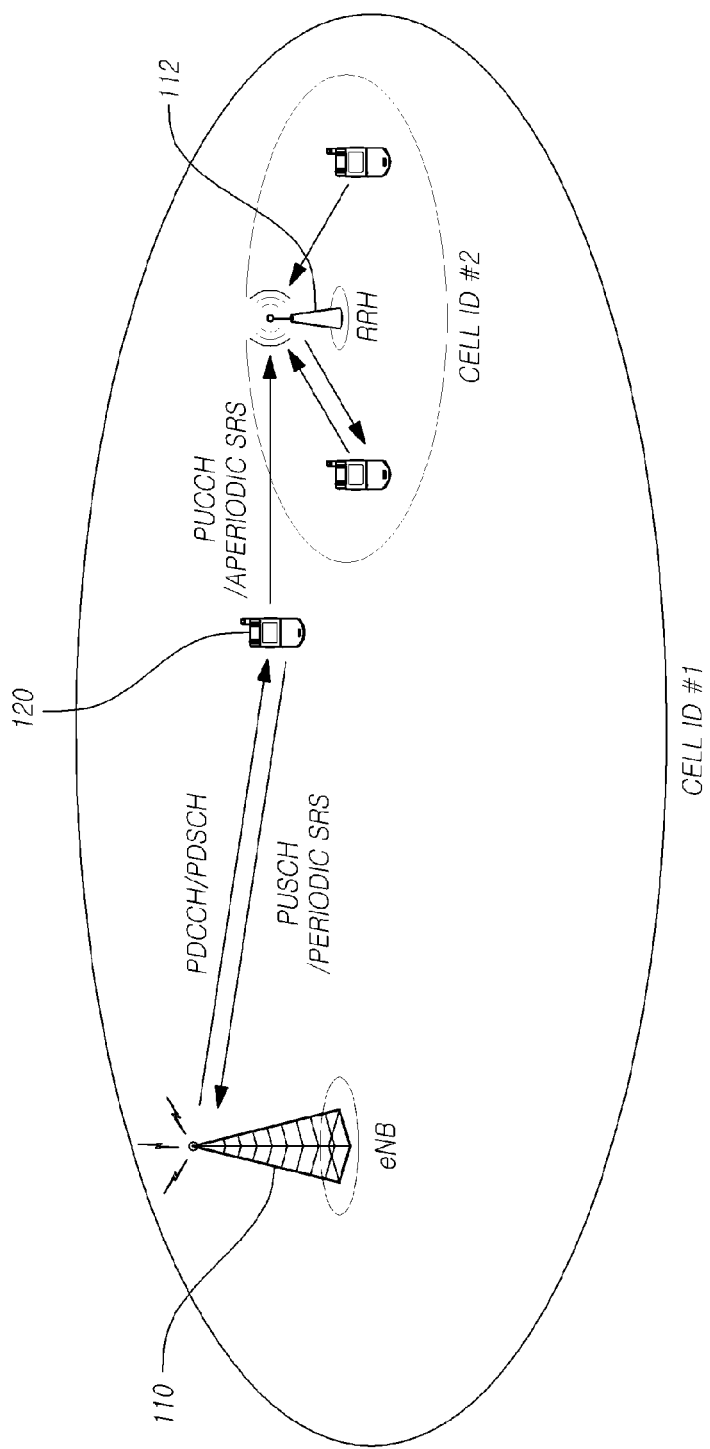
FIG. 10 illustrates transmission of only an aperiodic SRS coupled with a PUCCH in a CoMP system where T/R points use different cell IDs (Cell ID#1 and Cell ID #2)

Referring to FIG. 10, only an aperiodic SRS is coupled with a PUCCH and is transmitted, in a CoMP system where T/R points use different cell IDs (Cell ID#1 and Cell ID #2).

Figure 11:
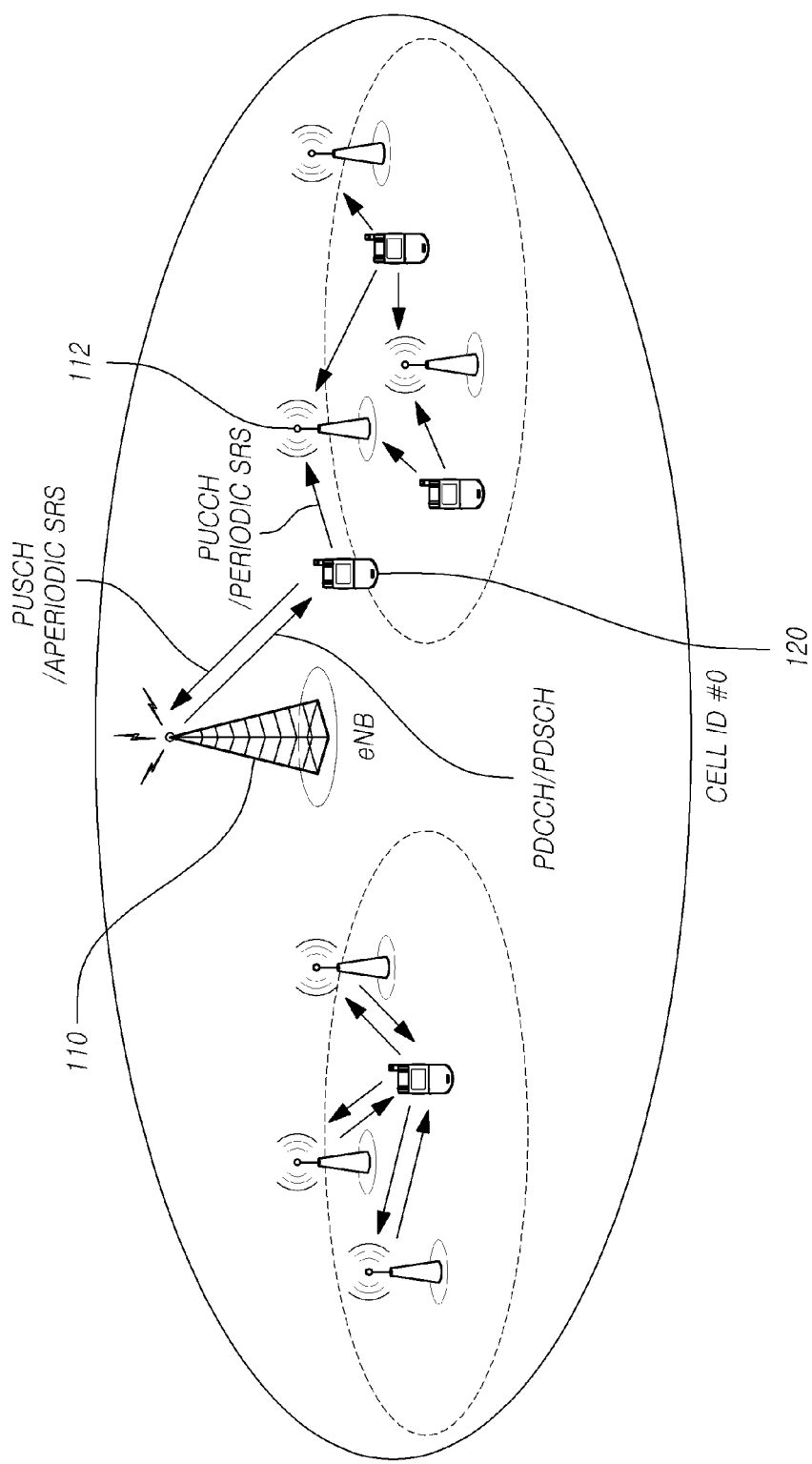
FIG. 11 illustrates transmission of only an aperiodic SRS coupled with a PUCCH in a CoMP system where T/R points use an identical cell ID (Cell ID #0)

Referring to FIG. 11, only an aperiodic SRS is coupled with a PUCCH, in a CoMP system where T/R points use an identical cell ID (Cell ID #0).

Referring to FIG. 10 and FIG. 11, a downlink control channel (e.g., PDCCH) and a data channel (e.g., PDSCH) may be received from the T/R 110 where the UE 120 belongs, and an uplink data channel (PUSCH) and a periodic SRS may be transmitted to the corresponding T/R point 110 where the UE belongs. An uplink control channel (e.g., PUCCH) for transmitting ACK/NACK for downlink transmission, channel state information, or the like from among uplink channels and an aperiodic SRS may be transmitted to the T/R point 112 that is different from the T/R point 110 where the UE belongs.

Hereinafter, each operation of the SRS transmission method of FIG. 5 will be described in detail based on a case in which both of a periodic SRS and an aperiodic SRS are coupled with a PUCCH as shown in FIG. 6 through FIG. 9. The SRS transmission method of FIG. 5 includes the operation of generating and transmitting an uplink reference signal, which is described in FIG. 4. Thus, the following descriptions may include a method of transmitting an SRS and a method of generating an uplink reference signal based on an independent reference signal ID, and transmitting the same.

Referring again to FIG. 5, the eNB 110 is one of the T/R points and transmits UE-specific configuration information to the UE 120 that belongs to the eNB 110 in operation S510. In S510, the UE 120 receives the UE-specific configuration information.

The UE-specific configuration information includes a UE-specific parameter that sets the UE 120 that belongs to the eNB 110, to be UE-specific. For example, the UE-specific configuration information may include a UE-specific parameter that indicates a PUCCH-coupled reference signal ID ($n_{ID}^{RS}$ or Virtual Cell ID (VCID), hereinafter referred to as $n_{ID}^{RS}$) that sets a PUCCH sequence and a PUCCH-coupled reference signal sequence to be specific to the UE. The UE-specific parameter that indicates the PUCCH-coupled reference signal ID $n_{ID}^{RS}$ may be distinguished from a cell-specific parameter that indicates a cell ID $N_{ID}^{cell}$ of a cell where the UE 110 belongs.

The eNB 110 may dynamically transmit the UE-specific configuration information including the UE-specific parameter that indicates the PUCCH-coupled reference signal ID $n_{ID}^{RS}$, to the UE 120 through a PDCCH/EPDCCH, or may semi-statistically set the same through a higher layer, for example, RRC, or may set the same in advance through RRC and indicates whether to use the setting through a PDCCH/EPDCCH.

The UE 120 may generate a reference signal that is coupled with the PUCCH using the UE-specific parameter including the PUCCH-coupled reference signal ID $n_{ID}^{RS}$, for example, a base sequence $\bar{r}_{u,v}(n)$ of a DM-RS. The base sequence may be generated to be different based on a sequence group number u and a base sequence number v in a group. To determine the sequence group number u and the base sequence number v in a group, the PUCCH-coupled reference signal ID may be used as opposed to the cell ID $N_{ID}^{cell}$.

In addition, the UE 120 may generate an SRS using the UE-specific configuration information including the PUCCH-coupled reference signal ID $n_{ID}^{RS}$ in operation S520.

In addition, the UE 120 allocates a DM-RS generated based on the base sequence, a cyclic shift, an orthogonal code (or an orthogonal cover code) to an assigned radio resource, and transmits the same to a T/R point indicated by the PUCCH-coupled reference signal ID $n_{ID}^{RS}$, for example, the RRH 112, in operation S530. In a case of an uplink DM-RS coupled with a PUCCH, the UE 120 may transmit an uplink DM-RS through a maximum of three symbols in each slot.

The UE 120 transmits the PUCCH in a frequency band identical to a band assigned to the uplink DM-RS coupled with the PUCCH, in operation S540. Only the RRH 112, which is the T/R point capable of receiving the DM-RS from among the T/R points, may receive the PUCCH using the received DM-RS.

Hereinafter, the process of generating an SRS described in operation S520 will be described in detail.

An SRS sequence is generated using a length ($M_{sc}^{RS}$=the number of RBs used X the number of subcarriers in an RB (in general, 12)/2) that is based on a resource block used for SRS transmission, after executing Cyclic Shift (CS) on a base sequence $\bar{r}_{u,v}(n)$ that is based on a Zadoff-Chu sequence, as shown in Equations 1 and 2.

$$r_{SRS}^{(p)}(n) = r_{u,v}^{(\alpha_p)}(n) \qquad \text{[Equation 1]}$$

$$\underbrace{r_{u,v}^{(\alpha_p)}(n)}_{\text{Reference Signal (RS)}} = \underbrace{e^{j\alpha_p n}}_{\text{Cyclic Shift (CS)}} \underbrace{\bar{r}_{u,v}(n)}_{\text{Base Sequence}}, \qquad \text{[Equation 2]}$$

$$\begin{cases} 0 \le n < M_{sc}^{RS} \\ M_{sc}^{RS} = mN_{sc}^{RB} \\ 1 \le m < N_{RB}^{max,UL} \\ \quad \text{Number of subcarriers} \\ M_{sc}^{RS}: \text{ allowed to frequency axis} \\ \quad \text{for } GL \text{ } RS \text{ sequences} \end{cases}$$

A base sequence may be generated to be different based on a sequence group number u, a base sequence number v in a group, and a length n of a sequence.

Sequence group hopping may be executed based on 30 sequence groups for each slot, irrespective of the number of RBs assigned to a UE.

In particular, the sequence group number u in a slot $n_s$ may be determined by the following Equation 3, based on a group hopping pattern $f_{gh}(n_s)$ and a sequence shift pattern $f_{ss}$.

$$u = (f_{gh}(n_s) + f_{ss}) \bmod 30 \qquad \text{[Equation 3]}$$

A PUCCH and a PUSCH may have an identical sequence group hopping pattern $f_{gh}(n_s)$, but may have different sequence shift patterns $f_{SS}$.

The group hopping pattern $f_{gh}(n_s)$ may be given by Equation 4, for the PUSCH and the PUCCH.

$$f_{gh}(n_s) = \begin{cases} 0 & \text{if group hopping is disabled} \\ \left( \sum_{i=0}^{7} c(8n_s + i) \cdot 2^i \right) \bmod 30 & \text{if group hopping is enabled} \end{cases} \qquad \text{[Equation 4]}$$

c(i) is a pseudo-random sequence, and is initialized to $$c_{init} = \left\lfloor \frac{n_{ID}^{RS}}{30} \right\rfloor$$

in each radio frame, using UE-specific configuration information $n_{ID}^{RS}$ when the UEs 120 receive a PUCCH-coupled reference signal ID $n_{ID}^{RS}$ from the eNB 110.

The definition of the sequence shift pattern $f_{ss}$ may be different between the PUCCH and the PUSCH. The sequence shift pattern for the PUCCH is given as $f_{ss}^{PUCHH} = n_{ID}^{RS} \mod 30$.

Sequence hopping may be applied only to reference signals having a length that is greater than or equal to 6RBs ($M_{sc}^{RS} \geq 6N_{sc}^{RS}$). A base sequence number v in a base sequence group is given as 0 for reference signals having a length that is less than 6RBs ($M_{sc}^{RS} < 6N_{sc}^{RS}$).

A base sequence number v in a base sequence group of a slot $n_s$ is given as Equation 5, for reference signals having a length that is greater than or equal to 6RBs ($M_{sc}^{RS} \geq 6N_{sc}^{RS}$).

$$v = \begin{cases} c(n_s) & \text{if group hopping is disabled} \\ & \text{and sequence hopping is enabled} \\ 0 & \text{otherwise} \end{cases} \quad \text{Equation 5}$$

c(i) is a pseudo-random sequence, and is initialized to $$c_{init} = \frac{n_{ID}^{RS}}{30} \cdot 2^3 + f_{ss}^{PUSCH}$$

in each radio frame.

A cyclic shift value $a_{\tilde{p}}$ may be generated to be different for each UE and for each antenna port, by Equation 6.

$$\alpha_{\tilde{p}} = 2\pi \frac{n_{SRS}^{cs,\tilde{p}}}{8} \quad \text{Equation 6}$$

$$n_{SRS}^{cs,\tilde{p}} = \left( n_{SRS}^{cs} + \frac{8\tilde{p}}{N_{ap}} \right) \mod 8$$

$$\tilde{p} \in \{0, 1, \ldots, N_{ap} - 1\}$$

In association with $n_{SRS}^{cs}$ used for calculating a cyclic shift value, a total of 8 values from 0 to 7 {0, 1, 2, 3, 4, 5, 6, 7} are transmitted to each UE through high layer signaling (for example, RRC), and a cyclic shift value for each antenna port may be determined based on a transmitted $n_{SRS}^{cs}$ value, as shown in Equation 6. In Equation 6, $\tilde{p}$ is an antenna port number index, and $N_{ap}$ corresponds to the number of SRS transmission antennas.

Figure 17:
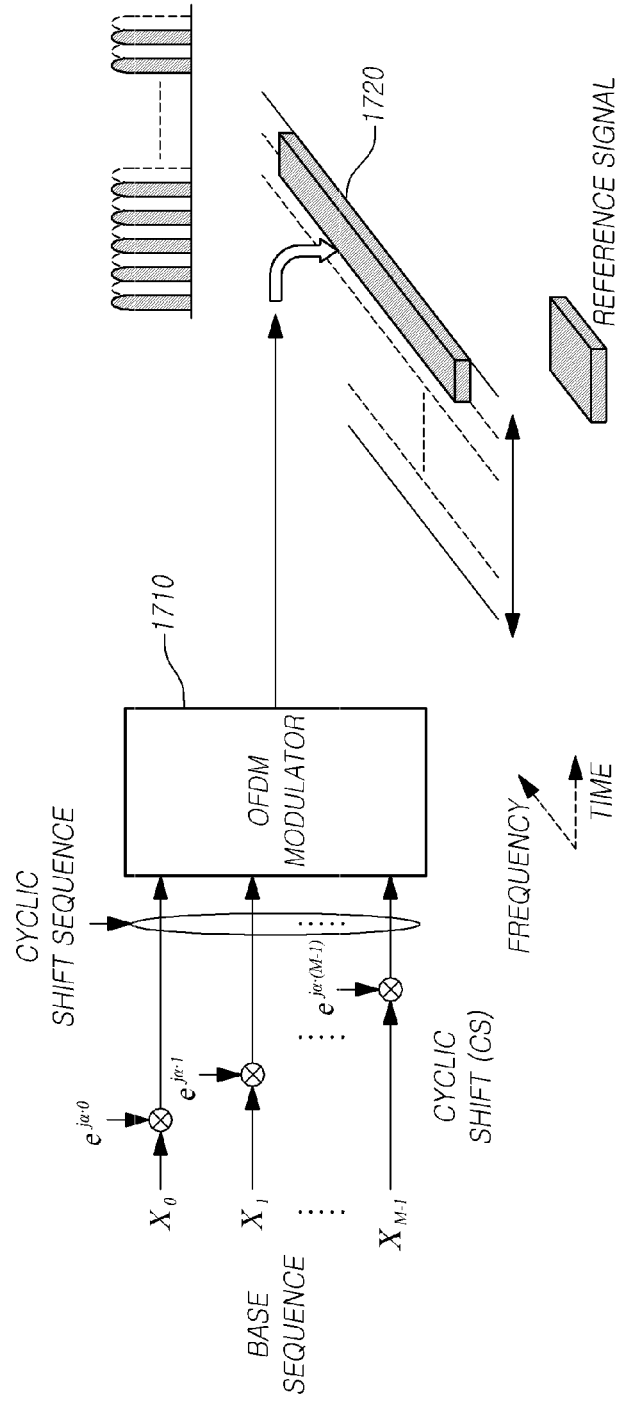
FIG. 17 illustrates transmission of an uplink SRS in a UE in FIG. 4.

In operation S520, an SRS sequence is generated by applying Equation 1 to the base sequence of Equation 2 and $a_{\tilde{p}}$ (Cyclic Shift (CS) value) of Equation 6. Operation S520 that generates the SRS sequence may be executed by an OFDM modulator 1710 of FIG. 17. The UE 120 allocates the SRS generated in operation S520 to a radio resource, and transmits the same to a T/R point indicated by $n_{ID}^{RS}$, for example, the RRH 112, in operation S550.

The DM-RS sequence generated by Equation 1 in operation S550, may be mapped to a corresponding symbol of a subframe. Operation S550 may be executed by a resource element mapper 1720 of FIG. 17.

Figure 18:
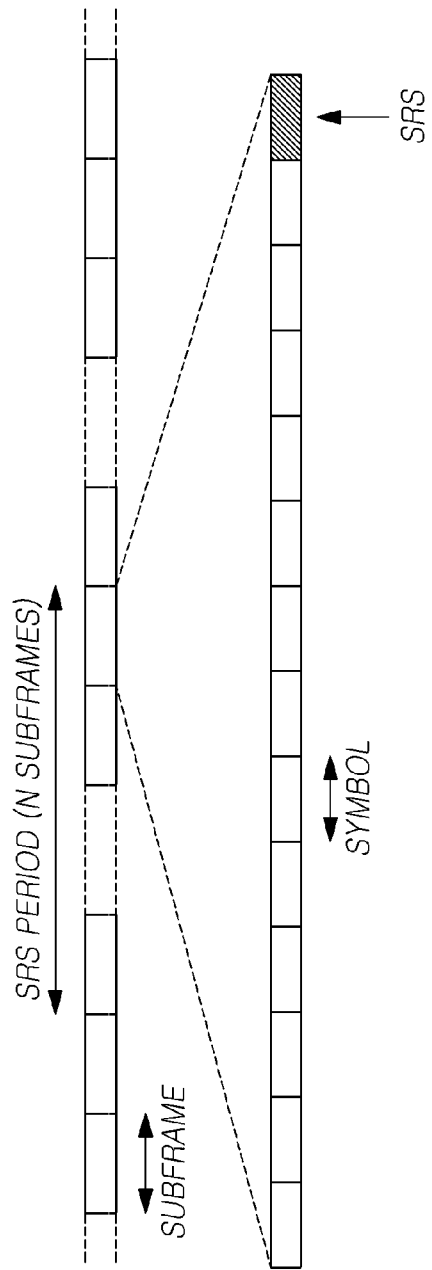
FIG. 18 illustrates a location of a symbol where an SRS is transmitted.
Figure 19:
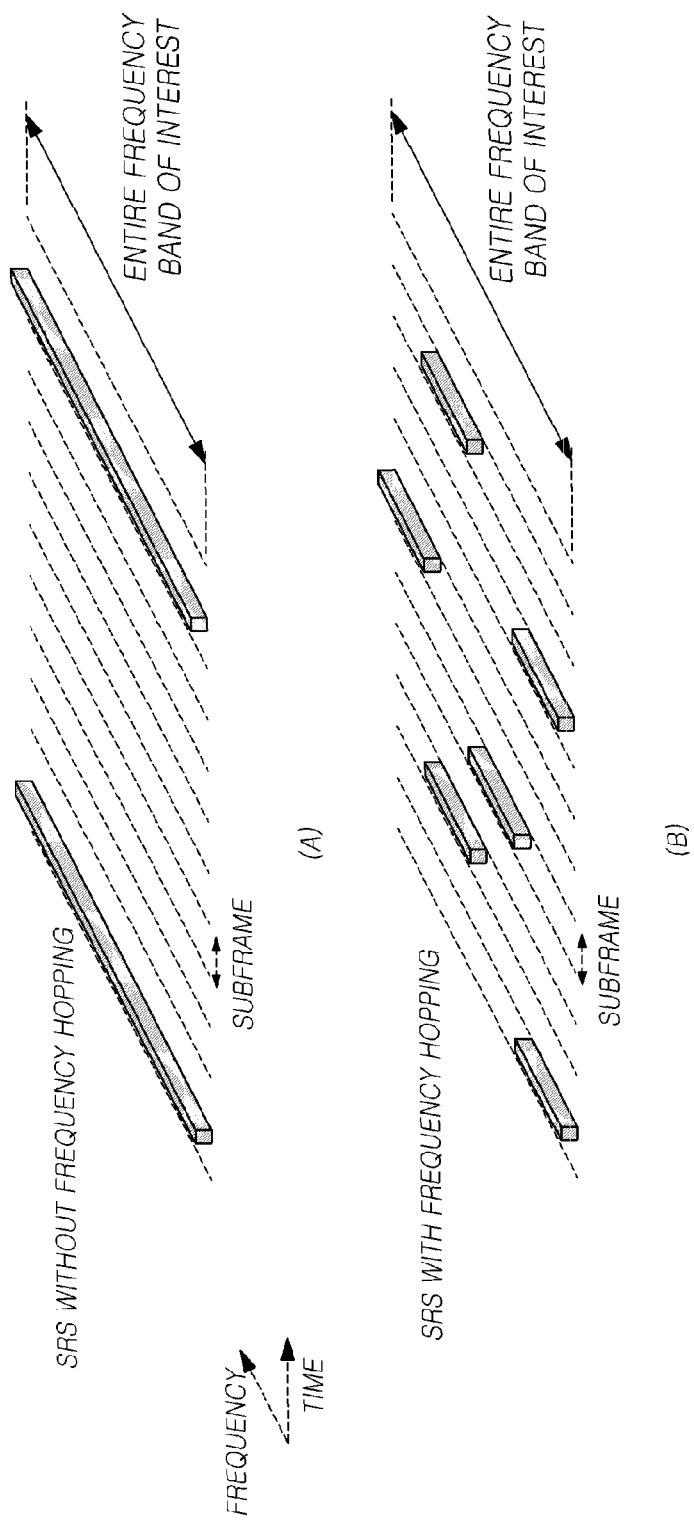
FIG. 19 illustrates an SRS without frequency hopping and an SRS with frequency hopping.

FIG. 18 illustrates a location of a symbol where an SRS is transmitted. FIG. 19 illustrates an SRS without frequency hopping and an SRS with frequency hopping.

Referring to FIG. 18 and FIG. 19, an SRS may be transmitted in the last symbol of a subframe. SRS transmission over a frequency domain needs to cover a frequency band of interest, for frequency domain scheduling. As illustrated in a diagram (A) of FIG. 19, sufficiently broad SRS transmission may be executed, so as to estimate the channel quality of the entire frequency band of interest through a single SRS transmission. Alternatively, as illustrated in a diagram (B) of FIG. 19, a narrow band SRS may be transmitted through hopping over a frequency domain and the SRS transmissions taken together may cover the entire frequency band of interest.

As described above, when an SRS is completely mapped to a resource element, an SC-FDMA symbol may be generated through an SC FDMA generator (not illustrated in FIG. 17) and an SRS signal may be transmitted to a T/R point.

A predetermined subframe for transmitting an SRS may be set to be periodic or aperiodic. For example, Table 1 (Frequency Division Duplex (FDD)) and Table 2 (Time Division Duplex (TDD)) show the cell-specific SRS transmission-enabled subframes for cell-specific SRS transmission. Among them, an SRS may be periodically transmitted in a subframe having a predetermined period and offset for each UE. The SRS may be referred to as a periodic SRS or a trigger type 0 SRS. Alternatively, the SRS may be transmitted in a predetermined subframe that is set aperiodically. The SRS may be referred to as an aperiodic SRS or a trigger type 1 SRS.

TABLE 1

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

TABLE 2

| srs-SubframeConfig | Binary | Configuration Period $T_{SFC}$ {subframes} | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |

TABLE 2-continued

| srs-SubframeConfig | Binary | Configuration Period $T_{SFC}$ (subframes) | Transmission offset $\Delta_{SFC}$ (subframes) |
|---|---|---|---|
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

Table 1 and Table 2 show a cell-specific SRS transmission-enabled subframe, defined in FDD (frame structure type 1) and TDD (frame structure type 2), by a period $T_{SFC}$ and an offset $\Delta_{SFC}$. As shown, the total number of possible events is 16 and this may be transmitted through 4-bit higher layer signaling (for example, RRC signaling). For example, when srs-SubframeConfig is 7 (0111) in Table 1, a period $T_{SFC}$ is 5 and an offset $\Delta_{SFC}$ is {0, 1}, which indicates that an SRS is transmitted in a first subframe and a second subframe in 5-subframe intervals.

A periodic SRS indicates an SRS that is transmitted periodically in a corresponding subframe, based on a predetermined period and offset for each UE, from among the cell-specific SRS transmission-enabled subframes.

The following Table 3 (FDD) and Table 4 (TDD) show a predetermined period and offset of a periodic SRS, defined for each UE.

TABLE 3

| SRS Configuration Index $I_{SRS}$ | SRS Periodicity $T_{SRS}$ {ms} | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 4

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |

TABLE 4-continued

| SRS Configuration Index $I_{SRS}$ | SRS Periodicity $T_{SRS}$ (ms) | SRS Subframe Offset $T_{offset}$ |
|---|---|---|
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-44 | 20 | $I_{SRS} - 25$ |
| 45-84 | 40 | $I_{SRS} - 45$ |
| 85-164 | 80 | $I_{SRS} - 85$ |
| 165-324 | 160 | $I_{SRS} - 165$ |
| 325-644 | 320 | $I_{SRS} - 325$ |
| 645-1023 | reserved | reserved |

In Table 3 and Table 4, a subframe for transmitting a UE-specific periodic SRS defined in FDD and TDD is expressed as a period $T_{SRS}$ and an offset $T_{offset}$. As shown, the total number of possible events is 1024 and this may be transmitted through 10-bit higher layer signaling (for example, RRC signaling). For example, when $I_{SRS}$ is 3 in Table 3, a period $T_{SRS}$ is 5 and an offset $T_{offset}$ is 1, which indicates that a periodic SRS for a UE is transmitted in a second subframe in 5-subframe intervals.

In addition, information on a Resource Block (RB) for transmitting an SRS may be signaled. First, the total number of used cell-specific RBs may be signaled. In this instance, the used RBs are predetermined RBs signaled among RBs corresponding to the entire system bandwidth (BW). For example, when a system BW is 50 RBs and the signaled RBs is 48 RBs, 48 RBs is used among the total of 50 RBs. Subsequently, among the used cell-specific RBs, the number and the locations of RBs used for each UE, may be signaled.

For example, Table 5 is used when a system BW is about 40 RBs to 60 RBs.

A different table may be defined based on a system BW. The total number of used cell-specific RBs may be transmitted as a parameter value named $C_{SRS}$. The number of used RBs for each UE from among the cell-specific RBs may be defined as a parameter named $B_{SRS}$. For example, when $C_{SRS}$ is 1 and $B_{SRS}$ is 2 in table 5, the total number $m_{SRS},0$ of cell-specific RBs used for the SRS transmission is 48 and the number $m_{SRS},2$ of RBs used for a predetermined UE is 8. Separately, a parameter named $n_{RRC}$ may be defined for expressing the location of an RB used for each UE. The parameters $C_{SRS}$, $B_{SRS}$, and $n_{RRC}$ may be transmitted through higher layer signaling (for example, RRC).

TABLE 5

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS, 0}$ | $N_0$ | $m_{SRS, 1}$ | $N_1$ | $m_{SRS, 2}$ | $N_2$ | $m_{SRS, 3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

In addition, information on a subcarrier allocated to an SRS may be signaled. Transmission comb($k_{TC}$) denotes the information on a subcarrier allocated to an SRS. Transmission comb($K_{TC}$) has a value of 0 or 1. The value of Transmission comb($K_{TC}$) indicates whether a subcarrier actually mapped to an SRS sequence for an SRS transmission subframe and an SRS transmission RB is an even subcarrier or an odd subcarrier. This may be also transmitted through higher layer signaling (for example, RRC signaling), for each UE.

To summarize, in order for a UE to transmit a periodic SRS or a trigger type 0 SRS, a transmission end may transmit parameters for determining a subframe for transmitting an SRS (e.g., srs-SubframeConfig and $I_{SRS}$), parameters for determining an RB for transmitting an SRS (e.g., $C_{SRS}$, $B_{SRS}$, and $n_{RRC}$), and a parameter for determining a subcarrier allocated to an SRS (e.g, $k_{TC}$), a parameter for determining a cyclic shift of an SRS (e.g., $n_{SRS}^{cs}$), and the number of antenna ports to the UE through higher layer signaling such as RRC signaling. They are listed as shown in the following Table 6.

TABLE 6

| Srs-Subframe Config | $I_{SRS}$ | $C_{SRS}$ | $B_{SRS}$ | $n_{RRC}$ | $k_{TC}$ | $n_{SRS}^{cs}$ | Number of antenna ports |
|---|---|---|---|---|---|---|---|
| Designated through higher layer signaling (RRC) ||||||||

An SRS may be transmitted in a predetermined subframe that is set aperiodically from among the cell-specific SRS transmission-enabled subframes determined in Table 1 or Table 2, and this may be referred to as an aperiodic SRS or a trigger type 1 SRS.

In this instance, an SRS may be transmitted aperiodically in a predetermined subframe based on a predetermined period and offset, defined for each UE, as shown in Table 7 (FDD) or Table 8 (TDD), from among cell-specific SRS transmission-enabled subframes determined in Table 1 or Table 2. Here, the aperiodic SRS transmission indicates that SRS transmission is triggered through dynamic signaling such as a DCI, when a few possible occasions are set in advance and the SRS transmission is required. As described above, in a case of the periodic (trigger type 0) SRS, various signaling information for the SRS transmission, for example, information on an SRS transmission subframe, an SRS transmission RB, a subcarrier allocated to an SRS, a cyclic shift value for generating an SRS sequence, the number of SRS transmission antennas, and the like, are directly transmitted through higher layer signaling (RRC signaling). Conversely, in a case of the aperiodic (trigger type 1) SRS, a part of the signaling information for the SRS transmission is not directly transferred. A parameter set is designated for the partial information through higher layer signaling (RRC signaling), and when SRS transmission is needed, only a value indicating the parameter set is signaled through dynamic signaling such as a DCI.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-31 | reserved | reserved |

TABLE 8

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-31 | reserved | reserved |

In a case of the aperiodic SRS or the trigger type 1 SRS, parameters may include $I_{SRS}$ (a parameter for determining an SRS transmission subframe), $B_{SRS}$ and $n_{RRC}$ (parameters for determining an SRS transmission RB), $k_{TC}$ (a parameter used for determining a subcarrier allocated to an SRS), $n_{SRS}^{cs}$ (a parameter for determining a cyclic shift of an SRS), and the number of antenna ports. However, srs-SubframeConfig and $C_{SRS}$ may not be included in the parameters. They are listed as shown in the following Table 9.

TABLE 9

| Srs-Subframe Config | $C_{SRS}$ | $I_{SRS}$ | $B_{SRS}$ | $n_{RRC}$ | $k_{TC}$ | $n_{SRS}^{cs}$ | Number of antenna ports |
|---|---|---|---|---|---|---|---|
| Designated through higher layer signaling (RRC) | Designate a parameter set through higher layer signaling (RRC) and indicate a parameter set through dynamic signaling (DCI) |||||||

In a case of DCI format 0, a signal triggering an aperiodic SRS is 1 bit and a value transmitted through the same may be as shown in the following Table 10. In a case of DCI format 4, a signal triggering an aperiodic SRS is 2 bits and a value transmitted through the same may be as shown in the following Table 11.

TABLE 10

| Value of SRS request field (1 bit case) | Description |
|---|---|
| '0' | No type 1 SRS trigger |
| '1' | The 1$^{st}$ SRS parameter set configured by higher layers |

TABLE 11

| Value of SRS request field (1 bits case) | Description |
|---|---|
| '00' | No type 1 SRS trigger |
| '01' | The 1$^{st}$ SRS parameter set configured by higher layers |
| '10' | The 2$^{nd}$ SRS parameter set configured by higher layers |
| '11' | The 3$^{rd}$ SRS parameter set configured by higher layers |

For example, in a case of DCI format 4, when a value of an SRS request field is '00', an aperiodic SRS or a type 1 SRS is not transmitted, and when a value of an SRS request field is '01', '10' or '11', an aperiodic SRS or a type 1 SRS is transmitted based on one of the parameters, set through higher layer signaling (RRC signaling).

According to a scheme of coupling both a periodic SRS and an aperiodic SRS with a PUCCH and executing transmission, in an SRS transmission method according to the first embodiment, an uplink channel state with a T/R point, different from a serving T/R point, may be measured through transmission of a periodic and an aperiodic SRS that are coupled with a PUCCH. Thus, the method may overcome the coverage shortage of an uplink.

In addition, a TDD system uses uplink channel quality measurement and channel reciprocity associated with a serving T/R point and another T/R point. Such a TDD system may measure downlink channel quality of the serving T/R point and another T/R point, independently. In addition, the location or geometry of a UE may be recognized through an SRS. Thus, when the UE is located at an edge or the center of a cell, the UE may use a UE-specific downlink transmission method for downlink transmission and may improve data throughput in downlink.

As described, in the first embodiment, if a reception point is set to be different from a serving T/R point, an SRS is transmitted through an uplink to a T/R point different from the serving T/R point without distinguishing a periodic SRS and an aperiodic SRS through configuration of a UE-specific PUCCH sequence and a PUCCH reference signal sequence when generating a sequence for transmitting a PUCCH and a PUCCH reference signal. However, as described above with reference to FIG. 10 and FIG. 11, only an aperiodic SRS may be coupled and transmitted with a PUCCH in the first embodiment.

In this instance, a periodic SRS may be transmitted through a serving T/R point where a UE belong to, and an aperiodic SRS may be transmitted based on the configuration of a sequence used by a PUCCH, so that the PUCCH and the aperiodic SRS are transmitted to an identical target T/R point in an uplink.

In other words, an aperiodic SRS is generated based on a PUCCH-coupled reference signal ID $n_{ID}^{RS}$ in Equations 1 to 6, and the generated SRS is transmitted to a T/R point, for example, the RRH 112, indicated by the PUCCH-coupled reference signal ID $n_{ID}^{RS}$. A periodic SRS is generated based on a cell ID $N_{ID}^{cell}$ of a serving T/R point, for example, an eNB 110, in Equations 1 to 6, and the generated SRS may be transmitted to the serving T/R point.

Accordingly, through aperiodic SRS transmission triggered from a base station, uplink channel quality with a T/R point that is different from a serving T/R point may be measured and thus, the coverage shortage of an uplink may be overcome.

In addition, a TDD system uses uplink channel quality measurement and channel reciprocity associated with a serving T/R point and another T/R point. The TDD system may measure downlink channel quality of the serving T/R point and another T/R point, independently. In addition, the location or geometry of a UE may be recognized through an SRS and thus, when the UE is located at an edge or the center of a cell, the UE may use a UE-specific downlink transmission method for downlink transmission and may improve data throughput in downlink.

Conversely, although not illustrated, the aperiodic SRS is transmitted through a serving T/R point that serves a UE, and the periodic SRS is transmitted based on the configuration of a sequence used by a PUCCH so that the PUCCH and the periodic SRS are transmitted to an identical target T/R point in an uplink.

Second Embodiment: Coupling with PUSCH

Hereinafter, the second embodiment will be described. In the second embodiment, a part or the entirety of an SRS is coupled and transmitted with a PUSCH.

Figure 12:
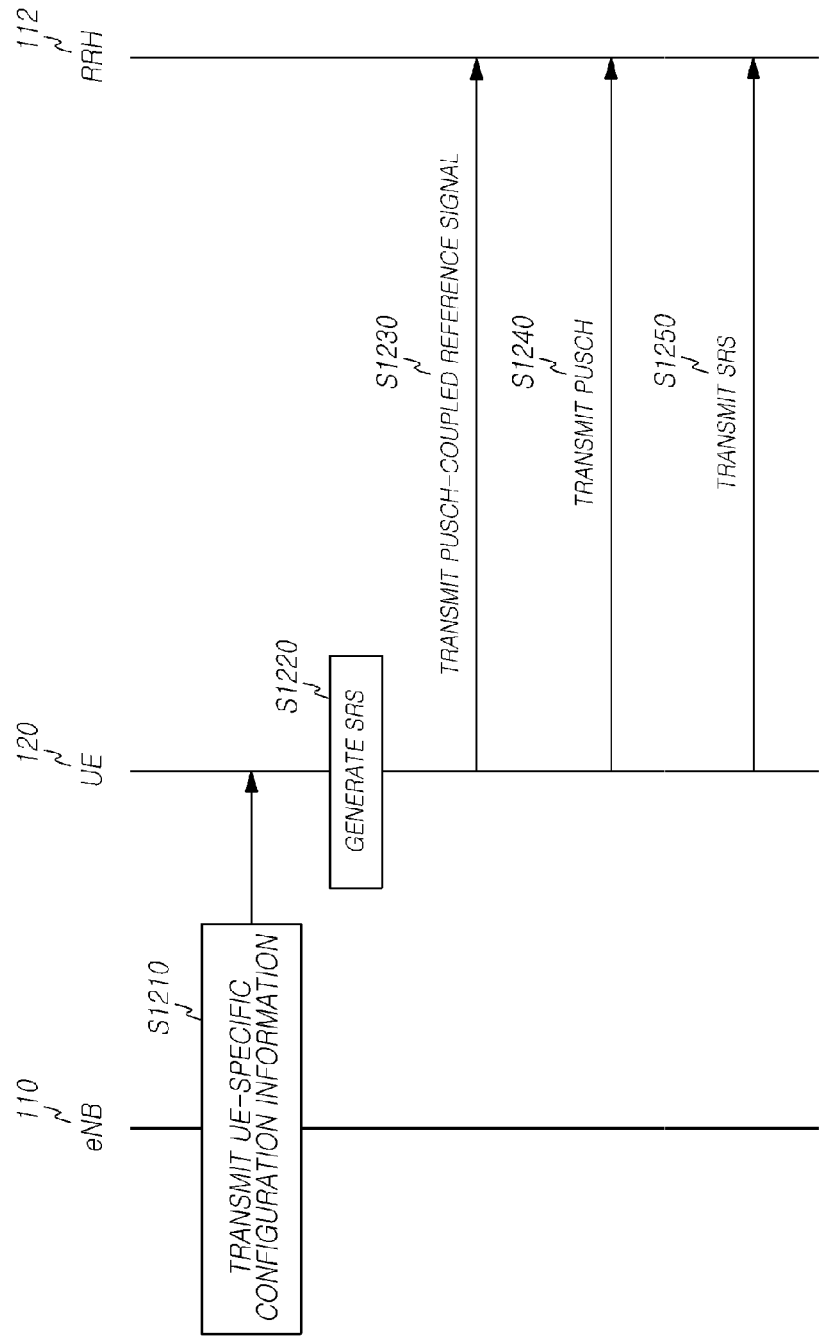
FIG. 12 is a flowchart illustrating an SRS transmission method when a physical uplink channel is a PUSCH in the SRS transmission method of FIG. 4.

FIG. 12 is a flowchart illustrating an SRS transmission method when a physical uplink channel is a PUSCH in the SRS transmission method of FIG. 4. In the same manner as FIG. 5, the SRS transmission method of FIG. 12 includes each operation of the uplink reference signal transmission method of FIG. 4.

Referring to FIG. 12, the SRS transmission method according to another embodiment includes receiving, from one T/R point 110 among two or more different T/R points, UE-specific configuration information indicating an uplink reference signal ID, which is independent from a cell ID of the one T/R point 110 and is coupled with a PUSCH, in operation S1210, generating a part or the entirety of an SRS using the uplink reference signal ID in operation S1220, transmitting a reference signal coupled with a PUSCH to the T/R point 112 indicated by the uplink reference signal ID in operation S1230, transmitting the PUSCH to the T/R point 112 indicated by the uplink reference signal ID in operation S1240, and transmitting the generated SRS to the T/R point 112 indicated by the uplink reference signal ID in operation S1250. Here, operation S1230 and operation S1240 may be simultaneously executed. In addition, an SRS and a PUSCH may be transmitted simultaneously in a single subframe, and all of an SRS, a PUSCH, and a PUCCH may be transmitted simultaneously in a single subframe.

According to the second embodiment of FIG. 12, when a reception point for a PUSCH is set to a T/R point different from a serving T/R point where a UE belongs, that is, when performing uplink transmission to a T/R point different from the serving point through configuration of a UE-specific PUSCH sequence and a PUSCH-coupled reference signal sequence in generation of the sequence for transmitting a PUSCH and a reference signal coupled with the PUSCH, a corresponding aperiodic or periodic SRS may follow the configuration of the sequence used for the PUSCH and the reference signal coupled with the PUSCH. Thus, the PUSCH and the SRS are transmitted to an identical target T/R point through uplink.

In this instance, transmission targets of a PUSCH and a periodic or aperiodic SRS are the same. Thus, when the transmission targets of a PUSCH and a PUCCH are the same, SRS transmission described with reference to FIG. 6 and FIG. 7 of the first embodiment may be applied to the second embodiment.

FIG. 13 to FIG. 16 are diagrams illustrating various embodiments for coupling and transmitting a periodic or aperiodic SRS with a PUSCH according to the SRS transmission method of FIG. 12, excluding the above described SRS transmission of FIG. 6 and FIG. 7.

Figure 13:
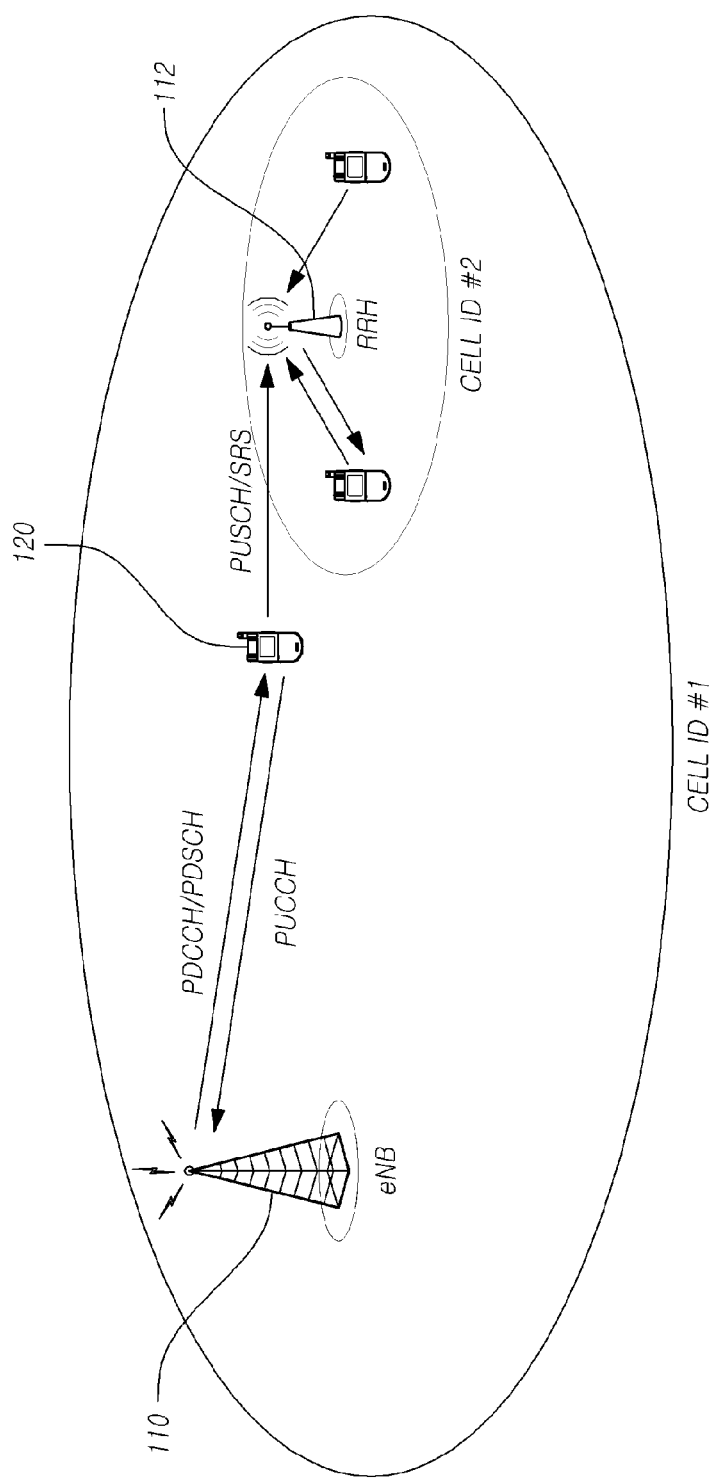
FIG. 13 illustrates transmission of an SRS coupled with a PUSCH in a CoMP system where T/R points use different cell IDs (Cell ID#1 and Cell ID #2)

Referring to FIG. 13, an SRS is coupled and transmitted with a PUSCH and is transmitted in a CoMP system where T/R points use different cell IDs (Cell ID#1 and Cell ID #2).

Figure 14:
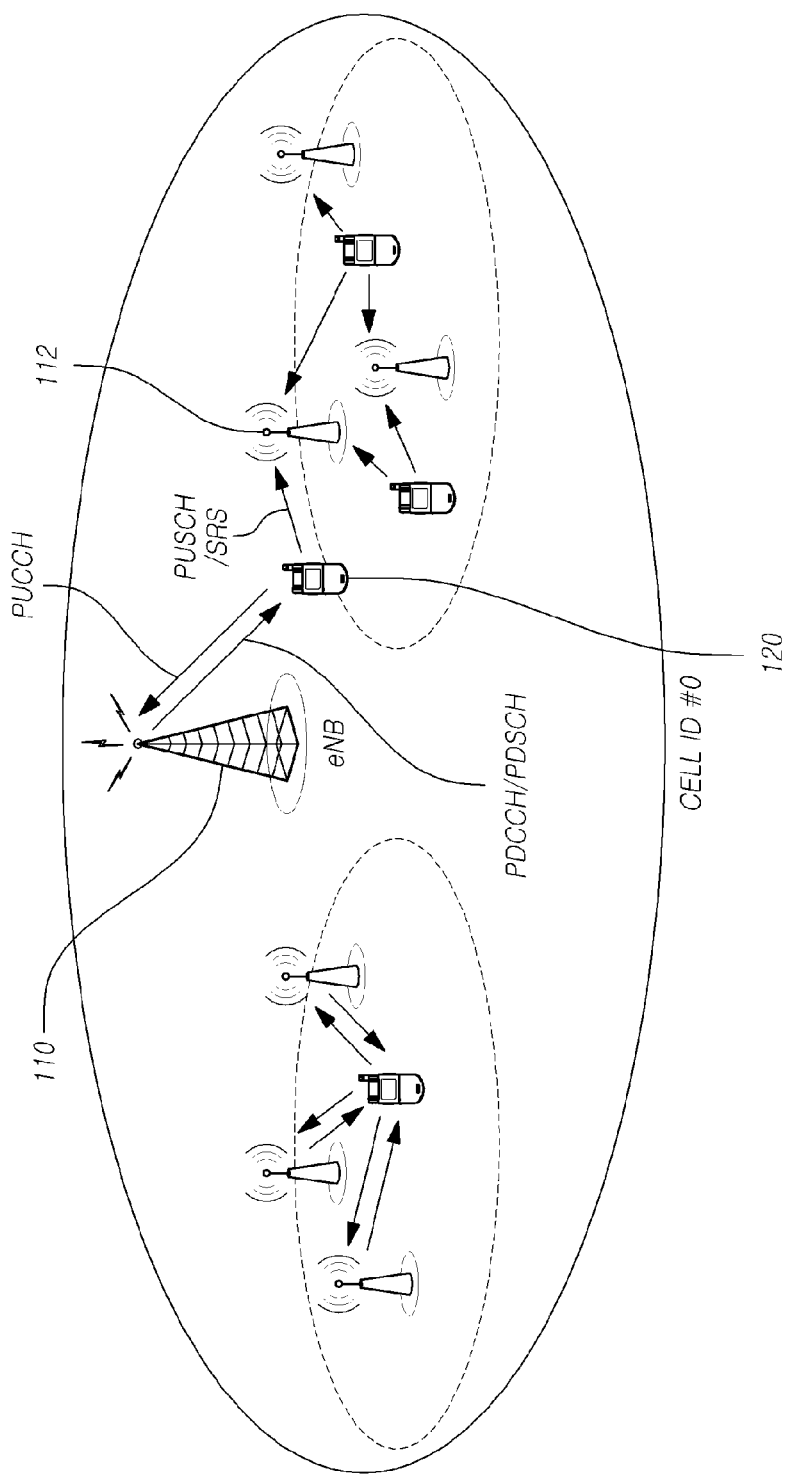
FIG. 14 illustrates transmission of an SRS coupled with a PUSCH in a CoMP system where T/R points use an identical cell ID (Cell ID #0)

Referring to FIG. 14, an SRS is coupled and transmitted with a PUSCH in a CoMP system where T/R points use an identical cell ID (Cell ID #0).

Referring to FIG. 13 and FIG. 14, a downlink control channel (e.g., PUCCH) and a data channel (e.g., PDSCH) may be received from the T/R 110 where the UE 120 belongs, and an uplink control channel (e.g., PUCCH) for transmitting ACK/NACK for downlink transmission, channel state information, or the like, from among uplink channels may be transmitted to the corresponding T/R point 110 where the UE belongs. An uplink data channel (e.g., PUSCH) and an SRS may be transmitted to the T/R point 112 that is different from the T/R point 110 where the UE belongs.

Figure 15:
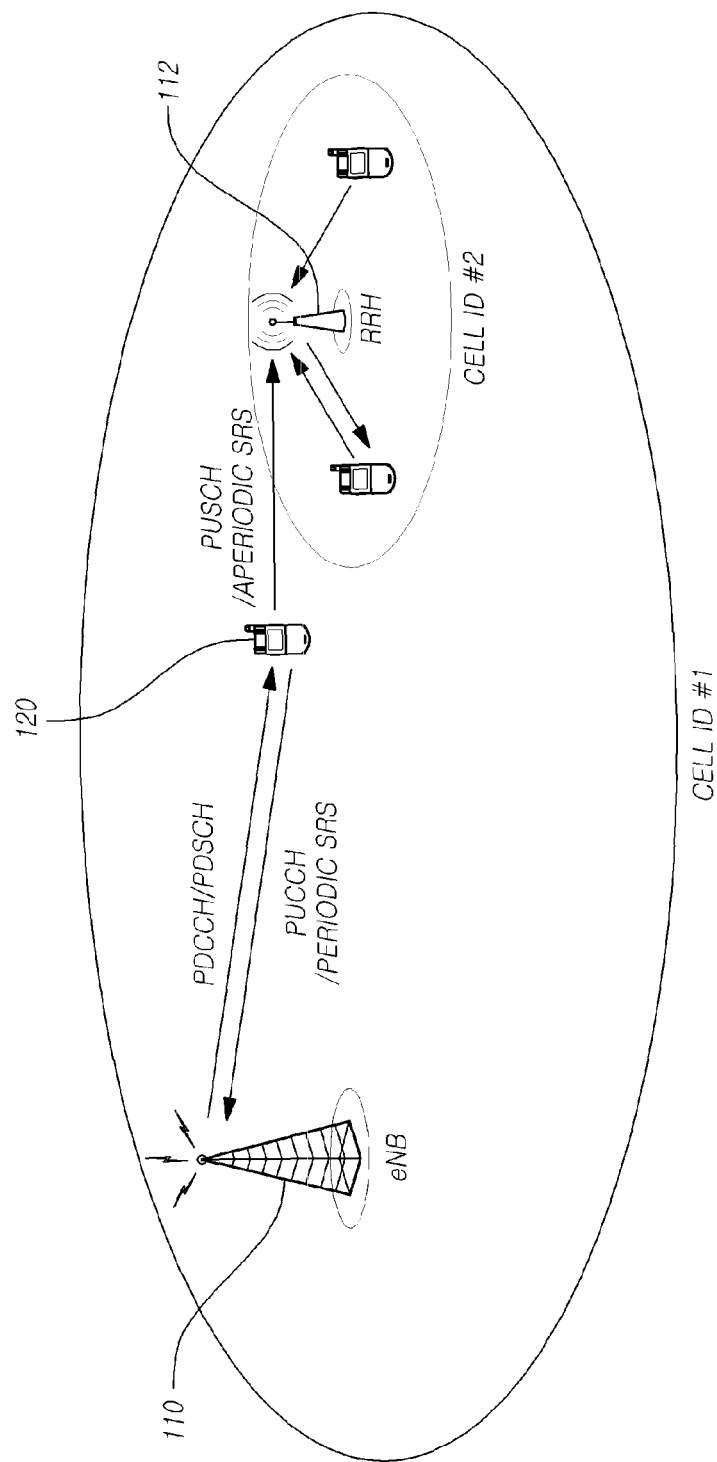
FIG. 15 illustrates transmission of only an aperiodic SRS coupled with a PUSCH in a CoMP system where T/R points use different cell IDs (Cell ID#1 and Cell ID #2)

Referring to FIG. 15, only an aperiodic SRS is coupled and transmitted with a PUSCH in a CoMP system where T/R points use different cell IDs (Cell ID#1 and Cell ID #2).

Figure 16:
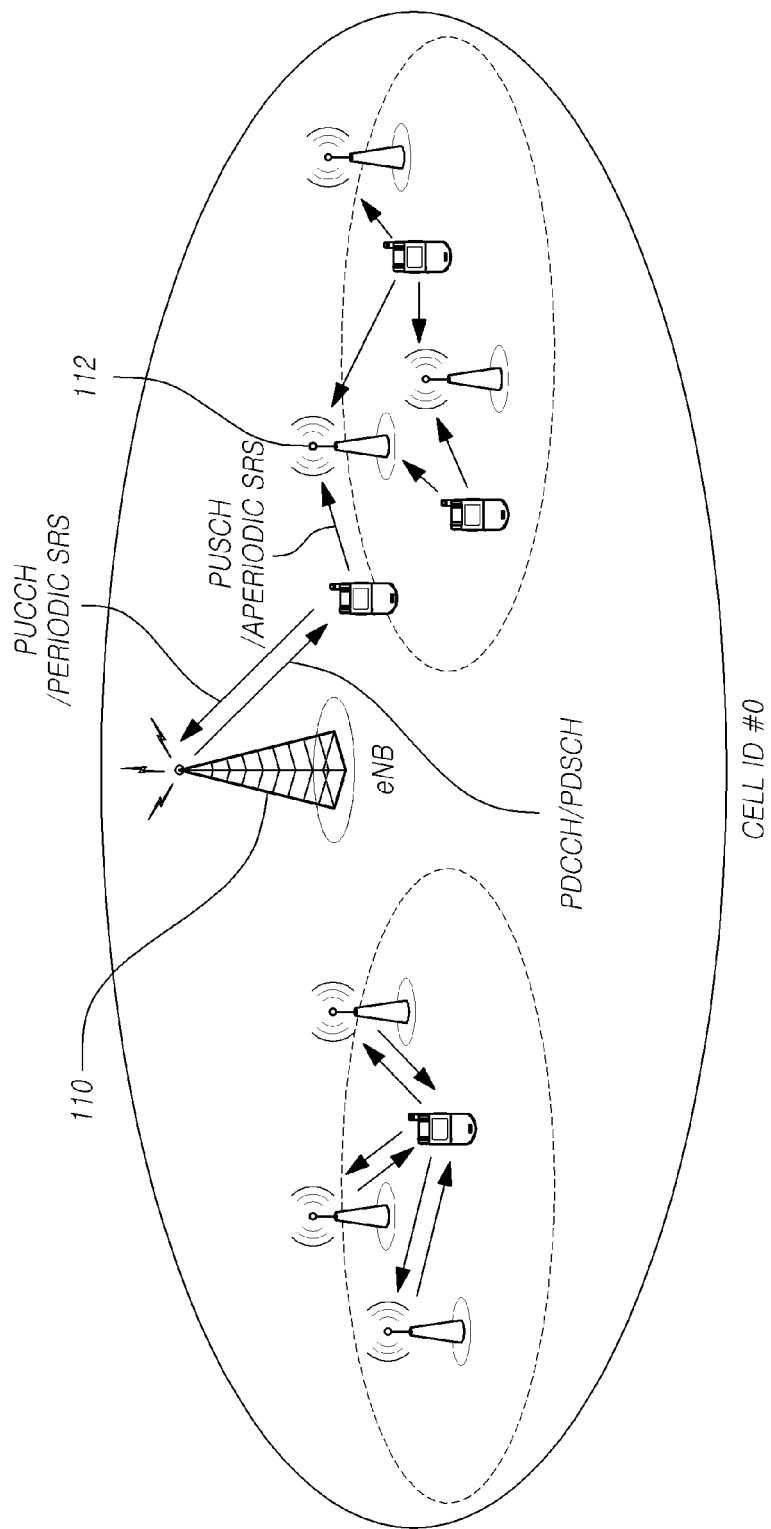
FIG. 16 illustrates transmission of only an aperiodic SRS coupled with a PUSCH in a CoMP system where T/R points use an identical cell ID (Cell ID #0)

Referring to FIG. 16, only an aperiodic SRS is coupled and transmitted with a PUSCH in a CoMP system where T/R points use an identical cell ID (Cell ID #0).

Referring to FIG. 15 and FIG. 16, a downlink control channel (e.g., PDSCH) and a data channel (e.g., PDSCH) may be received from the T/R 110 where the UE 120 belongs, an uplink control channel (e.g., PUSCH) for transmitting ACK/NACK for downlink transmission, channel state information, or the like from among uplink channels and a periodic SRS may be transmitted to the corresponding T/R point 110 where the UE belongs. An uplink data channel (e.g., PUSCH) and an aperiodic SRS may be transmitted to the T/R point 112 that is different from the T/R point 110 where the UE belongs.

Hereinafter, each operation of the SRS transmission method of FIG. 12 will be described in detail based on description of FIG. 13 and FIG. 14 where both a periodic and an aperiodic SRS are coupled with a PUSCH. However, descriptions of features or functions same as the first embodiment will be omitted or briefly described.

Referring again to FIG. 12, the eNB 110 is one of the T/R points and transmits UE-specific configuration information to the UE 120 belonging to the eNB 110, in operation S1210. In S1210, the UE 120 receives the UE-specific configuration information.

The UE-specific configuration information includes a UE-specific parameter that sets, as UE-specific, the UE 120 that belongs to the eNB 110. For example, the UE-specific configuration information may include a UE-specific parameter indicating a PUSCH-coupled reference signal ID that sets a PUSCH sequence and a PUSCH-coupled reference signal sequence to be specific to a UE. The UE-specific parameter indicates the PUSCH-coupled reference signal ID and the UE-specific parameter may be distinguished from a cell-specific parameter that indicates a cell ID $N_{ID}^{cell}$ of a cell where the UE 110 belongs.

The UE-specific configuration information may include a UE-specific parameter that indicates a PUCCH-coupled reference signal ID $n_{ID}^{RS}$ that sets a PUCCH sequence and a PUCCH-coupled reference signal sequence to be specific to a UE, as described with reference to FIG. 5.

In this instance, a PUSCH and a PUCCH may be transmitted to an identical T/R point through an uplink, or a PUSCH and a PUCCH may be transmitted to different T/R points through an uplink. In the former case, the PUSCH-coupled reference signal ID and the PUCCH-coupled reference signal ID may be identical to $n_{ID}^{RS}$. In the latter case, the PUSCH-coupled reference signal ID and the PUCCH-coupled reference signal ID may be different from each other. Since PUSCH transmission and PUCCH transmission may be independent from one another and thus, the PUSCH-coupled reference signal ID may be expressed by $n_{ID}^{RS'}$ in the second embodiment. In the present specification, "independently," "independent," or "independency" may indicate that an uplink reference signal ID is designated by a T/R point independently (separately) from a cell ID, which may be identical to the cell ID or may be different from the cell ID.

The eNB 110 may dynamically transmit the UE-specific configuration information including the UE-specific parameter that indicates the PUSCH-coupled reference signal ID $n_{ID}^{RS'}$, to the UE 120 through a PDCCH/EPDCCH, or may semi-statistically set the same through higher layer, for example, RRC, or may set the same in advance through RRC and indicates whether to use the setting through a PDCCH/EPDCCH.

The UE 120 may generate a reference signal coupled with a PUSCH using the UE-specific configuration information including the PUCCH-coupled reference signal ID $n_{ID}^{RS'}$, for example, a base sequence $\bar{r}_{u,v}(n)$ of a DM-RS. The base sequence may be generated to be different based on a sequence group number u and a base sequence number v in a group. To determine the sequence group number u and the base sequence number v in a group, the PUSCH-coupled reference signal ID $n_{ID}^{RS'}$ may be used as opposed to a cell ID $N_{ID}^{cell}$ of a serving cell.

In addition, the UE 120 may generate an SRS using the UE-specific configuration information including the PUSCH-coupled reference signal ID $n_{ID}^{RS'}$ in operation S1220. Operation S1220 is substantially the same as operation S520 of the first embodiment that has been described with reference to FIG. 5, excluding that an SRS is generated using the PUSCH-coupled reference signal ID $n_{ID}^{RS'}$ in Equations 1 to 6.

The UE 120 allocates a DM-RS generated based on the base sequence, a cyclic shift, an orthogonal code (or an orthogonal cover code) to an assigned radio resource, and transmits the same to a T/R point indicated by the PUSCH-coupled reference signal ID $n_{ID}^{RS'}$, for example, the RRH 112, in operation S1230. In a case of an uplink DM-RS coupled with a PUSCH, the UE 120 may transmit an uplink DM-RS through a single symbol in each slot.

In addition, the UE 120 transmits the PUSCH in a frequency band identical to a band assigned to the uplink DM-RS coupled with the PUSCH, in operation S1240.

In operation S1220, an SRS sequence is generated through Equation 1 using the base sequence of Equation 2 and $a_p$ (Cyclic Shift (CS) value) of Equation 6. Operation S1220 for generating the SRS sequence may be executed by the OFDM modulator 1710 of FIG. 17.

The UE 120 allocates the SRS generated in operation S1240 to a radio resource, and transmits the same to a T/R point indicated by $n_{ID}^{RS'}$, for example, the RRH 112, in operation S1250.

A DM-RS sequence generated by Equation 1 in operation S1250, may be mapped to a corresponding symbol of a subframe. Operation S1250 may be executed by the resource element mapper 1720 of FIG. 17.

Referring to FIG. 18 and FIG. 19, an SRS may be transmitted in the last symbol of a subframe. Sufficiently broad SRS transmission may be executed, so as to estimate the channel quality of the entire frequency band of interest through a single SRS transmission, or a narrow band SRS may be transmitted through hopping over a frequency domain and the SRS transmissions taken together may cover the entire frequency band of interest.

As described above, when an SRS is completely mapped to a resource element, an SC-FDMA symbol may be generated through an SC FDMA generator (not illustrated in FIG. 17) and an SRS signal may be transmitted to a T/R point.

As described, in the second embodiment, a reception point for a PUSCH is set to a T/R point different from a serving T/R point and, an SRS is transmitted to the different T/R point in an uplink without distinguishing a periodic SRS and an aperiodic SRS, through the configuration of a UE-specific PUSCH sequence and a PUSCH reference signal sequence when generating the sequence for transmission of a PUSCH and a PUSCH reference signal. However, as described with reference to FIG. 15 and FIG. 16, only an aperiodic SRS may be coupled and transmitted with a PUSCH in the second embodiment.

In this instance, a periodic SRS and an aperiodic SRS are distinguished. For example, a periodic SRS may be transmitted through a serving T/R point that serves a UE, and an aperiodic SRS may be transmitted based on the configuration of a sequence used by a PUSCH so that the PUSCH and the aperiodic SRS are transmitted to an identical target T/R point in an uplink.

In other words, an aperiodic SRS is generated based on a PUSCH-coupled reference signal ID $n_{ID}^{RS'}$ in Equations 1 to 6, and the generated SRS is transmitted to a T/R point, for example, the RRH 112, indicated by the PUSCH-coupled reference signal ID $n_{ID}^{RS'}$. A periodic SRS is generated based on a cell ID $N_{ID}^{cell}$ of a serving T/R point, for example, an eNB 110, in Equations 1 to 6, and the generated SRS may be transmitted to the serving T/R point.

Accordingly, through aperiodic SRS transmission triggered from a base station, uplink channel state with a T/R point different from a serving T/R point may be measured and thus, the coverage shortage of an uplink may be overcome.

Conversely, although not illustrated, the aperiodic SRS may be transmitted through a serving T/R point that serves a UE, and the periodic SRS may be transmitted based on the configuration of a sequence used by a PUSCH so that the PUSCH and the periodic SRS are transmitted to an identical target T/R point in an uplink.

As described in the first embodiment and the second embodiment, when a reception point is set to a T/R point different from a serving T/R point, a periodic SRS or an aperiodic SRS are transmitted based on the configuration of the sequence used by a PUCCH and a reference signal coupled with the PUCCH so that the PUCCH and an SRS are transmitted to an identical T/R point in an uplink, or a periodic SRS or an aperiodic SRS are transmitted based on the configuration of the sequence used by a PUSCH and a reference signal coupled with the PUSCH so that the PUSCH and an SRS are transmitted to an identical T/R point in an uplink. However, the embodiments of the present disclosure are not limited thereto.

Third Embodiment: Independent Configuration

According to a third embodiment which is distinguished from the first and second embodiments, when a sequence group index and a sequence index of an SRS sequence for generating a corresponding SRS is generated for aperiodic or periodic SRS transmission, the sequence group index and the sequence index may not be drawn from a PUCCH sequence group index or a PUSCH sequence index that is based on a cell ID of a serving cell. A sequence may be generated independently from the corresponding PUCCH and PUSCH sequence. To this end, SRS sequences may be additionally included in an RRC configuration parameter, or a predetermined parameter defined in advance through a dynamically transmitted PDCCH or an RRC parameter may be dynamically indicated through 1 bit through a PDCCH.

In particular, a PUSCH and a reference signal coupled with the PUSCH are independent from a PUCCH and a reference signal coupled with the PUCCH. A sequence independent from a PUCCH sequence and a PUSCH sequence may be generated as an SRS sequence, and the SRS sequence may be transmitted to a T/R point in an uplink, independently from them.

For example, the PUCCH-coupled reference signal ID is $n_{ID}^{RS}$ and the PUSCH-coupled reference signal ID is $n_{ID}^{RS'}$, and an SRS ID may be $n_{ID}^{RS}$, which is independent from them. Therefore, an SRS may be generated using the SRS ID $n_{ID}^{SRS}$ in Equations 1 to 6, and the generated SRS may be transmitted to a T/R point indicated by $n_{ID}^{SRS}$, for example, the RRH 112. As a matter of course, $n_{ID}^{RS}$ or $n_{ID}^{RS'}$, and $n_{ID}^{SRS}$ should not have to designate a T/R point different from a serving T/R point, but may designate the serving T/R point, for example, the eNB 110.

In this instance, when a UE executes blind decoding of a downlink control channel (e.g., a PDCCH) based on the configuration of a sequence of a corresponding SRS, a procedure for detection of a corresponding uplink grant is as follows.

When an indication for a related sequence index is included in a PDCCH or when an RRC parameter defined in advance through RRC is dynamically indicated using 1 bit, a UE may detect a DCI format 0 and a DCI format 4, which correspond to uplink grant including uplink scheduling information associated with the corresponding UE, from a UE dedicated search space, as opposed from a UE common search space, while detecting a PDCCH. Therefore, the UE may be set to always detect the uplink grant including related uplink scheduling information from the UE-dedicated search space, when executing a related operation.

Figure 20:
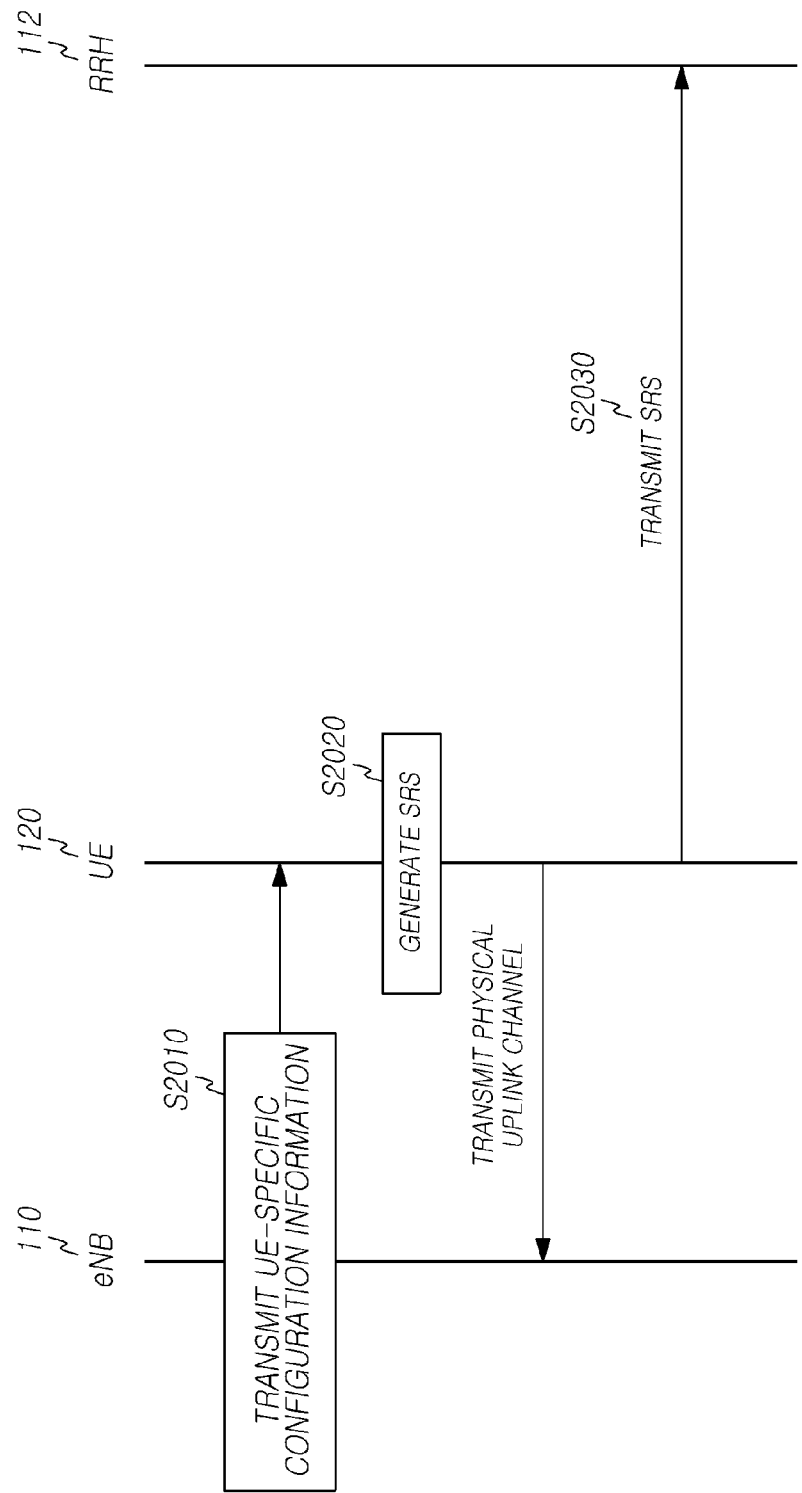
FIG. 20 is a flowchart illustrating an SRS transmission method according to another embodiment.

FIG. 20 is a flowchart illustrating an SRS transmission method according to another embodiment.

Referring to FIG. 20, the SRS transmission method according to another embodiment may include receiving a UE-specific parameter indicating an SRS ID, which is distinguished from an uplink reference signal ID for a physical uplink channel and is set independently, from one of two or more different T/R points, in operation S2010, generating at least one of a periodic SRS and an aperiodic SRS using the independently set SRS ID in operation S2020, and transmitting the generated SRS to a T/R point indicated by the independently set SRS ID in operation S2030.

According to the SRS transmission method of FIG. 20, the uplink reference signal ID for the physical uplink channel and the uplink reference signal ID for the SRS are set independently from one another. Thus, a transmission target of the physical uplink channel and a transmission target of the SRS may be different.

In the SRS transmission method of FIG. 20, the physical uplink may be at least one of a physical uplink data channel (hereinafter, a PUSCH) and a physical uplink control channel (hereinafter, a PUSCH).

In addition, in the SRS transmission method of FIG. 20, the SRS may be at least one of a periodic SRS and an aperiodic SRS.

Hereinafter, various examples of transmitting an SRS using the SRS transmission method according to another embodiment illustrated in FIG. 20, will be described with reference to FIG. 21 to FIG. 26.

Figure 21:
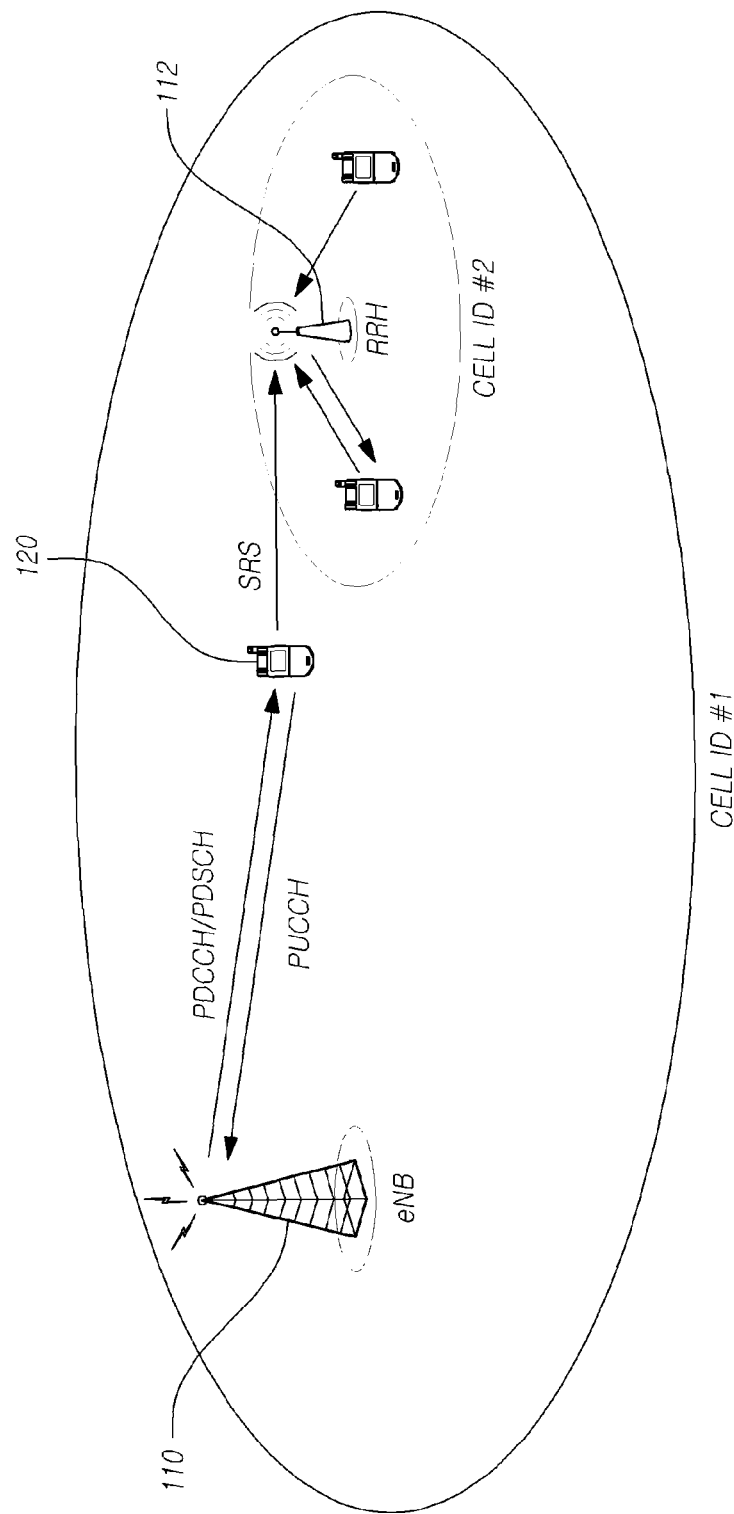
FIG. 21 illustrates independent transmission of a physical uplink channel and an SRS in a CoMP system where T/R points use different cell IDs (Cell ID#1 and Cell ID #2)

FIG. 21 illustrates independent transmission of a physical uplink channel and an SRS in a CoMP system where T/R points use different cell IDs (Cell ID#1 and Cell ID #2).

Figure 22:
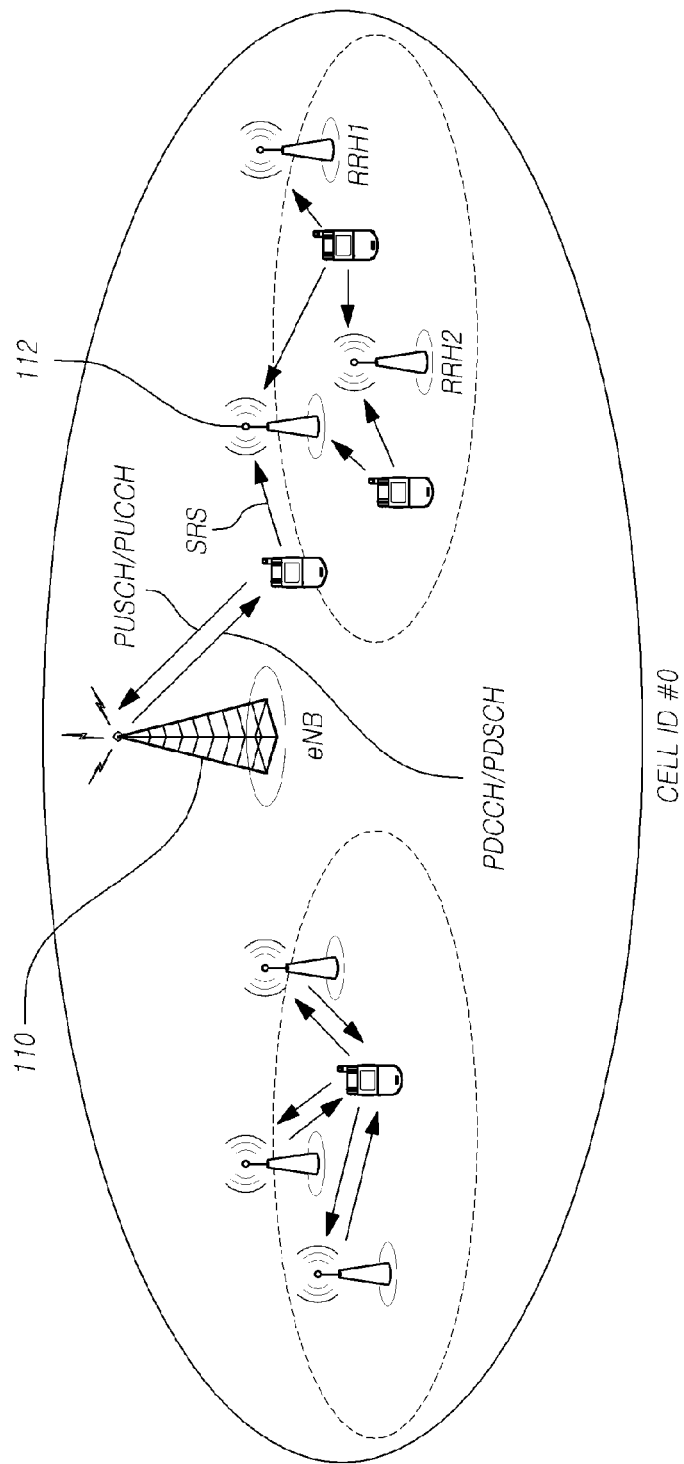
FIG. 22 illustrates independent transmission of a physical uplink channel and an SRS in a CoMP system where T/R points use an identical cell ID (Cell ID#0)

FIG. 22 illustrates independent transmission of a physical uplink channel and an SRS in a CoMP system where T/R points use an identical cell ID (Cell ID#0).

Referring to FIG. 21 and FIG. 22, an ID for generating an SRS is distinguished from an ID for a physical uplink reference signal and is set independently. Thus, a transmission target for the physical uplink cannel and a transmission target for the SRS are set independently and the physical uplink channel and the SRS may be transmitted to different targets. In this instance, although not illustrated, it is not necessary that the transmission target for the SRS and the transmission target for the physical uplink channel should be different. Such transmission targets for the SRS and the physical uplink channel may be identical. That is, each transmission target may be set independently.

According to the SRS transmission method of FIG. 21 and FIG. 22, a sequence for the SRS may be configured independently from a DM-RS associated with a PUCCH and a PUSCH. Thus, a TDD system uses uplink channel quality measurement and channel reciprocity of a serving T/R point and another T/R point and the TDD system may measure downlink quality of the serving T/R point and the other T/R point, independently. In addition, the location or geometry of a UE may be recognized through an SRS. Thus, when the UE is located at an edge or the center of a cell, the UE may use a UE-specific downlink transmission method for downlink transmission and may improve data throughput in downlink.

In FIG. 21 and FIG. 22, a transmission target for a periodic SRS and a transmission target for an aperiodic SRS are set to be identical. That is, a UE-specific parameter indicating an SRS ID may indicate an identical reference signal ID for the periodic SRS and the aperiodic SRS.

However, the embodiment of FIG. 20 is not limited to setting the transmission target for the periodic SRS and the transmission target for the aperiodic SRS identically, illustrated in FIG. 21 and FIG. 22.

The periodic SRS and the aperiodic SRS are generated from an SRS ID which is independent from a reference signal ID of a physical uplink channel. At the same time, the SRS IDs for each of the periodic SRS and the aperiodic SRS may be independent from one another.

For example, an SRS is generated using a periodic SRS ID $n_{ID}^{SRS}$ in Equations 1 to 6, the generated SRS is transmitted to a T/R point indicated by $n_{ID}^{SRS}$. An SRS is generated using an aperiodic SRS ID $n_{ID}^{SRS'}$ which is independent from the periodic SRS ID $n_{ID}^{SRS}$, and the generated SRS is transmitted to a T/R point indicated by $n_{ID}^{SRS'}$. As a matter of course, $n_{ID}^{SRS}$ and $n_{ID}^{SRS'}$ may independently execute designation, and should not have to designate a T/R point different from a serving T/R point, but may designate a serving T/R point, for example, the eNB 110.

In other words, a sequence for an SRS is configured independently from a PUCCH and a PUSCH and a sequence for each of a periodic SRS and an aperiodic SRS may be set independently. Thus, the TDD system, which uses uplink channel quality measurement and channel reciprocity of a serving T/R point and another T/R point, may measure downlink channel quality of the serving T/R point and the other T/R point, independently.

In addition, the location or geometry of a UE may be recognized through an SRS and thus, when the UE is located at an edge or the center of a cell, the UE may use a UE-specific downlink transmission method for downlink transmission and may improve data throughput in the downlink.

Figure 23:
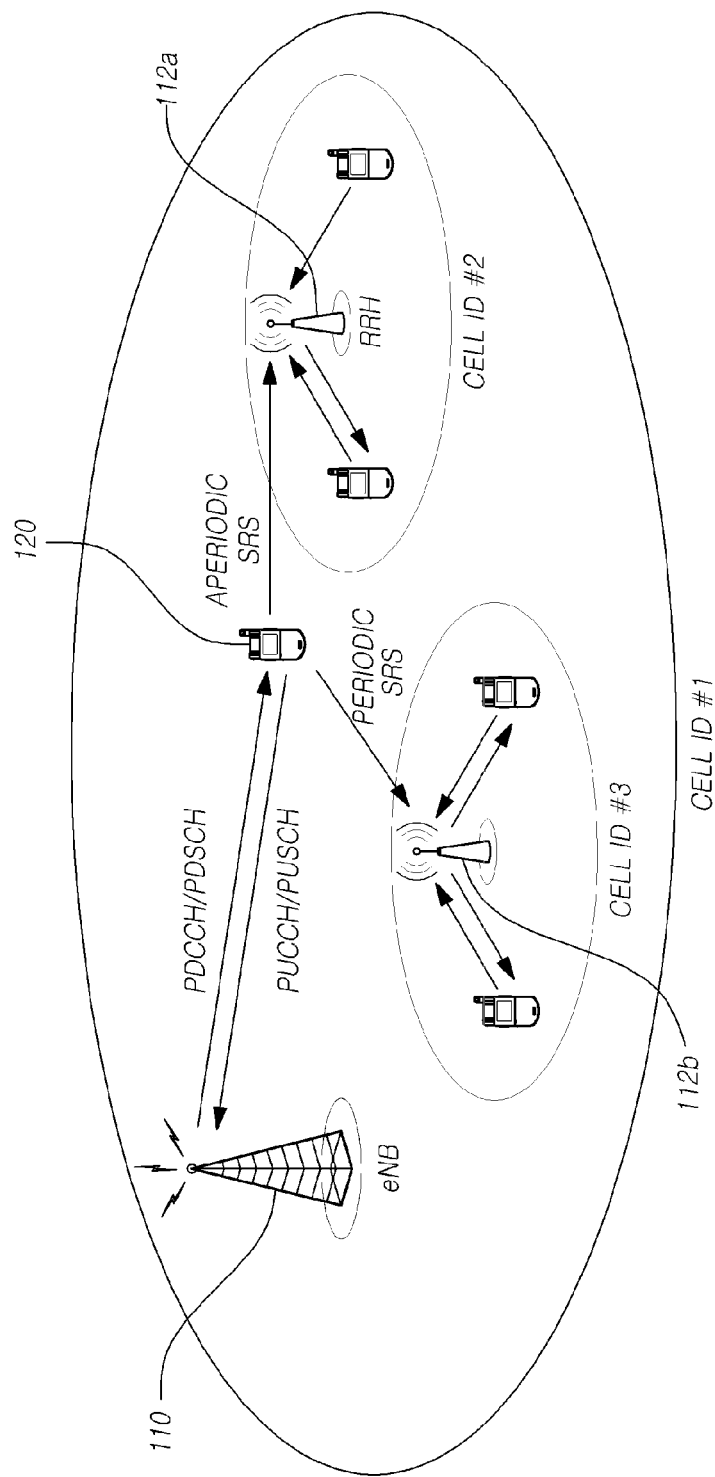
FIG. 23 illustrates independent transmission of a physical uplink channel and an SRS and independent transmission of a periodic SRS and an aperiodic SRS in a CoMP system where T/R points use different cell IDs (Cell ID#1, Cell ID #2, and Cell ID #3)

FIG. 23 illustrates independent transmission of a physical uplink channel and an SRS and independent transmission of a periodic SRS and an aperiodic SRS in a CoMP system where T/R points use different cell IDs (Cell ID#1, Cell ID #2, and Cell ID #3).

Figure 24:
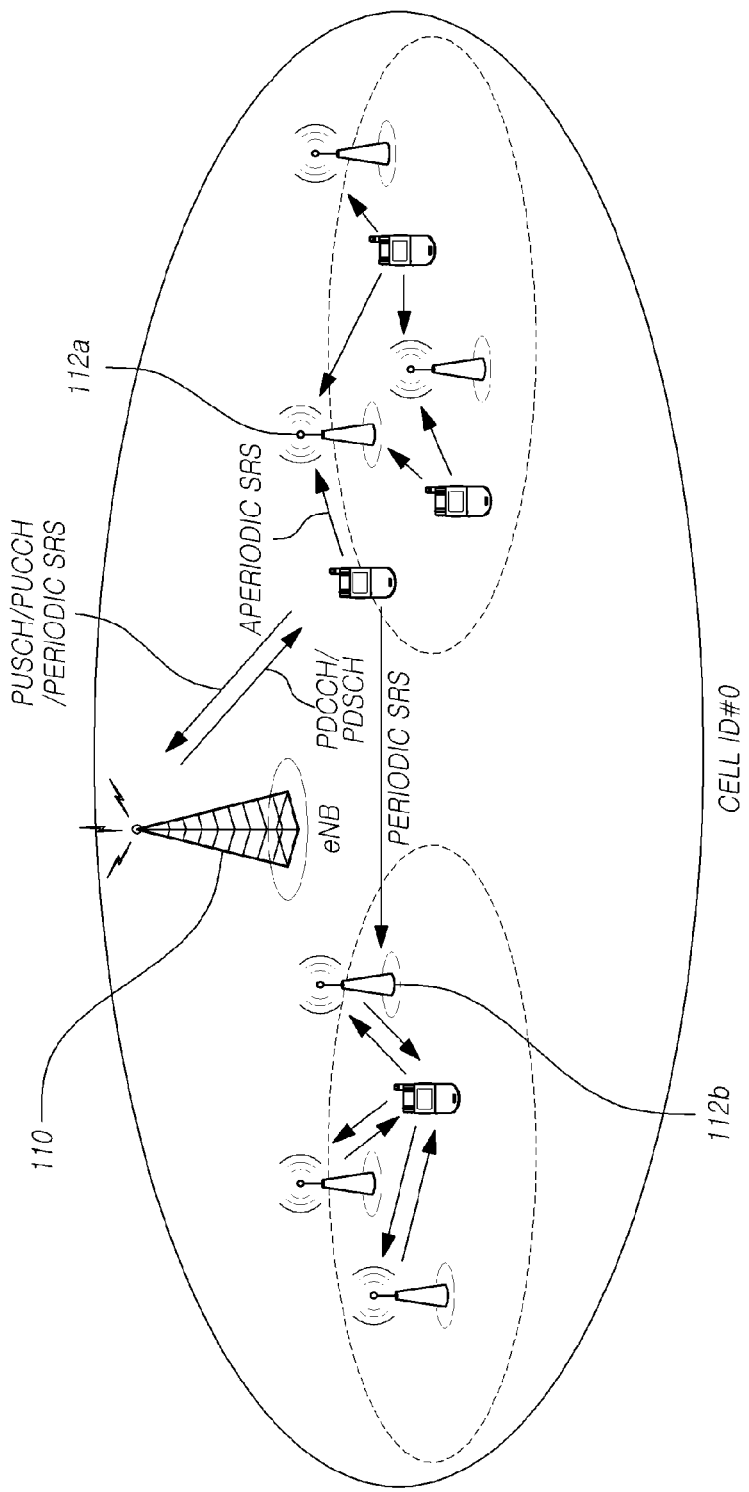
FIG. 24 illustrates independent transmission of a physical uplink channel and an SRS and independent transmission of a periodic SRS and an aperiodic SRS in a CoMP system where T/R points use an identical cell ID (Cell ID#0)

FIG. 24 illustrates independent transmission of a physical uplink channel and an SRS and independent transmission of a periodic SRS and an aperiodic SRS in a CoMP system where T/R points use an identical cell ID (Cell ID#0).

Referring to FIG. 23 and FIG. 24, a UE-specific parameter indicating an SRS may indicate different reference signal IDs for a periodic SRS and an aperiodic SRS. Therefore, when an SRS is transmitted independently from a PUCCH and a PUSCH, a periodic SRS and an aperiodic SRS are transmitted independently. In this instance, although the independent transmission is described for only when a transmission target for a periodic SRS and a target for an aperiodic SRS are different in FIG. 23 and FIG. 24, the same independent transmission may be applied for when the transmission target for the periodic SRS and the transmission target for the aperiodic SRS are identical if the transmission targets for the periodic SRS and the aperiodic SRS are set independently.

According to the SRS transmission method of FIG. 23 and FIG. 24, a sequence for the SRS may be configured independently from a DM-RS associated with a PUCCH and a PUSCH and a sequence for each of a periodic SRS and an aperiodic SRS may be set independently. Thus, a TDD system, which uses uplink channel quality measurement and channel reciprocity of a serving T/R point and another T/R point, may measure downlink quality of the serving T/R point and the other T/R point, independently.

In addition, the location or geometry of a UE may be recognized through an SRS and thus, when the UE is located at an edge or the center of a cell, the UE may use a UE-specific downlink transmission method for downlink transmission and may improve data throughput in downlink.

Figure 25:
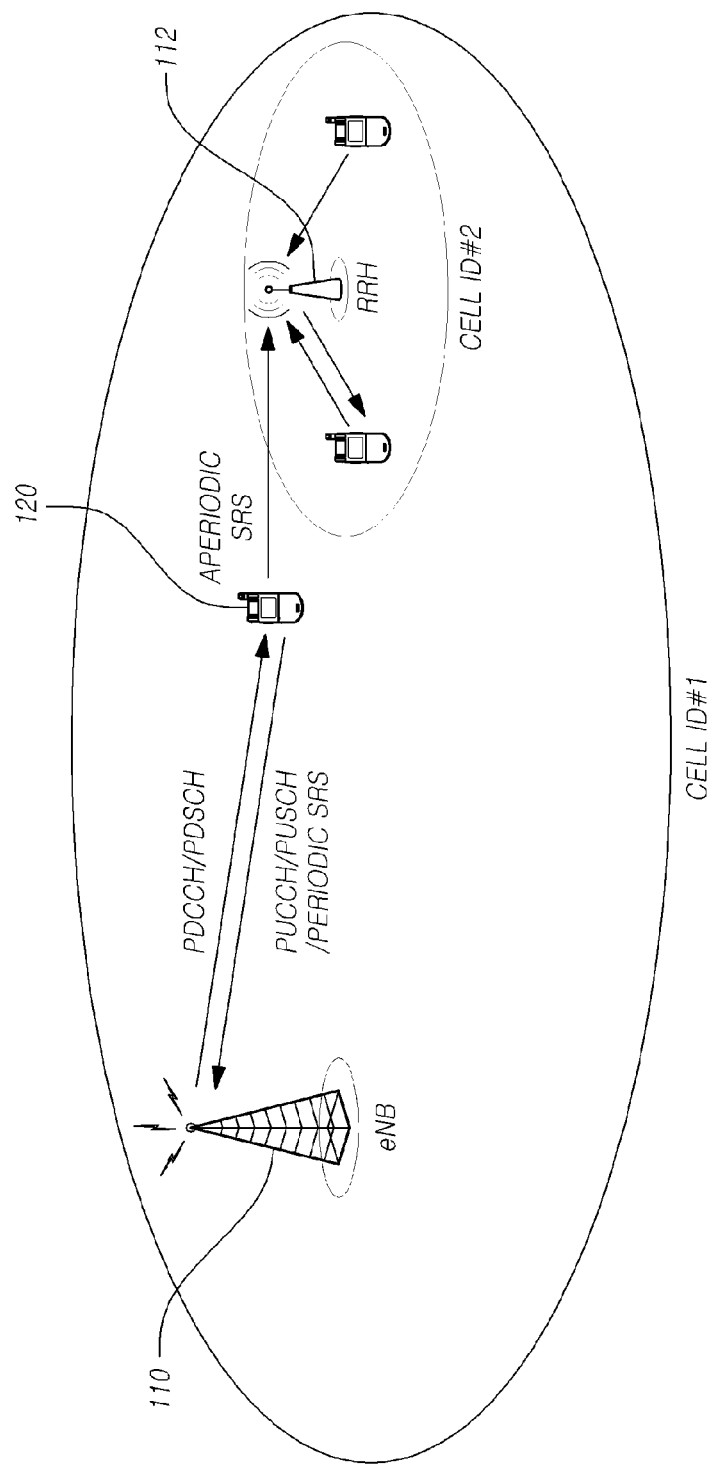
FIG. 25 illustrates transmission of a periodic SRS to a serving T/R point of a UE and transmission of an aperiodic SRS to another T/R point in a CoMP system where T/R points use different cell IDs (Cell ID #1 and Cell ID #2)

FIG. 25 illustrates transmission of a periodic SRS to a serving T/R point that serves a UE and transmission of an aperiodic SRS to another T/R point in a CoMP system where T/R points use different cell IDs (Cell ID #1 and Cell ID #2).

Figure 26:
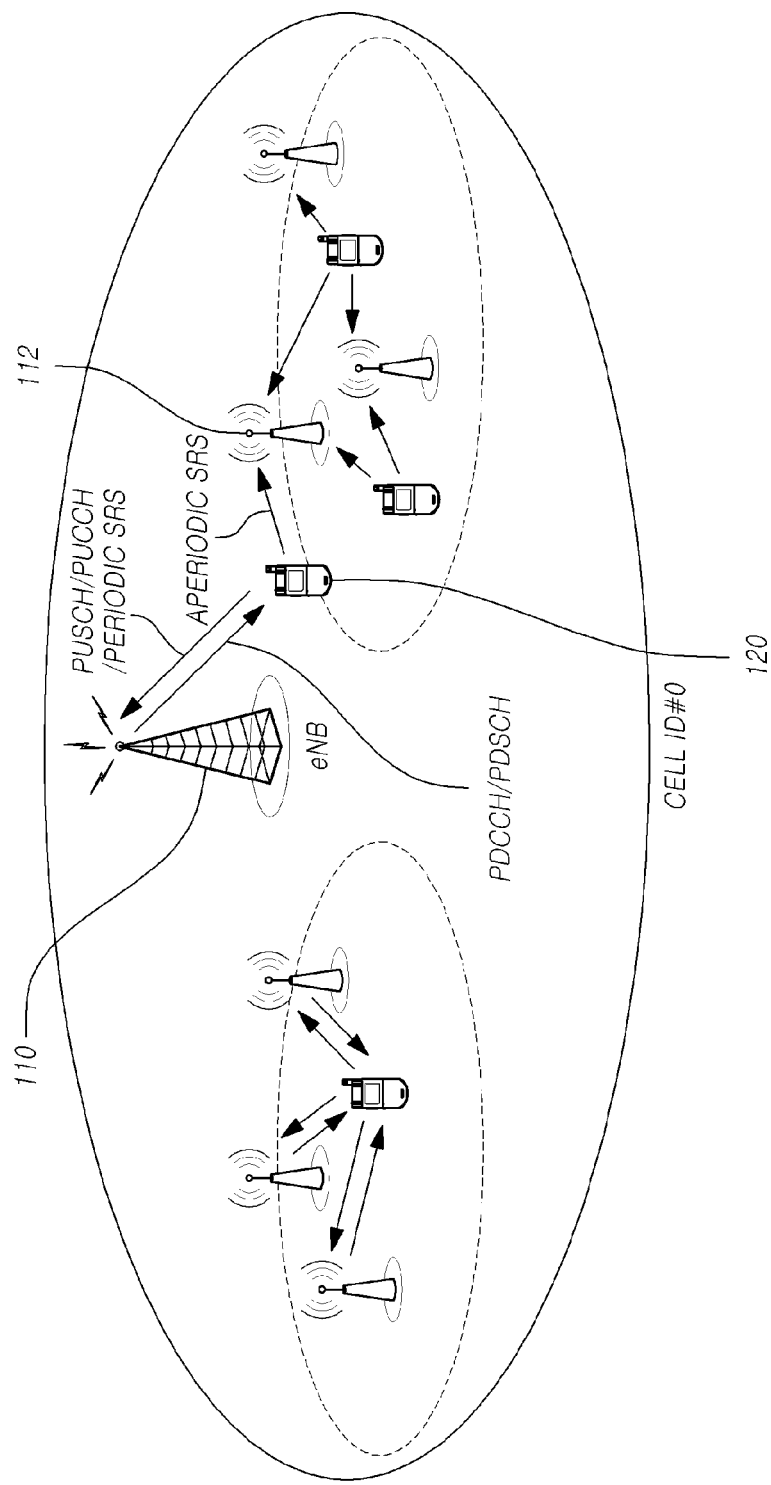
FIG. 26 illustrates transmission of a periodic SRS to a serving T/R point of a UE and transmission of an aperiodic SRS to another T/R point, independently from a physical uplink channel, in a CoMP system where T/R points use an identical cell ID (Cell ID #0)

FIG. 26 illustrates transmission of a periodic SRS to a serving T/R point that serves a UE and transmission of an aperiodic SRS to another T/R point, independently from a physical uplink channel, in a CoMP system where T/R points use an identical cell ID (Cell ID #0).

Although not illustrated in FIG. 25 and FIG. 26, an aperiodic SRS is transmitted through a serving T/R point that services a UE, and a periodic SRS is transmitted to another T/R point, independently from a physical uplink channel.

Referring to FIG. 25 and FIG. 26, operation S2020 for generating an SRS in FIG. 20 generates one of the periodic SRS and aperiodic SRS based on an SRS ID set independently from an ID for a physical uplink channel, and generates the other based on a cell ID of a serving T/R point that serves a UE, and operation S2030 for transmitting an SRS transmits one of the periodic SRS and aperiodic SRS to a T/R point indicated by the SRS ID and transmits the other to the serving T/R point.

That is, according to the embodiments of FIG. 25 and FIG. 26, one of the periodic SRS and aperiodic SRS is transmitted independently from a physical uplink channel, and the other is transmitted to the serving T/R point. As a matter of course, a transmission target of an SRS may be identical to a transmission target of a physical uplink channel, and the SRS may be transmitted to the serving T/R point.

According to the embodiments of FIG. 25 and FIG. 26, a sequence for an SRS may be configured independently from a PUCCH and a PUSCH. In addition, a sequence for each of a periodic SRS and an aperiodic SRS may be configured independently. Through the above, a TDD system, which uses uplink channel quality measurement and channel reciprocity associated with a serving T/R point and another T/R point, may measure downlink channel quality of the serving T/R point and the other T/R point independently.

In addition, the location or geometry of a UE may be recognized through an SRS and thus, when the UE is located at an edge or the center of a cell, the UE may use a UE-specific downlink transmission method for downlink transmission and may improve data throughput in downlink.

Fourth Embodiment: Decoupling

The fourth embodiment is distinguished from the third embodiment illustrated in FIG. 20 and the first embodiment and the second embodiments. Hereinafter, the fourth embodiment will be described.

According to the fourth embodiment distinguished from the embodiment of FIG. 20, a physical uplink channel is generated based on a reference signal ID. However, an SRS is generated based on a physical cell ID of a serving T/R point.

According to the embodiment, when a reception point for a PUSCH or a PUCCH is set to a T/R point different from a serving T/R point (e.g., a target of downlink transmission), in other words, when transmission is performed to the different T/R point by setting a UE-specific PUSCH or PUCCH reference signal sequence in generation of a sequence for transmitting a PUSCH or a PUCCH reference signal, at least one of a corresponding aperiodic and periodic SRS is decoupled from a PUCCH or PUSCH transmitted to the different T/R point so as not to use the configuration of the sequence of the PUCCH or PUSCH. Thus, a transmission target for the SRS is set to the serving T/R point.

In particular, at least one of the periodic SRS and aperiodic SRS may be generated using a physical cell ID $N_{ID}^{cell}$ of the serving T/R point, as opposed to a reference signal ID ($n_{ID}^{RS}$ or $n_{ID}^{RS'}$) that is coupled with the physical uplink channel.

Figure 27:
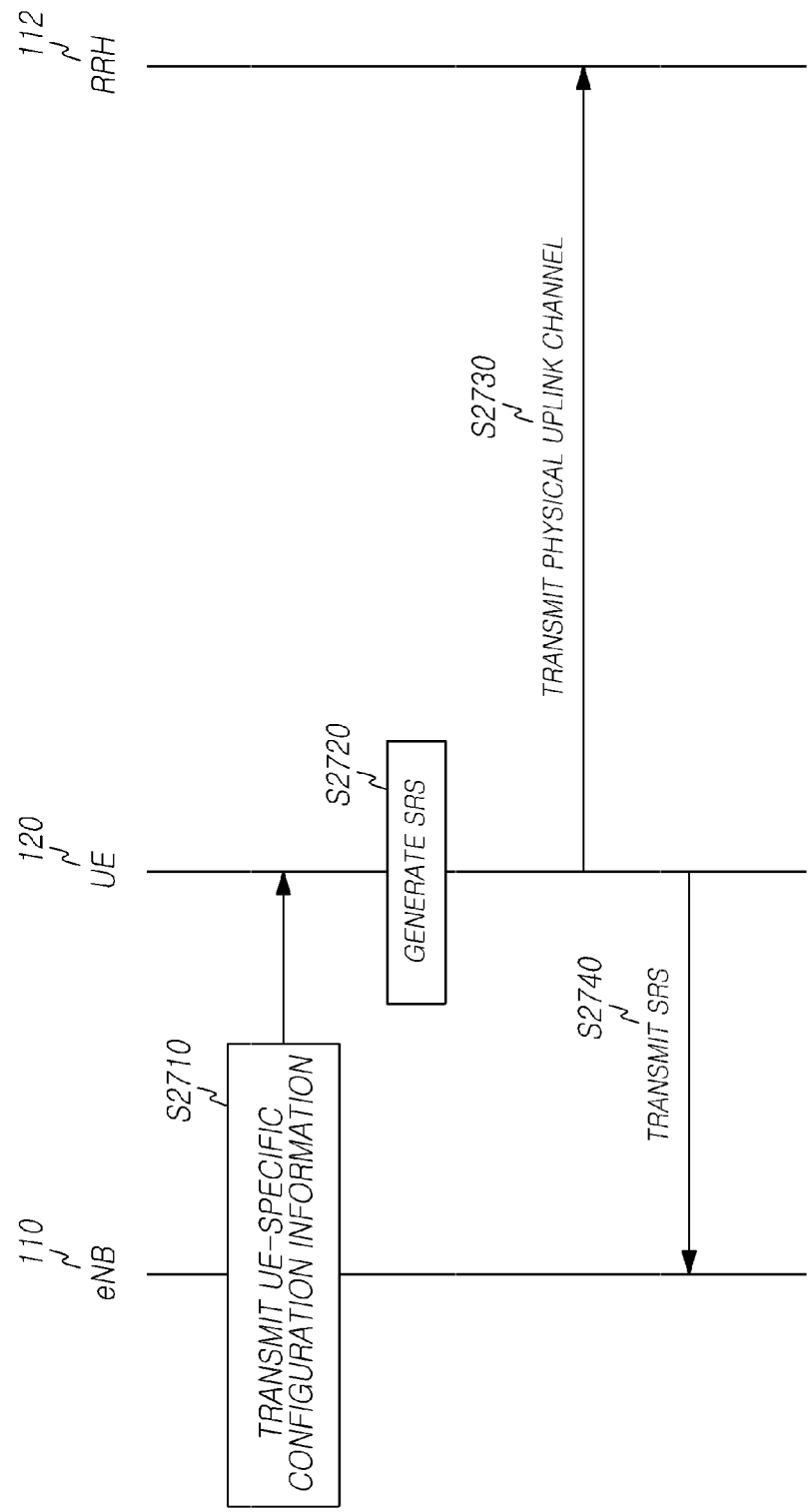
FIG. 27 is a flowchart illustrating an SRS transmission method according to another embodiment.

FIG. 27 is a flowchart illustrating an SRS transmission method according to another embodiment.

Referring to FIG. 27, the SRS transmission method according to the embodiment includes receiving, from one of two or more different T/R points, a UE-specific parameter indicating an uplink reference signal ID coupled with a physical uplink channel, which is independent from a cell ID of a T/R point in operation S2710, generating an SRS using a physical cell ID of the one T/R point, that is, a T/R point that serves a UE in operation S2720, transmitting the physical uplink channel and a corresponding Demodulation Reference Signal (DM-RS) to the T/R point 112 indicated by the uplink reference signal ID, using the uplink reference signal ID of operation S2710, in operation S2730, and transmitting the SRS generated in operation S2720 to the one T/R point, that is, the serving T/R point, in operation S2740.

In this instance, the SRS may include at least one of a periodic SRS and an aperiodic SRS. In addition, the physical uplink channel may include at least one of a PUCCH and a PUSCH.

In addition, although a target for the physical uplink channel transmitted in operation S2730 is set to the T/R point 112 that is different from the T/R point 110 that serves the UE 120, this merely indicates that the target for the physical uplink channel is set independently using an uplink reference signal ID, and the serving T/R point of the UE 120 may be set as the target.

As described above, in FIG. 27, the SRS includes at least one of a periodic SRS and an aperiodic SRS and the physical uplink channel includes at least one of a PUCCH and a PUSCH. Thus, there may be various embodiments associated with SRS transmission according to the SRS transmission method of FIG. 27.

Hereinafter, examples of transmitting an SRS according to the SRS transmission method of FIG. 27 will be described with reference to FIG. 28 through FIG. 35.

Figure 28:
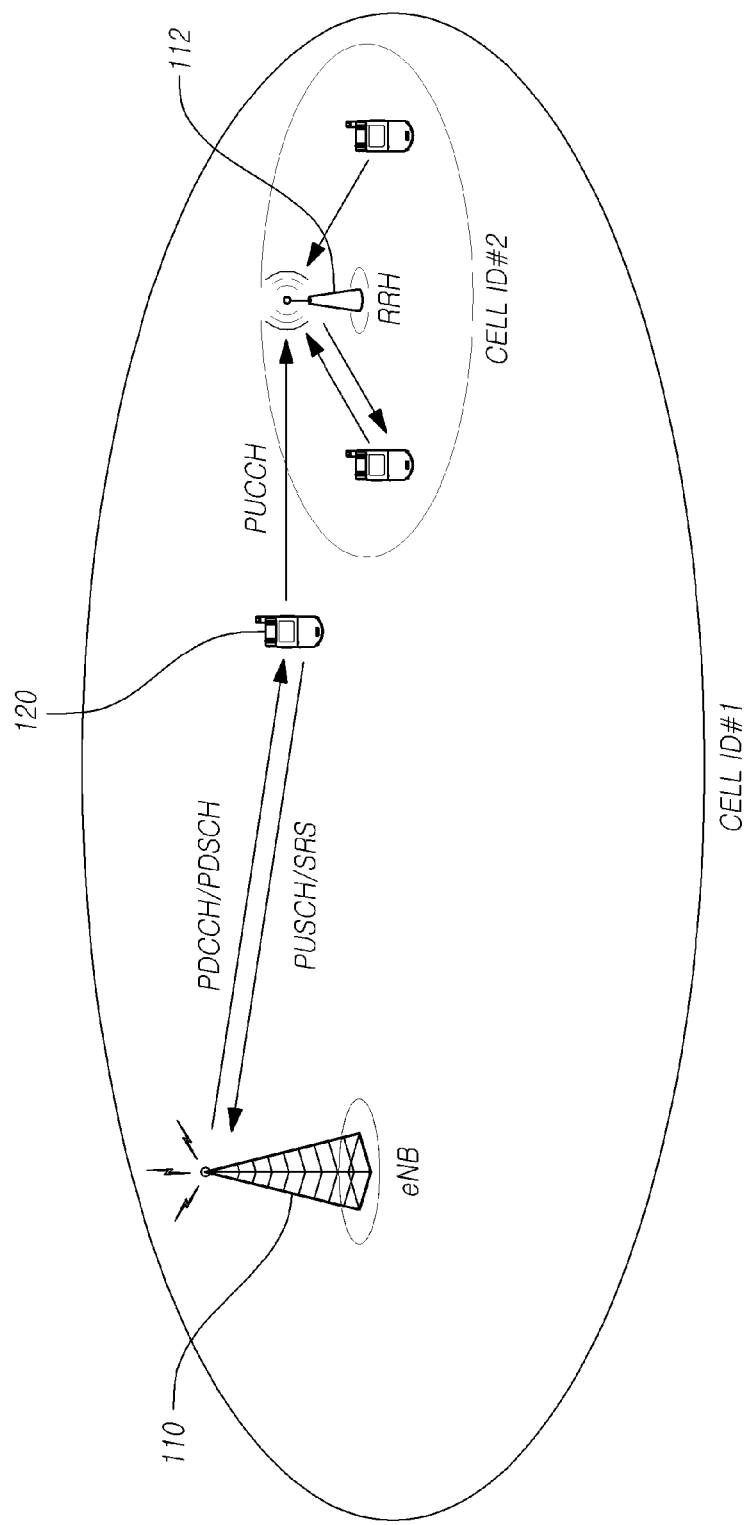
FIG. 28 illustrates transmission of an SRS to a serving T/R point when a PUCCH is transmitted to a T/R point different from the serving T/R point in a CoMP system where T/R points use different cell IDs (Cell ID #1 and Cell ID #2)

FIG. 28 illustrates transmission of an SRS to a serving T/R point when a PUCCH is transmitted to a T/R point different from the serving T/R point in a CoMP system where T/R points use different cell IDs (Cell ID #1 and Cell ID #2).

Figure 29:
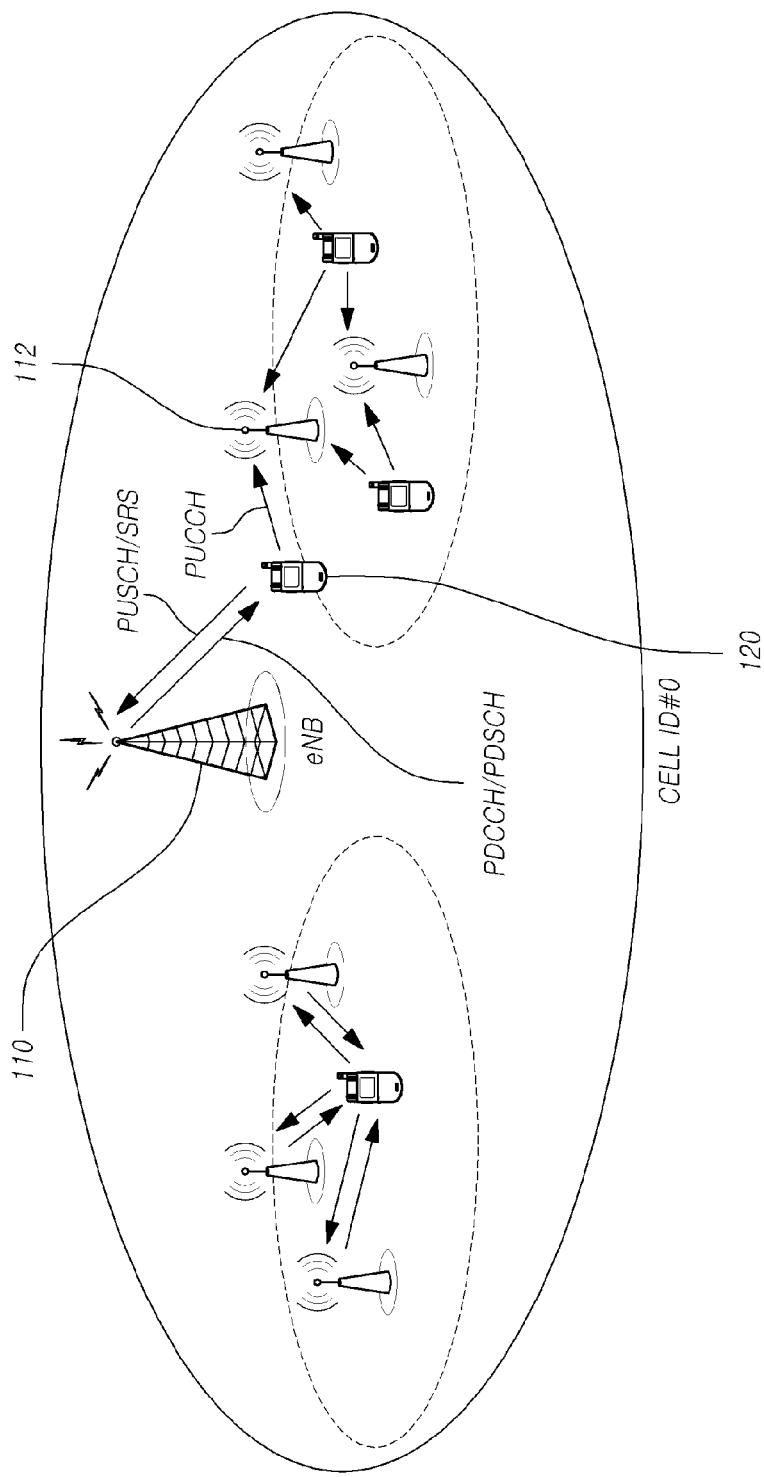
FIG. 29 illustrates transmission of an SRS to a serving T/R point when a PUCCH is transmitted to a T/R point different from the serving T/R point, in a CoMP system where T/R points use an identical Cell ID (Cell ID #0)

FIG. 29 illustrates transmission of an SRS to a serving T/R point when a PUCCH is transmitted to a T/R point different from the serving T/R point, in a CoMP system where T/R points use an identical Cell ID (Cell ID #0).

Referring to FIG. 28 and FIG. 29, when a DM-RS ID of a PUCCH is set to a T/R point different from a serving T/R point, an SRS is transmitted to the serving T/R point. Thus, the SRS and the PUCCH are separated and transmitted.

Figure 30:
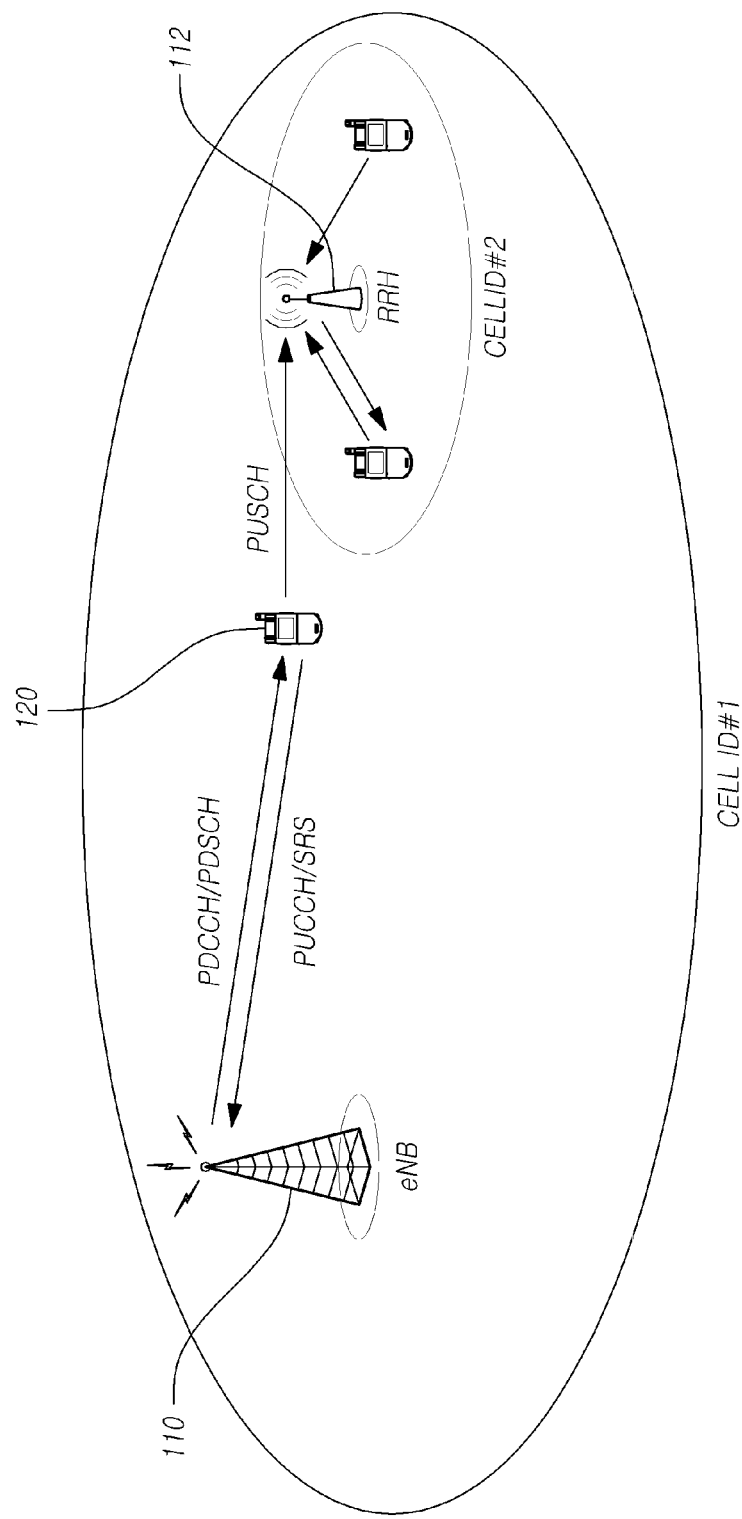
FIG. 30 illustrates transmission of an SRS to a serving T/R point when a PUSCH is transmitted to a T/R point different from the serving T/R point, in a CoMP system where T/R points use different cell IDs (Cell ID #1 and Cell ID #2)

FIG. 30 illustrates transmission of an SRS to a serving T/R point when a PUSCH is transmitted to a T/R point different from the serving T/R point, in a CoMP system where T/R points use different cell IDs (Cell ID #1 and Cell ID #2).

Figure 31:
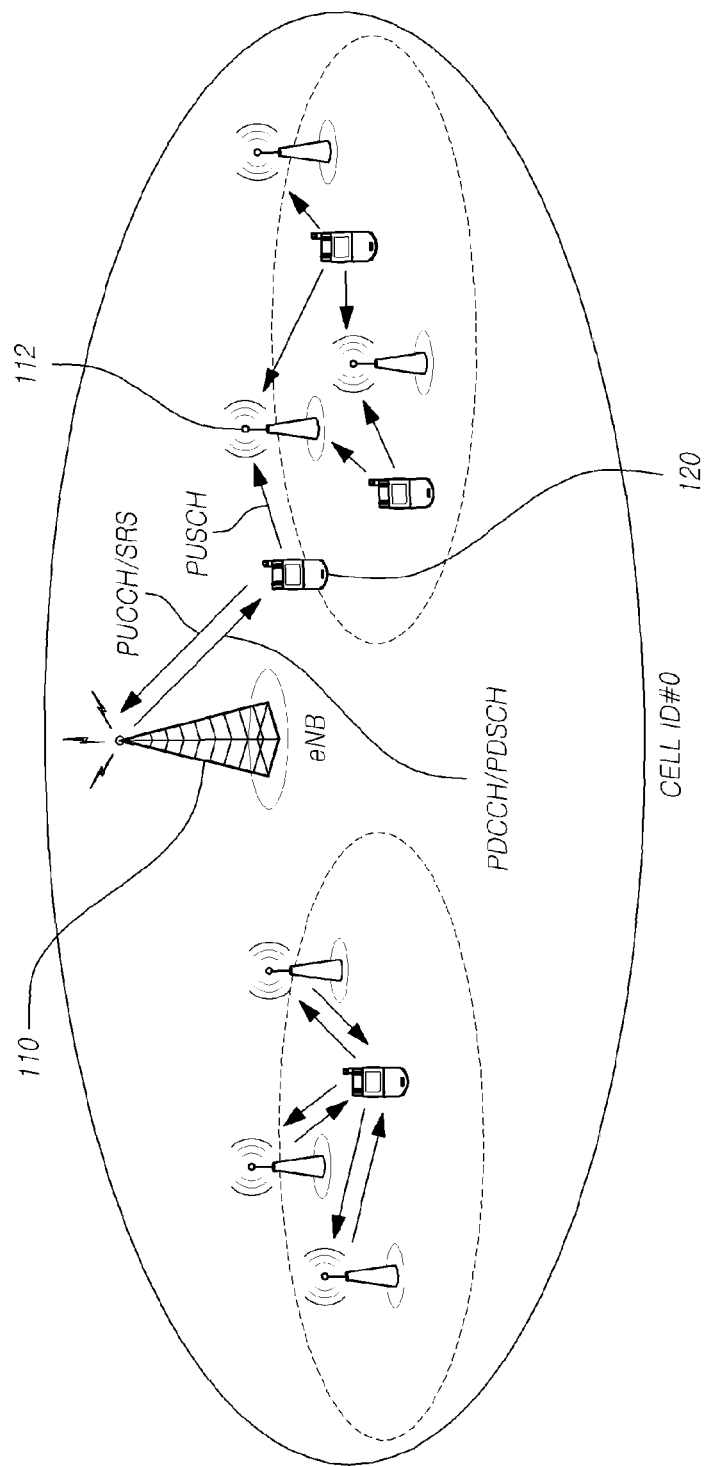
FIG. 31 illustrates transmission of an SRS to a serving T/R point when a PUSCH is transmitted to a T/R point different from the serving T/R point, in a CoMP system where T/R points use an identical Cell ID (Cell ID #0)

FIG. 31 illustrates transmission of an SRS to a serving T/R point when a PUSCH is transmitted to a T/R point that is different from the serving T/R point, in a CoMP system where T/R points use an identical Cell ID (Cell ID #0).

Referring to FIG. 30 and FIG. 31, when a DM-RS ID of a PUSCH is set to a T/R point different from a serving T/R point, an SRS is transmitted to the serving T/R point. Thus, the SRS and the PUSCH are separated and transmitted.

Figure 32:
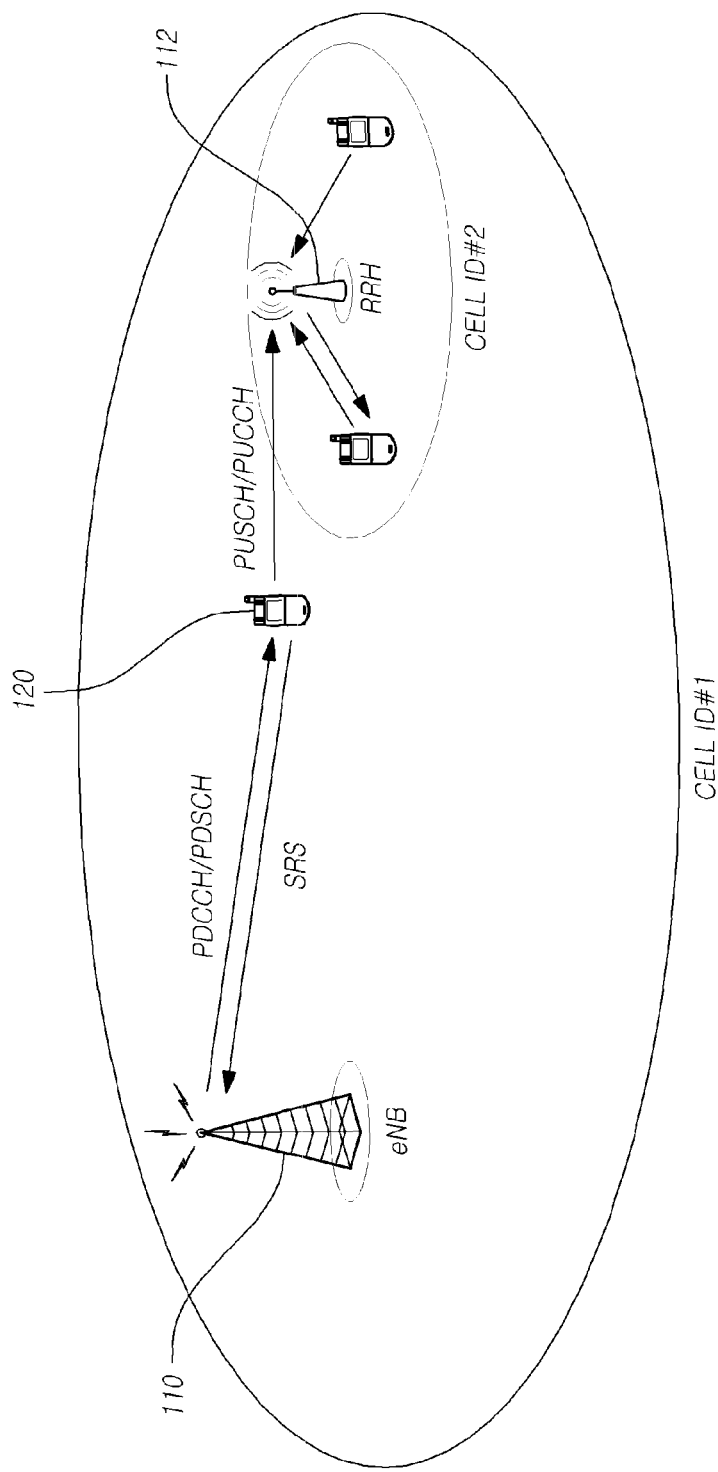
FIG. 32 illustrates transmission of an SRS to a serving T/R point when a PUSCH and a PUCCH are transmitted to a T/R point different from the serving T/R point, in a CoMP system where T/R points use different cell IDs (Cell ID #1 and Cell ID #2)

FIG. 32 illustrates transmission of an SRS to a serving T/R point when a PUSCH and a PUCCH are transmitted to a T/R point different from the serving T/R point, in a CoMP system where T/R points use different cell IDs (Cell ID #1 and Cell ID #2).

Figure 33:
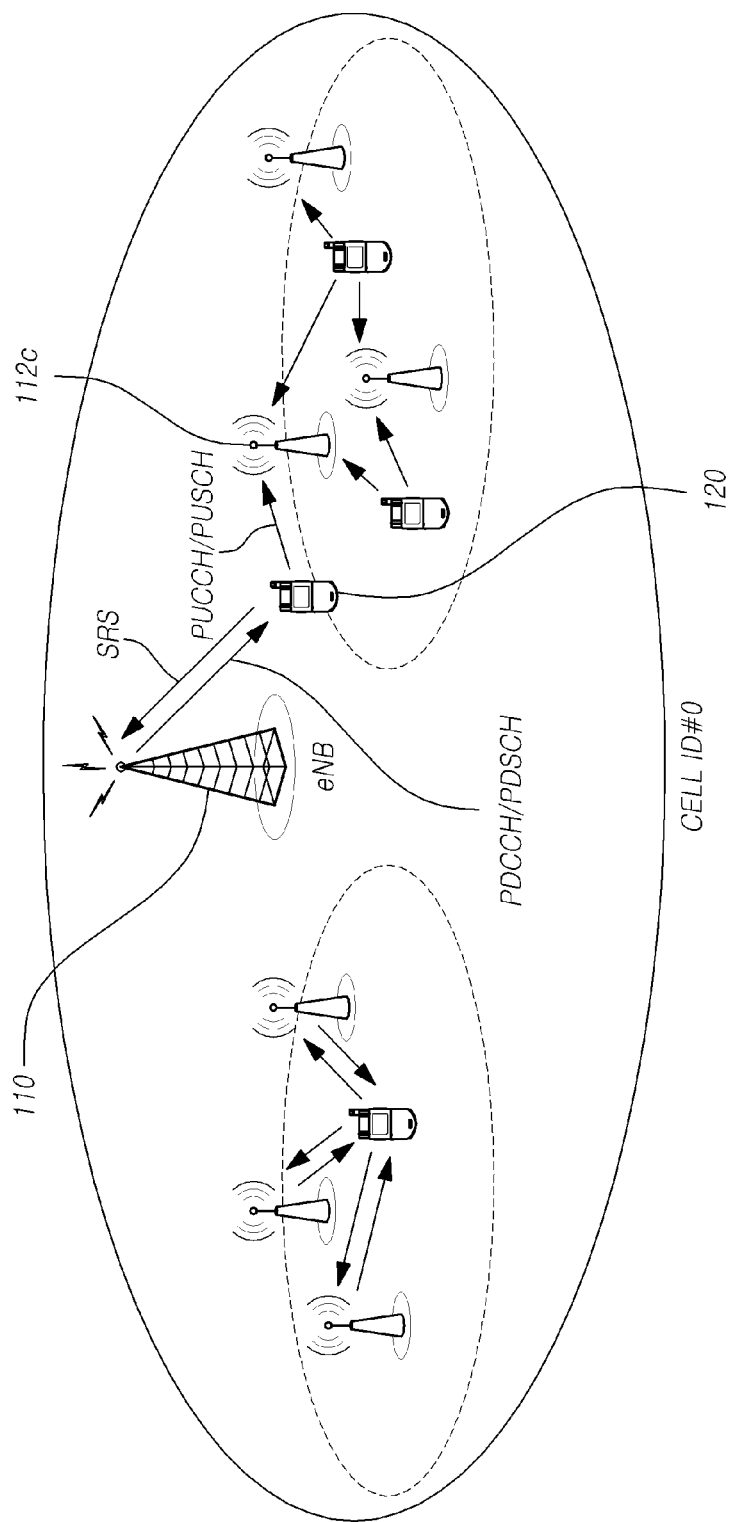
FIG. 33 illustrates transmission of an SRS to a serving T/R point when a PUSCH and a PUCCH are transmitted to a T/R point different from the serving T/R point, in a CoMP system where T/R points use an identical Cell ID (Cell ID #0)

FIG. 33 illustrates transmission of an SRS to a serving T/R point when a PUSCH and a PUCCH are transmitted to a T/R point different from the serving T/R point, in a CoMP system where T/R points use an identical Cell ID (Cell ID #0).

Referring to FIG. 32 and FIG. 33, when DM-RS IDs of a PUSCH and a PUCCH are set to a T/R point different from a serving T/R point, an SRS is transmitted to the serving T/R point. Thus, the SRS are separated from the PUSCH and the PUCCH, and transmitted.

In the SRS transmission method of FIG. 27, an SRS generated based on a physical cell ID of a serving T/R point is at least one of a periodic SRS and an aperiodic SRS. Therefore, one of the periodic SRS and aperiodic SRS is generated based on the cell ID of the serving T/R point and the other is generated based on an uplink reference signal ID.

Particularly, one of the periodic SRS and the aperiodic SRS may be generated based on the physical cell ID $N_{ID}^{cell}$ of the serving T/R point and the other may be generated based on the reference signal ID ($n_{ID}^{RS}$ or $n_{ID}^{RS'}$) coupled with a physical uplink channel.

Figure 34:
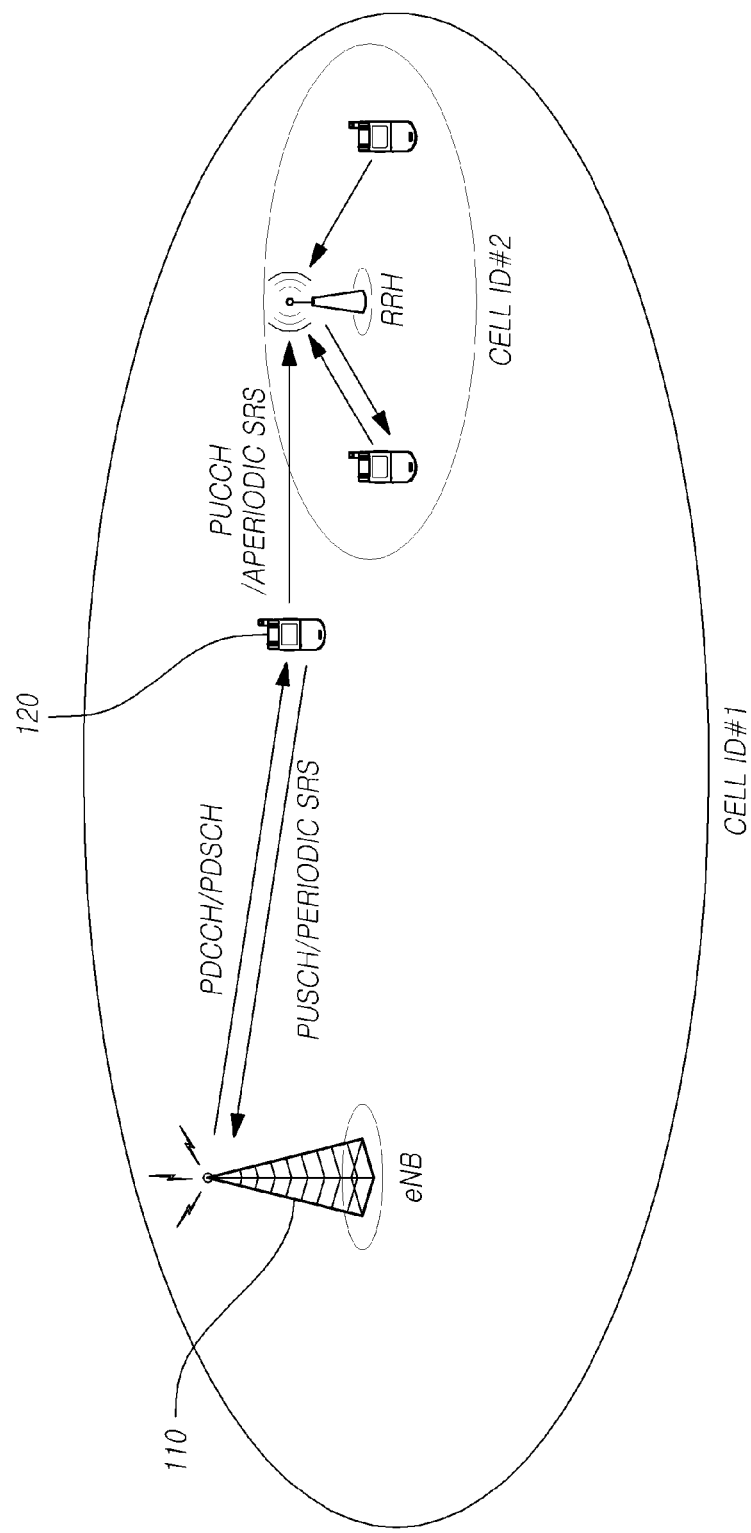
FIG. 34 illustrates transmission of a periodic SRS to a serving T/R point and transmission of an aperiodic SRS coupled with a PUCCH when the PUCCH is transmitted to a T/R point different from the serving T/R point, in a CoMP system where T/R points use different cell IDs (Cell ID #1 and Cell ID #2)

FIG. 34 illustrates transmission of a periodic SRS to a serving T/R point and transmission of an aperiodic SRS coupled with a PUCCH when the PUCCH is transmitted to a T/R point different from the serving T/R point, in a CoMP system where T/R points use different cell IDs (Cell ID #1 and Cell ID #2).

Figure 35:
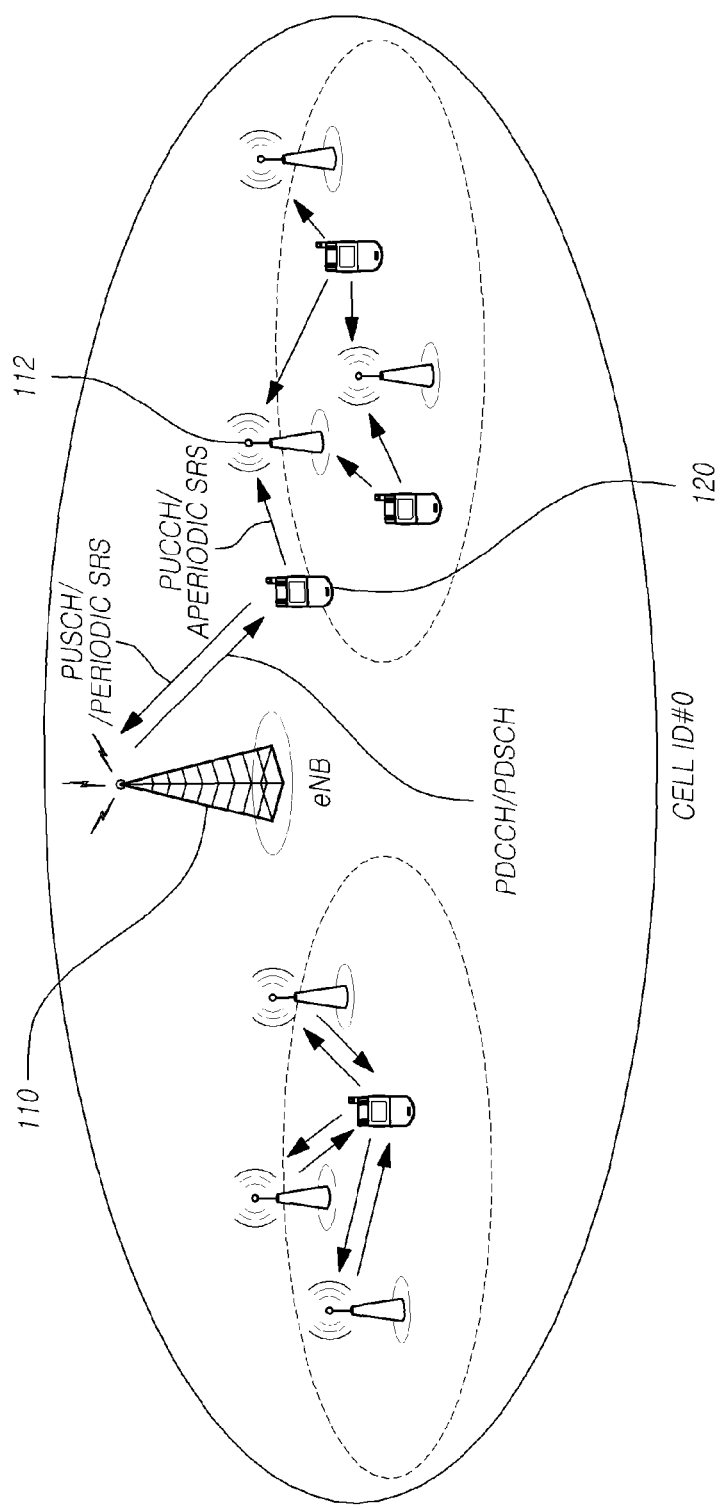
FIG. 35 illustrates transmission of a periodic SRS to a serving T/R point and transmission of an aperiodic SRS coupled with a PUCCH when the PUCCH is transmitted to a T/R point different from the serving T/R point, in a CoMP system where T/R points use an identical cell ID (Cell ID #0)

FIG. 35 illustrates transmission of a periodic SRS to a serving T/R point and transmission of an aperiodic SRS coupled with a PUCCH when the PUCCH is transmitted to a T/R point different from the serving T/R point, in a CoMP system where T/R points use an identical cell ID (Cell ID #0).

For convenience and ease of understanding, the periodic SRS is described as being transmitted to the serving T/R point and the aperiodic SRS is described as being coupled with a PUCCH in FIG. 34 and FIG. 35. However, this is only mere example. For example, the aperiodic SRS may be transmitted to the serving T/R point, the SRS may be coupled with a PUCCH for transmission, and the aperiodic SRS may be a PUSCH instead of the PUCCH.

Referring to FIG. 34 and FIG. 35, operation S2730 for generating an SRS according to the SRS transmission method of FIG. 27, generates one of a periodic SRS and an aperiodic SRS using a physical cell ID of the one T/R point (e.g., the serving T/R point 110) and generates the other based on an uplink reference signal ID, operation S2740 for transmitting an SRS transmits one of the periodic SRS and the aperiodic SRS to the serving T/R point 110 and transmits the other to the T/R point 112 indicated by the uplink reference signal ID.

According to the embodiments described with reference to FIG. 27 to FIG. 35, a reception point for a PUCCH or a PUSCH is set to a T/R point different from a serving T/R point, a target for an SRS is set to the serving T/R point, that is, the SRS is decoupled from the PUCCH or the PUSCH and is transmitted. Accordingly, an uplink channel state of the serving T/R point may be measured through the transmission of the SRS, and the PUCCH or the PUSCH may be transmitted to another T/R point that has better geometry, as opposed to the serving T/R point, to enable MU-MIMO for securing reliability of a channel and improving uplink transmission rate. Thus, the coverage short of the uplink may be overcome and the uplink transmission rate may be improved.

Figure 36:
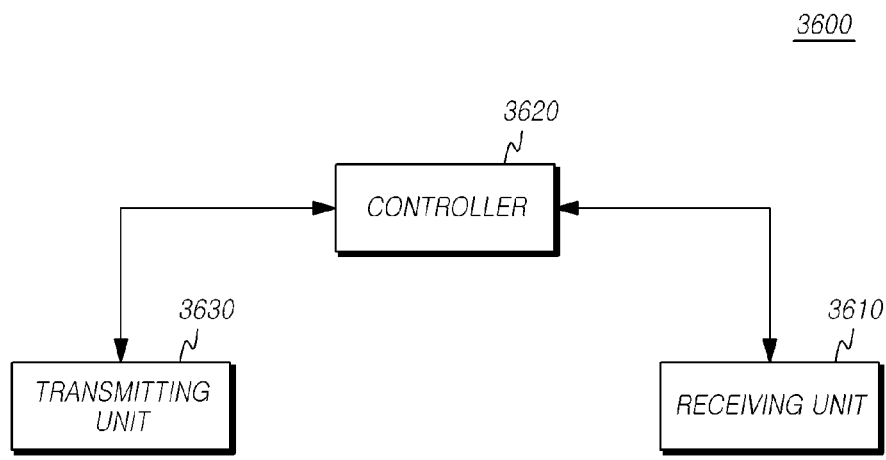
FIG. 36 is a diagram illustrating a configuration of a T/R point according to embodiments.

FIG. 36 is a diagram illustrating a configuration of a base station according to embodiments of the present disclosure.

Referring to FIG. 36, a base station 3600 according to embodiments may include a controller 3620, a transmitting unit 3630, and a receiving unit 3610.

The controller 3620 may control a CoMP operation required for implementing the above described embodiments of the present disclosure, and general operations of a base station in association with the transmission of an uplink reference signal.

The transmitting unit 3630 and the receiving unit 3610 may be used for transmitting and receiving, to/from a UE, a signal or a message and data required for implementing the above described embodiments of the present disclosure.

Figure 37:
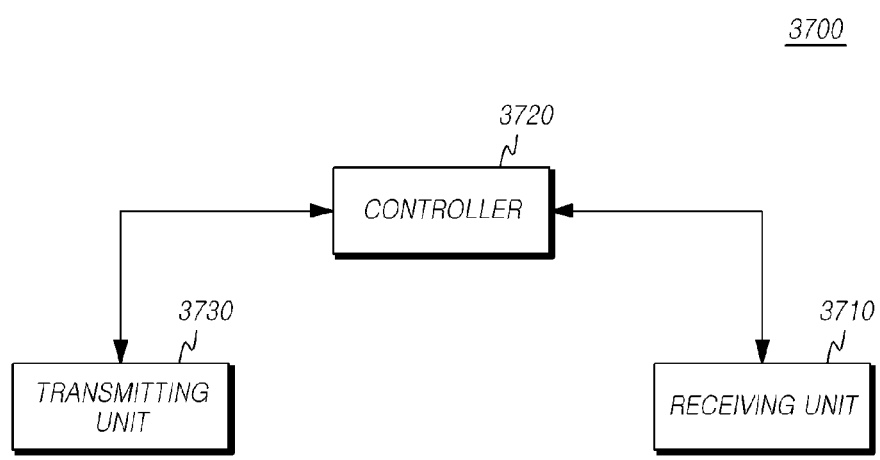
FIG. 37 is a diagram illustrating a configuration of a User Equipment (UE) according to embodiments.

FIG. 37 is a diagram illustrating a configuration of a UE according to embodiments.

Referring to FIG. 37, a UE 3700 according to embodiments may include a receiving unit 3710, a controller 3720, and a transmitting unit 3730.

The receiving unit 3710 may receive, from a base station, downlink control information, downlink data, a message, through a corresponding channel. The receiving unit 3710 may receive UE-specific configuration information indicating an uplink reference signal ID that is coupled with a physical uplink channel (e.g., one of a physical uplink data channel (PUSCH) and a physical uplink control channel (PUCCH)) which is independent from a cell ID of a first T/R point (e.g., eNB 110 of FIG. 1), from the first T/R point among two or more different T/R points. Uplink reference signal ID may be an uplink DM-RS.

In addition, the controller 3720 may control a CoMP operation required for implementing the above described embodiments of the present disclosure, and general operations of a UE required for transmission of an uplink reference signal and transmission of an uplink channel. The controller 3720 may generate an SRS using an uplink reference signal ID. The SRS may be one of a periodic SRS and an aperiodic SRS.

The transmitting unit 3730 may transmit an uplink reference signal and an uplink channel to a base station. The transmitting unit 3730 may transmit a generated SRS to a T/R point indicated by the uplink reference signal ID, for example, a T/R point different from the first T/R point.

The content associated with the standard, mentioned in the above described embodiments has been omitted in order to provide a simple description of the present specifications, but it may be a part of the present specifications. Therefore, when a part of the content related to the standard is added to the present specifications or is specified in claims, it should be construed as a part of the present invention.

Particularly, the documents attached herein are a part of previously publicized documents and constitute a part of the present specifications. Therefore, when a part of the content and documents associated with the standard is added to the present specifications or is specified in claims, it should be construed as a part of the present invention.

Although a preferred embodiment of the present invention has been described for illustrative purposes, those skilled in the art will appreciate that various modifications, additions, and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method for a User Equipment (UE) to transmit an uplink Sounding Reference Signal (SRS) in a coordinated multi-point transmission/reception system (CoMP system), the method comprising:

receiving, from a first Transmission/Reception (T/R) point of two or more different T/R points, UE-specific configuration information indicating an uplink reference signal identification (ID) wherein the uplink reference signal ID is independent from a physical cell ID of the first T/R point and is coupled with an uplink channel;

generating an SRS based on a type of the SRS, wherein the SRS includes a periodic SRS and an aperiodic SRS;

transmitting the uplink channel to a second T/R point indicated by the uplink reference signal ID; and transmitting the generated SRS to a T/R point determined based on the type of the SRS, wherein the second T/R point indicated by the uplink reference signal ID is different from the first T/R point transmitting the UE-specific configuration information;

wherein the generating the SRS includes:
generating the aperiodic SRS using the uplink reference signal ID, and
generating the periodic SRS using the physical cell ID of the first T/R point; and wherein the transmitting the generated SRS includes:
transmitting the generated aperiodic SRS to the second T/R point indicated by the uplink reference signal ID, and transmitting the generated periodic SRS to the first T/R point.

2. The method as claimed in claim 1, wherein the uplink channel is at least one of a physical uplink data channel and a physical uplink control channel.

3. The method as claimed in claim 1, wherein the uplink reference signal ID is a reference signal ID of an uplink Demodulation Reference Signal (DM-RS).

4. The method as claimed in claim 1, wherein the receiving comprises receiving the UE-specific configuration information through a UE-specific parameter or dynamically receiving the UE-specific configuration information through a PDCCH or an EPDCCH.

5. A User Equipment (UE) in a coordinated multi-point transmission/reception system (CoMP system), the User Equipment (UE) comprising:
a receiving unit configured to receive, from a first transmission/reception (T/R) point of two or more different T/R points, UE-specific configuration information indicating an uplink reference signal identification (ID) wherein the uplink reference signal ID is independent from a physical cell ID of the first T/R point and is coupled with an uplink channel;
a controller configured to generate a Sounding Reference Signal (SRS) based on a type of the SRS, wherein the SRS includes a periodic SRS and an aperiodic SRS; and
a transmitting unit configured to transmit the uplink channel to a second T/R point indicated by the uplink reference signal ID and to transmit the generated SRS to a T/R point determined based on the type of the SRS,
wherein the second T/R point indicated by the uplink reference signal ID is different from the first T/R point transmitting the UE-specific configuration information;
wherein the controller is configured to:
generate the aperiodic SRS using the uplink reference signal ID, and
generate the periodic SRS using the physical cell ID of the first T/R point; and
wherein the transmitting unit is configured to:
transmit the generated aperiodic SRS to the second T/R point indicated by the uplink reference signal ID, and
transmit the generated periodic SRS to the first T/R point.

6. The UE as claimed in claim 5, wherein the uplink channel is at least one of a physical uplink data channel and a physical uplink control channel.

7. The UE as claimed in claim 5, wherein the uplink reference signal ID is a reference signal ID of an uplink Demodulation Reference Signal (DM-RS).

8. The UE as claimed in claim 5, wherein the receiving unit is configured to receive the UE-specific configuration information through a UE-specific parameter or dynamically receive the UE-specific configuration information through a PDCCH or an EPDCCH.

9. An uplink Sounding Reference Signal (SRS) configuration method of a Transmission/Reception (T/R) point in a coordinated multi-point transmission/reception system (CoMP system), the method comprising:
transmitting, from a first T/R point of two or more different T/R points to a User Equipment (UE), UE-specific configuration information indicating an uplink reference signal identification (ID) wherein the uplink reference ID is independent from a physical cell ID of the first T/R point and is coupled with an uplink channel;
receiving, from the UE by a second T/R point indicated by the uplink reference signal ID, the uplink channel; and
receiving, from the UE, an SRS generated based on a type of the SRS, wherein the SRS includes a periodic SRS and an aperiodic SRS,
wherein the second T/R point indicated by the uplink reference signal ID is different from the first T/R point transmitting the UE-specific configuration information; and
wherein the receiving the SRS includes:
receiving, from the UE by the second T/R point indicated by the uplink reference signal ID, the aperiodic SRS generated using the uplink reference signal ID, and
receiving, from the UE by the first T/R point, the periodic SRS generated using the physical cell ID of the first T/R point.

10. The method as claimed in claim 9, wherein:
the uplink channel is at least one of a physical uplink data channel and a physical uplink control channel;
the uplink reference signal ID is a reference signal ID of an uplink Demodulation Reference Signal (DM-RS); and
the transmitting comprises transmitting the UE-specific configuration information through a UE-specific parameter or dynamically transmitting the UE-specific configuration through a PDCCH or an EPDCCH.

* * * * *